US012748289B2

(12) United States Patent
Nagami

(10) Patent No.: US 12,748,289 B2
(45) **Date of Patent: *Sep. 29, 2026**

(54) ZOOM LENS AND IMAGING APPARATUS

(71) Applicant: FUJIFILM Corporation, Tokyo (JP)

(72) Inventor: Ryosuke Nagami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 172 days.

This patent is subject to a terminal disclaimer.

(21) Appl. No.: 18/608,311

(22) Filed: Mar. 18, 2024

(65) Prior Publication Data

US 2024/0264416 A1 Aug. 8, 2024

Related U.S. Application Data

(63) Continuation of application No. 17/580,109, filed on Jan. 20, 2022, now Pat. No. 11,966,030.

(30) Foreign Application Priority Data

Jan. 21, 2021 (JP) ................................ 2021-008222
Nov. 9, 2021 (JP) ................................ 2021-182842
Dec. 9, 2021 (JP) ................................ 2021-200320

(51) Int. Cl.
*G02B 15/14* (2006.01)
*G02B 13/18* (2006.01)
*G02B 15/177* (2006.01)

(52) U.S. Cl.
CPC ..... *G02B 15/143507* (2019.08); *G02B 13/18* (2013.01); *G02B 15/177* (2013.01)

(58) Field of Classification Search
CPC ............ G02B 15/143507; G02B 13/18; G02B 15/177

(Continued)

(56) References Cited

U.S. PATENT DOCUMENTS 10,983,315 B2 4/2021 Maetaki
2004/0012704 A1* 1/2004 Hagimori ....... G02B 15/145513 348/335

(Continued)

FOREIGN PATENT DOCUMENTS

CN 102411196 A 4/2012
CN 110208932 A 9/2019

(Continued)

OTHER PUBLICATIONS

"Notice of Reasons for Refusal" Office Action issued in JP 2021-200320; mailed by the Japanese Patent Office on Aug. 12, 2025.

(Continued)

*Primary Examiner* — Sharrief I Broome

(74) *Attorney, Agent, or Firm* — Studebaker Brackett PLLC

(57) ABSTRACT

The zoom lens consists of, in order from an object side to an image side, a first lens group having a negative refractive power, a middle group, and a final group. During zooming, a spacing between the first lens group and the middle group changes, and a spacing between the middle group and the final group changes. During focusing, at least a part of the middle group moves, and the first lens group and the final group remain stationary with respect to an image plane. The zoom lens satisfies predetermined conditional expressions about aback focal length, a focal length, and a maximum half angle of view.

20 Claims, 27 Drawing Sheets

EXAMPLE 1

(58) Field of Classification Search
USPC .......................................................... 359/695
See application file for complete search history.

(56) References Cited

U.S. PATENT DOCUMENTS

| | | | |
|---|---|---|---|
| 2009/0225438 A1 | 9/2009 | Kubota | |
| 2010/0171850 A1* | 7/2010 | Tohchi ........... | G02B 15/144113 359/687 |
| 2012/0057068 A1 | 3/2012 | Ichikawa et al. | |
| 2012/0099003 A1* | 4/2012 | Yoshitsugu .......... | G02B 27/646 359/687 |
| 2013/0027585 A1 | 1/2013 | Souma | |
| 2015/0281588 A1 | 10/2015 | Izuhara et al. | |
| 2019/0265450 A1 | 8/2019 | Maetaki | |
| 2019/0324229 A1 | 10/2019 | Kikuchi | |
| 2020/0257181 A1 | 8/2020 | Gyoda | |
| 2021/0033834 A1 | 2/2021 | Machida | |

FOREIGN PATENT DOCUMENTS

| | | | |
|---|---|---|---|
| CN | 110573924 | A | 12/2019 |
| JP | 2009-216941 | A | 9/2009 |
| JP | 2012-058406 | A | 3/2012 |
| JP | 2013-015778 | A | 1/2013 |
| JP | 2017-122747 | A | 7/2017 |
| JP | 2018-077320 | A | 5/2018 |
| JP | 2019-66701 | A | 4/2019 |
| JP | 2019-132919 | A | 8/2019 |
| JP | 2019-132920 | A | 8/2019 |
| JP | 2019-152683 | A | 9/2019 |
| JP | 2019-191307 | A | 10/2019 |
| JP | 2020-101750 | A | 7/2020 |
| JP | 2020-129054 | A | 8/2020 |
| JP | 2020-140142 | A | 9/2020 |
| WO | 2014/097355 | A1 | 6/2014 |
| WO | 2020012638 | A1 | 1/2020 |

OTHER PUBLICATIONS

Office Action issued in CN 202210063206.3; mailed by the China National Intellectual Property Administration on Mar. 23, 2026.

An Office Action issued by the Japanese Patent Office on Aug. 12, 2026, which corresponds to Japanese Patent Application No. 2025-187546 and is related to U.S. Appl. No. 18/608,311; with English language translation.

* cited by examiner

EXAMPLE 1

EXAMPLE 2

EXAMPLE 3

EXAMPLE 4

EXAMPLE 5

EXAMPLE 6

EXAMPLE 7

EXAMPLE 8

EXAMPLE 8A

EXAMPLE 9

EXAMPLE 10

ZOOM LENS AND IMAGING APPARATUS

CROSS-REFERENCE TO RELATED APPLICATIONS

The present application is a continuation of U.S. application Ser. No. 17/580,109, filed Jan. 20, 2022, which claims priority under 35 U.S.C. § 119 to Japanese Patent Application No. 2021-008222, filed on Jan. 21, 2021, Japanese Patent Application No. 2021-182842, filed on Nov. 9, 2021, and Japanese Patent Application No. 2021-200320, filed on Dec. 9, 2021. Each application above is hereby expressly incorporated by reference, in its entirety, into the present application.

BACKGROUND

Technical Field

The technology of the present disclosure relates to a zoom lens and an imaging apparatus.

Related Art

As a zoom lens applicable to an imaging apparatus such as a digital camera and a video camera, for example, a lens system described in JP2020-140142A is known.

SUMMARY

Recently, there has been a demand for a compact and lightweight zoom lens having a large image circle and high optical performance.

The present disclosure has been made in view of the above circumstances, and an object of the present disclosure is to provide a compact and lightweight zoom lens having a large image circle and high optical performance, and an imaging apparatus comprising the zoom lens.

According to an aspect of the present disclosure, there is provided a zoom lens consisting of, in order from an object side to an image side, a first lens group that has a negative refractive power, a middle group, and a final group. During zooming, a spacing between the first lens group and the middle group changes, and a spacing between the middle group and the final group changes. During focusing, at least a part of the middle group moves along an optical axis as a focus group, and the first lens group and the final group remain stationary with respect to an image plane. Assuming that a back focal length of the zoom lens at an air conversion distance at a wide angle end in a state where an infinite distance object is in focus is Bfw, a focal length of the zoom lens at the wide angle end in the state where the infinite distance object is in focus is fw, and a maximum half angle of view at the wide angle end in the state where the infinite distance object is in focus is ωw, Conditional Expression (1) is satisfied, which is represented by $$0.35 < Bfw/(fw \times \tan|\omega w|) < 1.5. \quad (1)$$

It is preferable that the zoom lens according to the above-mentioned aspect satisfies Conditional Expression (1-1), and it is more preferable that the zoom lens satisfies Conditional Expression (1-2).

$$0.45 < Bfw/(fw \times \tan|\omega w|) < 1.1 \quad (1\text{-}1)$$

$$0.5 < Bfw/(fw \times \tan|\omega w|) < 0.85 \quad (1\text{-}2)$$

Assuming that an amount of movement of the focus group in a case of changing from the state in which the infinite distance object is in focus to a state in which an imaging magnification is −0.1 times, at a telephoto end, is Dfoct, and a difference in a direction of the optical axis between a position of a lens surface closest to the object side in the middle group at the telephoto end and a position of the lens surface closest to the object side in the middle group at the wide angle end, in the state in which the infinite distance object is in focus, is DpM, it is preferable that the zoom lens according to the above-mentioned aspect satisfies Conditional Expression (2), which is represented by $$0.005 < |Dfoct/DpM| < 0.3. \quad (2)$$

Assuming that an effective diameter of a lens surface closest to the object side in the middle group is EDMf, and an effective diameter of a lens surface closest to the image side in the middle group is EDMr, it is preferable that the zoom lens according to the above-mentioned aspect satisfies Conditional Expression (3), which is represented by $$0.3 < EDMf/EDMr < 1.5. \quad (3)$$

Assuming that a sum of Bfw and a distance on the optical axis from a lens surface closest to the object side in the first lens group at the wide angle end to a lens surface closest to the image side in the final group at the wide angle end is TLw, it is preferable that the zoom lens according to the above-mentioned aspect satisfies Conditional Expression (4), which is represented by $$2.5 < TLw/(fw \times \tan|\omega w|) < 7. \quad (4)$$

It is preferable that the middle group includes, in order from the object side to the image side, a front subgroup having a positive refractive power and a rear subgroup having a negative refractive power.

Assuming that an angle formed by the optical axis and a normal line of a lens surface at an effective diameter end of the lens surface is a and a unit of α is degrees, it is preferable that the rear subgroup includes one or more lens surfaces as convex surfaces being in contact with air and satisfying Conditional Expression (5), which is represented by $$13 < |\alpha| < 50. \quad (5)$$

It is preferable that a stop is disposed closest to the object side in the middle group or is disposed inside the middle group. Assuming that a distance on the optical axis from the stop to the lens surface as the convex surface at the wide angle end in the state where the infinite distance object is in focus is DStw, and a focal length of the rear subgroup at the wide angle end in the state where the infinite distance object is in focus is fMrw, it is preferable that the rear subgroup includes one or more lens surfaces as the convex surfaces satisfying Conditional Expression (6), which is represented by $$0.05 < DStw/|fMrw| < 2.5. \quad (6)$$

Assuming that a height of a principal ray from the optical axis at a maximum image height on a lens surface closest to the image side in the front subgroup at the wide angle end in the state where the infinite distance object is in focus is HMfb, a height of an on-axis marginal ray from the optical axis on the lens surface closest to the image side in the front subgroup at the wide angle end in the state where the infinite distance object is in focus is HMfa, a height of a principal ray from the optical axis at a maximum image height on a lens surface closest to the image side in the rear subgroup at the wide angle end in the state where the infinite distance object is in focus is HMrb, and a height of an on-axis marginal ray from the optical axis on the lens surface closest to the image side in the rear subgroup at the wide angle end in the state where the infinite distance object is in focus is HMra, it is preferable that the zoom lens according to the above-mentioned aspect satisfies Conditional Expression (7), which is represented by $$0.08 < (HMfb/HMfa)/(HMrb/HMra) < 0.8. \quad (7)$$

During focusing, at least a part of the rear subgroup may move along the optical axis, and the other group may remain stationary with respect to the image plane.

During focusing, at least a part of the front subgroup may move along the optical axis, and the other group may remain stationary with respect to the image plane.

It is preferable that the rear subgroup includes an image side negative lens of which an image side surface is a convex surface. In such a case, it is preferable that the rear subgroup includes an object side negative lens of which an object side surface is a convex surface, at a position closer to the object side than the image side negative lens.

Assuming that a paraxial curvature radius of a lens surface closest to the object side in the front subgroup is RMff, and a paraxial curvature radius of a lens surface closest to the image side in the front subgroup is RMfr, it is preferable that the zoom lens according to the above-mentioned aspect satisfies Conditional Expression (8), which is represented by $$-1 < (RMff + RMfr)/(RMff - RMfr) < 1. \quad (8)$$

Assuming that a distance from the image plane to an exit pupil position at the wide angle end in the state in which the infinite distance object is in focus is Pexpw, it is preferable that the zoom lens according to the above-mentioned aspect satisfies Conditional Expression (9), which is represented by $$0.5 < Pexpw/fw < 5. \quad (9)$$

It is preferable that the first lens group includes a negative meniscus lens of which an object side surface is a convex surface, at a position closest to the object side. Assuming that a paraxial curvature radius of the object side surface of the negative meniscus lens is R1f, and a paraxial curvature radius of an image side surface of the negative meniscus lens is R1r, it is preferable that the zoom lens according to the above-mentioned aspect satisfies Conditional Expression (10), which is represented by $$1 < (R1f + R1r)/(R1f - R1r) < 6. \quad (10)$$

It is preferable that the first lens group includes two or more negative meniscus lenses of which object side surfaces are convex surfaces.

Assuming that a refractive index of a positive lens included in the first lens group at a d line is N1p, it is preferable that the first lens group includes one or more positive lenses satisfying Conditional Expression (11), which is represented by $$1.6 < N1p < 2.15. \quad (11)$$

Assuming that a focal length of the first lens group is f1, it is preferable that the zoom lens according to the above-mentioned aspect satisfies Conditional Expression (12), which is represented by $$0.3 < fw/|f1| < 1.5. \quad (12)$$

Assuming that a focal length of the middle group at the wide angle end in the state where the infinite distance object is in focus is fMw, it is preferable that the zoom lens according to the above-mentioned aspect satisfies Conditional Expression (13), which is represented by $$0.4 < fw/fMw < 1.5. \quad (13)$$

Assuming that a focal length of the focus group is ffoc, it is preferable that the zoom lens according to the above-mentioned aspect satisfies Conditional Expression (14), which is represented by $$0.05 < fw/|ffoc| < 2.5. \quad (14)$$

Assuming that an average value of specific gravities of all lenses included in the middle group is GMave, it is preferable that the zoom lens according to the above-mentioned aspect satisfies Conditional Expression (15), which is represented by $$3 < GMave < 4.2. \quad (15)$$

Assuming that a temperature coefficient of a relative refractive index of a negative lens included in the first lens group at a d line in a range of 20° C. to 40° C. is $(dN1n/dT)\times10^{-6}$ and a unit of dN1n/dT is $K^{-1}$ (Kelvin), it is preferable that the first lens group includes one or more negative lenses satisfying Conditional Expression (16), which is represented by $$-15 < dN1n/dT < 0. \quad (16)$$

It is preferable that during zooming, the final group remains stationary with respect to the image plane.

The imaging apparatus according to another aspect of the present disclosure comprises the zoom lens according to the aspect of the present disclosure.

In the present specification, it should be noted that the terms "consisting of" and "consists of" mean that the lens may include not only the above-mentioned constituent elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, the term "group having a positive refractive power" means that the group has a positive refractive power as a whole. Similarly, the term "group having a negative refractive power" means that the group has a negative refractive power as a whole. The terms "a lens having a positive refractive power" and "a positive lens" are synonymous. The terms "a lens having a negative refractive power" and "a negative lens" are synonymous. The "first lens group", "middle group", "front subgroup", "rear subgroup", "final group", "focus group", and "vibration-proof group" each are configured to consist of a plurality of lenses. However, the configuration is not limited to this, and each group may be configured to consist of only one lens.

The term "a single lens" means one lens that is not cemented. Here, a compound aspherical lens (a lens in which a spherical lens and an aspherical film formed on the spherical lens are integrally formed and function as one aspherical lens as a whole) is not regarded as a cemented lens, but the compound aspherical lens is regarded as one lens. The sign of the refractive power and the surface shape of the lens including the aspherical surface will be used in terms of the paraxial region unless otherwise specified. The sign of the curvature radius of the surface convex toward the object side is positive, and the sign of the curvature radius of the surface convex toward the image side is negative.

In the present specification, the term "whole system" means "zoom lens". The "back focal length at the air conversion distance" is the air conversion distance on the optical axis from the lens surface closest to the image side in the whole system to the image plane. The "focal length" used in a conditional expression is a paraxial focal length. The values used in conditional expressions are values in a case where the d line is used as a reference in a state where the infinite distance object is in focus. The "tan" used in conditional expressions is a tangent.

The "d line", "C line", "F line", and "g line" described in the present specification are emission lines. In this specification, it is assumed that the d line wavelength is 587.56 nm (nanometers), the C line wavelength is 656.27 nm (nanometers), the F line wavelength is 486.13 nm (nanometers), and the g line wavelength is 435.84 nm (nanometers). The partial dispersion ratio θgF between the g line and the F line of a certain lens is defined by $\theta gF=(Ng-NF)/(NF-NC)$, where Ng, NF, and NC are the refractive indices of the lens at the g line, the F line, and the C line.

According to the present disclosure, it is possible to provide a compact and lightweight zoom lens having a large image circle and high optical performance, and an imaging apparatus comprising the zoom lens.

BRIEF DESCRIPTION OF THE DRAWINGS

FIG. 5 is a diagram for explaining a.

DESCRIPTION OF EMBODIMENTS

Hereinafter, embodiments of the present disclosure will be described with reference to the accompanying drawings.

Figure 1:
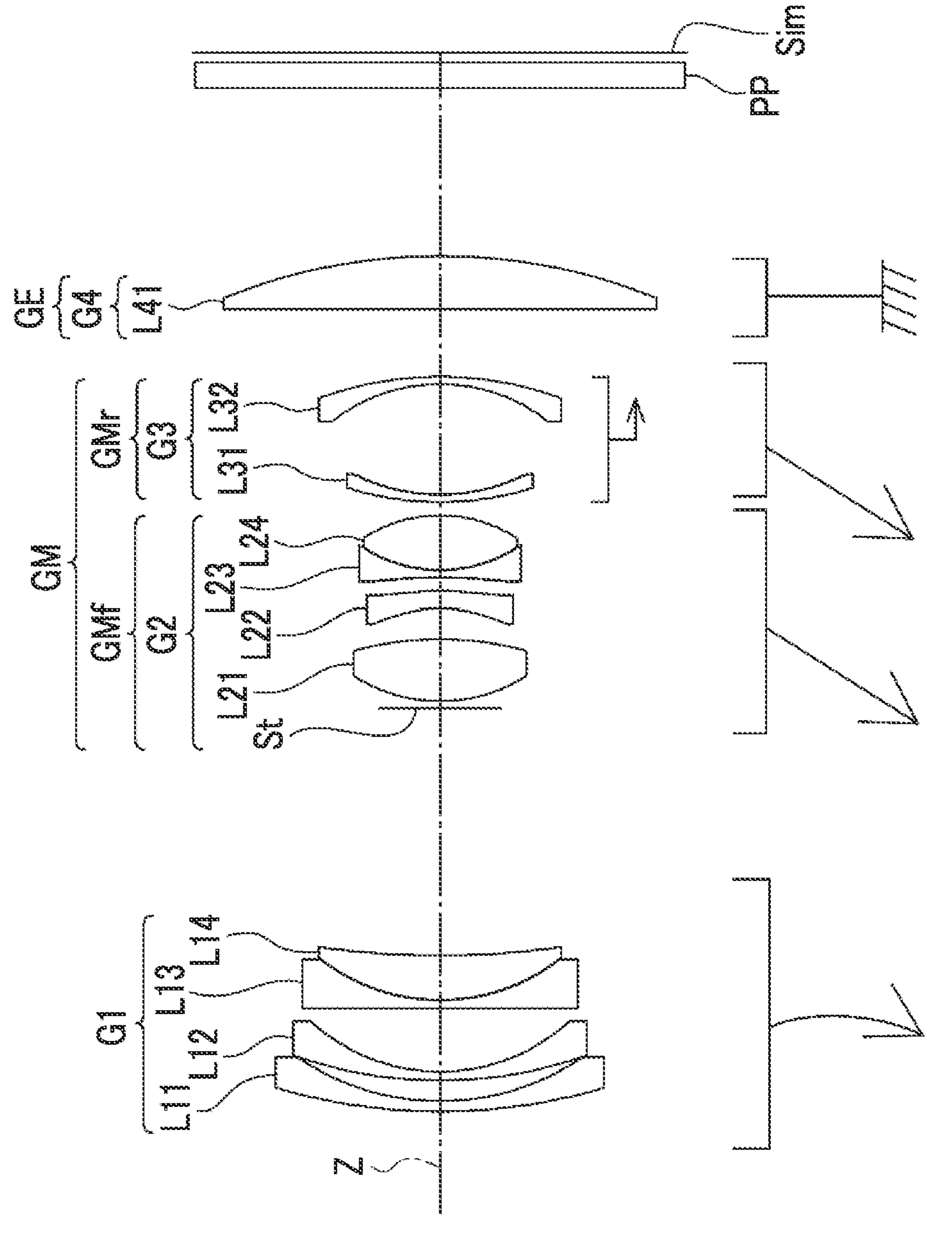
FIG. 1 is a cross-sectional view showing a configuration of a zoom lens according to an embodiment and a diagram showing movement loci thereof, the zoom lens corresponding to a zoom lens of Example 1.
Figure 2:
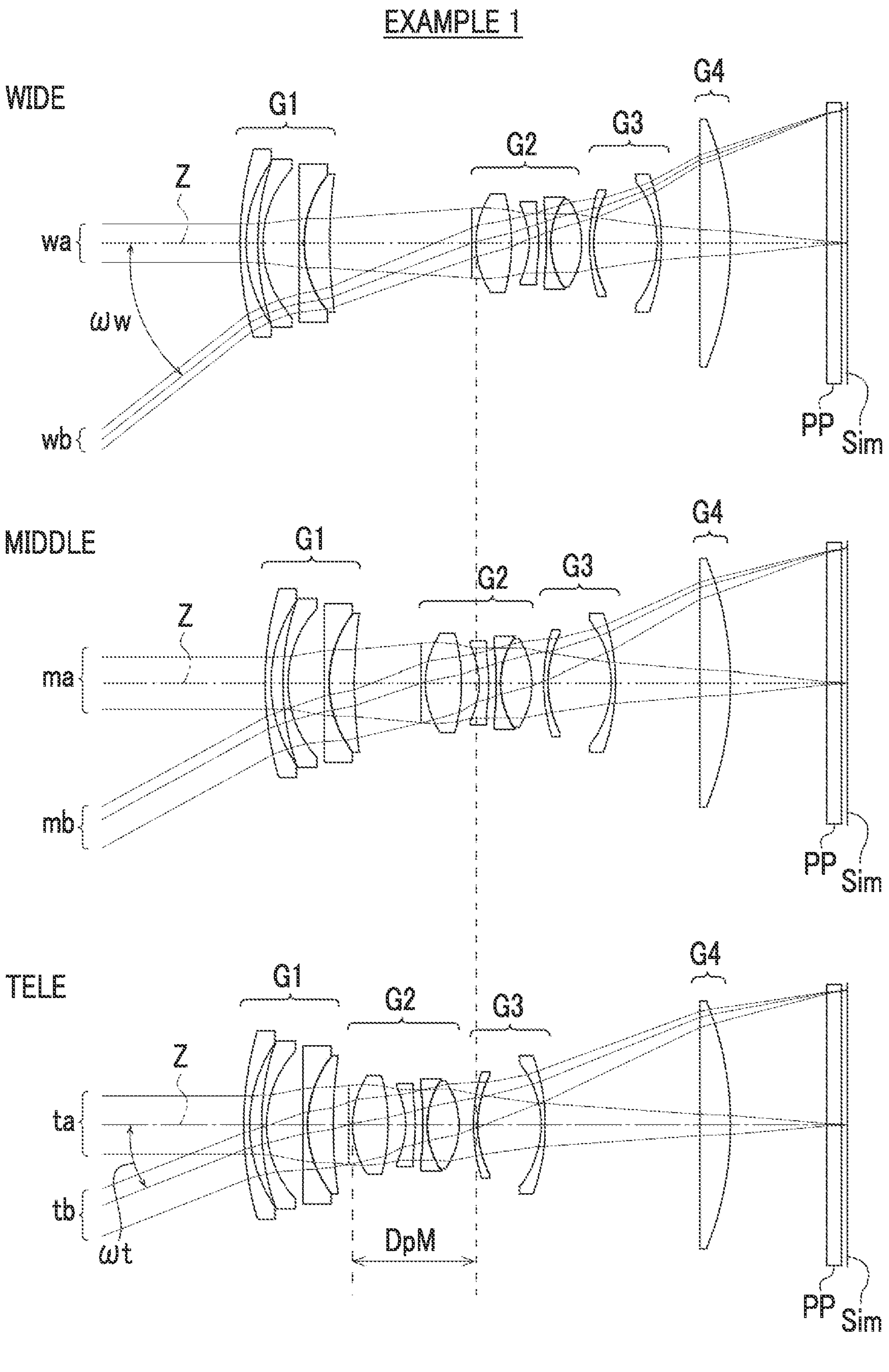
FIG. 2 is a diagram showing a configuration and luminous flux in each zooming state of the zoom lens of FIG. 1.

FIG. 1 shows a cross-sectional view of a configuration and movement loci of a zoom lens according to an embodiment of the present disclosure at a wide angle end. FIG. 2 shows a cross-sectional view of the configuration and luminous flux of this zoom lens in each zooming state. The examples shown in FIGS. 1 and 2 correspond to a zoom lens of Example 1 described later. FIGS. 1 and 2 show situations where an infinite distance object is in focus, the left side thereof is an object side, and the right side thereof is an image side. In FIG. 2, the upper part labeled "WIDE" shows the wide angle end state, the middle part labeled "MIDDLE" shows the middle focal length state, and the lower part labeled "TELE" shows the telephoto end state. FIG. 2 shows luminous flux including on-axis luminous flux wa and luminous flux at a maximum image height wb at the wide angle end state, on-axis luminous flux ma and luminous flux at a maximum image height mb at the middle focal length state, and on-axis luminous flux ta and luminous flux at a maximum image height tb at the telephoto end state. Hereinafter, the zoom lens according to the embodiment of the present disclosure will be described mainly with reference to FIG. 1.

The zoom lens according to the embodiment of the present disclosure consists of a first lens group G1 having a negative refractive power, a middle group GM, and a final group GE in order from the object side to the image side. During zooming, a spacing between the first lens group G1 and the middle group GM changes, and a spacing between the middle group GM and the final group GE changes. By adopting a lens system having a negative lens group in the leading part, an entrance pupil can be positioned closer to the object side. As a result, there is an advantage in ensuring the amount of peripheral light.

The middle group GM is a group including one or more lens groups. The number of lens groups included in the middle group GM can be set optionally, but it is preferable that the number is one, two, or three in order to reduce the size and the weight. Further, in order to reduce the size and the weight, it is preferable that the final group GE consists of one lens group. It should be noted that the term "lens group" in the present specification refers to a part including at least one lens, which is a constituent part of the zoom lens and is divided by an air spacing that changes during zooming. During zooming, the lens groups move or remain stationary, and the mutual spacing between the lenses in one lens group does not change.

During focusing, at least a part of the middle group GM moves along an optical axis Z as a focus group, and the first lens group G1 and the final group GE remain stationary with respect to an image plane Sim. In the present specification, the group that moves during focusing is referred to as a "focus group". Focusing is performed by moving the focus group. By forming the focus group with the lenses of the middle group GM having a relatively small lens diameter, there is an advantage in achieving reduction in size of the focus unit, which also contributes to reduction in size of the whole system.

The middle group GM can be configured to include a front subgroup GMf having a positive refractive power and a rear subgroup GMr having a negative refractive power in order from the object side to the image side. In such a case, there is an advantage in suppressing change in performance during zooming.

For example, the zoom lens of FIG. 1 consists of, in order from the object side to the image side along the optical axis Z, a first lens group G1, a second lens group G2, a third lens group G3, and a fourth lens group G4. The correspondence relationship between each of the above groups and the example of FIG. 1 is as follows. The middle group GM consists of the second lens group G2 and the third lens group G3. The front subgroup GMf corresponds to the second lens group G2. The rear subgroup GMr corresponds to the third lens group G3. The final group GE corresponds to the fourth lens group G4.

Each lens group in FIG. 1 is configured as follows. The first lens group G1 consists of four lenses L11 to L14 in order from the object side to the image side. The second lens group G2 consists of an aperture stop St and four lenses L21 to L24 in order from the object side to the image side. The third lens group G3 consists of two lenses L31 and L32 in order from the object side to the image side. The fourth lens group G4 consists of one lens L41. It should be noted that the aperture stop St shown in FIG. 1 does not indicate a shape thereof, but indicates a position thereof in the direction of the optical axis.

FIG. 1 shows an example in which, assuming that a zoom lens is applied to an imaging apparatus, an optical member PP having a parallel plate shape is disposed between the zoom lens and the image plane Sim. The optical member PP is a member assumed to include various filters, a cover glass, and/or the like. The various filters include a low pass filter, an infrared cut filter, and/or a filter that cuts a specific wavelength region. The optical member PP is a member that has no refractive power. It is also possible to configure the imaging apparatus by removing the optical member PP.

In the example of FIG. 1, during zooming, the first lens group G1, the second lens group G2, and the third lens group G3 move along the optical axis Z by changing distances from adjacent lens groups thereof in the direction of the optical axis, and the fourth lens group G4 remains stationary with respect to the image plane Sim. In FIG. 1, a curved arrow or an oblique arrow indicating a rough movement locus during zooming from the wide angle end to the telephoto end is shown below the lens group that moves during zooming, and a ground symbol is shown below the lens group that remains stationary during zooming.

In the example of FIG. 1, the third lens group G3 moves along the optical axis Z during focusing, and the other lens groups remain stationary with respect to the image plane Sim. That is, in the example of FIG. 1, the focus group consists of the third lens group G3. A horizontal arrow pointing to the right below the third lens group G3 in FIG. 1 indicates that the third lens group G3 is a focus group that moves toward the image side during focusing from the infinite distance object to a short range object.

Next, preferable and possible configurations of the zoom lens of the present disclosure will be described. In the following description of preferable and possible configurations, the "zoom lens of the present disclosure" is also simply referred to as a "zoom lens" in order to avoid redundancy.

Assuming that a back focal length of the whole system at an air conversion distance at the wide angle end in the state where the infinite distance object is in focus is Bfw, a focal length of the whole system at the wide angle end in the state where the infinite distance object is in focus is fw, and a maximum half angle of view at the wide angle end in the state where the infinite distance object is in focus is ωw, it is preferable that the zoom lens satisfies Conditional Expression (1). FIG. 2 shows an example of ωw. By not allowing the corresponding value of Conditional Expression (1) to be equal to or less than the lower limit, the back focal length is prevented from becoming excessively short with respect to the image circle. As a result, there is an advantage in achieving reduction in diameter of the final group GE. By not allowing the corresponding value of Conditional Expression (1) to be equal to or greater than the upper limit, the back focal length is prevented from becoming excessively long with respect to the image circle. As a result, there is an advantage in achieving reduction in total length. In order to obtain more favorable characteristics, it is more preferable that the zoom lens satisfies Conditional Expression (1-1), and it is yet more preferable that the zoom lens satisfies Conditional Expression (1-2).

$$0.35 < Bfw/(fw \times \tan|\omega w|) < 1.5 \quad (1)$$

$$0.45 < Bfw/(fw \times \tan|\omega w|) < 1.1 \quad (1\text{-}1)$$

$$0.5 < Bfw/(fw \times \tan|\omega w|) < 0.85 \quad (1\text{-}2)$$

Figure 3:
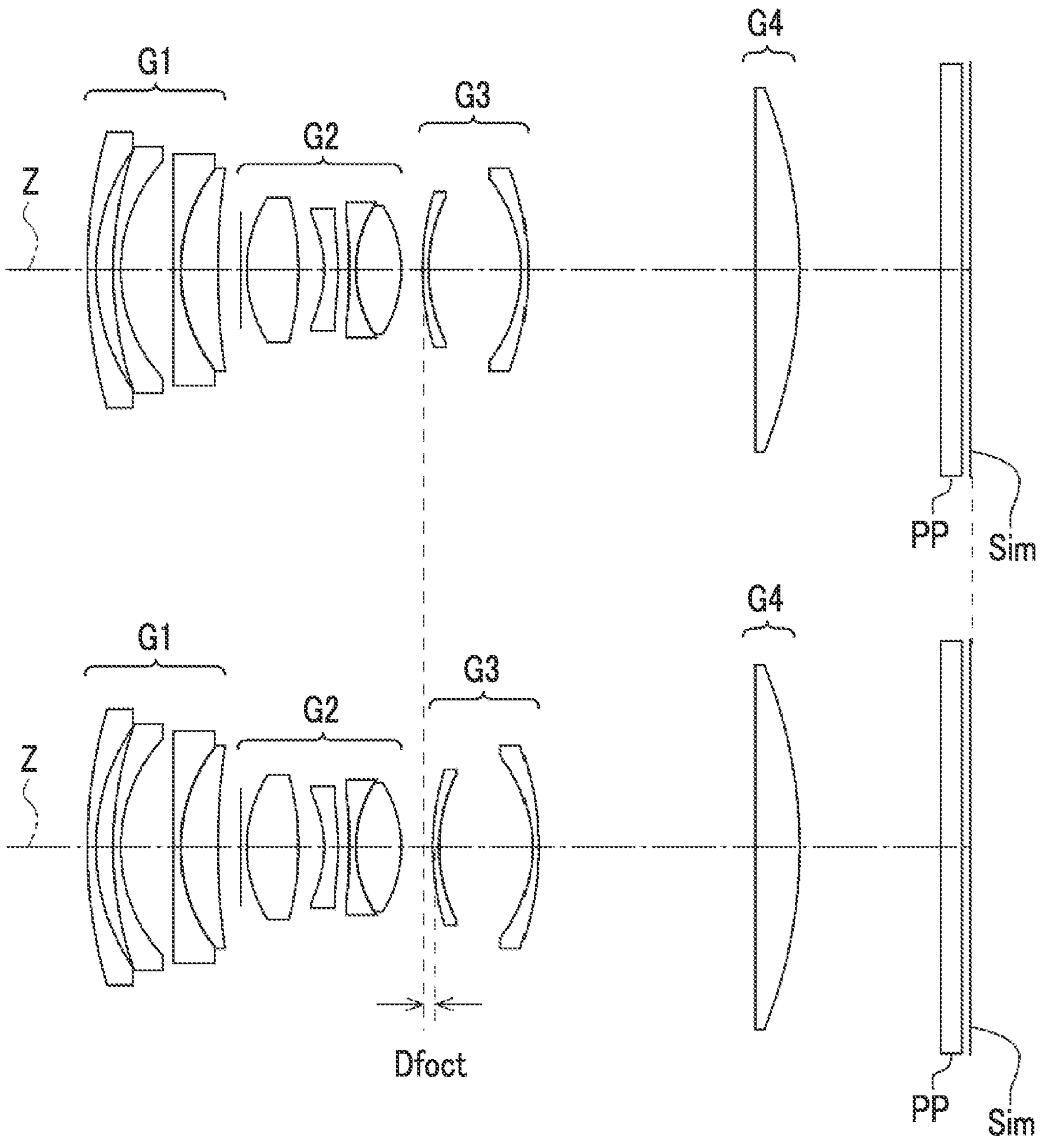
FIG. 3 is a diagram for explaining Dfoct.

Assuming that an amount of movement of the focus group in a case of changing from the state in which the infinite distance object is in focus to a state in which an imaging magnification is −0.1 times, at a telephoto end, is Dfoct, and a difference in a direction of the optical axis between a position of a lens surface closest to the object side in the middle group GM at the telephoto end and a position of the lens surface closest to the object side in the middle group GM at the wide angle end, in the state in which the infinite distance object is in focus, is DpM, it is preferable that the zoom lens satisfies Conditional Expression (2). As an example, FIG. 2 shows DpM and FIG. 3 shows Dfoct. In FIG. 3, the upper part shows a state in which the infinite distance object at the telephoto end is in focus, and the lower part shows a state in which the imaging magnification at the telephoto end is −0.1 times. By not allowing the corresponding value of Conditional Expression (2) to be equal to or less than the lower limit, it is possible to suppress the strictness of the position accuracy of the focus group during focusing. Therefore, control therefor is made to be easy. By not allowing the corresponding value of Conditional Expression (2) to be equal to or greater than the upper limit, it is possible to suppress an increase in amount of movement of the focus group during focusing. As a result, it is possible to suppress an increase in size of the focus unit. As a result, there is an advantage in achieving reduction in overall size and weight. In order to obtain more favorable characteristics, it is more preferable that the zoom lens satisfies Conditional Expression (2-1), and it is yet more preferable that the zoom lens satisfies Conditional Expression (2-2).

$$0.005 < |Dfoct/DpM| < 0.3 \quad (2)$$

$$0.015 < |Dfoct/DpM| < 0.15 \quad (2\text{-}1)$$

$$0.03 < |Dfoct/DpM| < 0.115 \quad (2\text{-}2)$$

Assuming that an effective diameter of a lens surface closest to the object side in the middle group GM is EDMf, and an effective diameter of a lens surface closest to the image side in the middle group GM is EDMr, it is preferable that the zoom lens satisfies Conditional Expression (3). Normally, the focus unit is located radially outside the effective diameter of the middle group GM. Therefore, the difference in the ratio between the effective diameter of the lens surface closest to the object side in the middle group GM and the effective diameter of the lens surface closest to the image side in the middle group GM leads to an increase in size of the focus unit. Therefore, by satisfying Conditional Expression (3), it is possible to suppress an increase in size of the focus unit. As a result, there is an advantage in achieving reduction in overall size and weight. In order to obtain more favorable characteristics, it is more preferable that the zoom lens satisfies Conditional Expression (3-1), and it is yet more preferable that the zoom lens satisfies Conditional Expression (3-2).

$$0.3 < EDMf/EDMr < 1.5 \quad (3)$$

$$0.4 < EDMf/EDMr < 1 \quad (3\text{-}1)$$

$$0.5 < EDMf/EDMr < 0.85 \quad (3\text{-}2)$$

In the technique of the present disclosure, twice the distance to the optical axis Z from the intersection between the lens surface and the ray passing through the outermost side among rays incident onto the lens surface from the object side and emitted to the image side is the "effective diameter" of the lens surface. The "outside" here is the radial outside centered on the optical axis Z, that is, the side separated from the optical axis Z. In addition, the "ray passing through the outermost side" is determined in consideration of the entire area of zooming.

Figure 4:
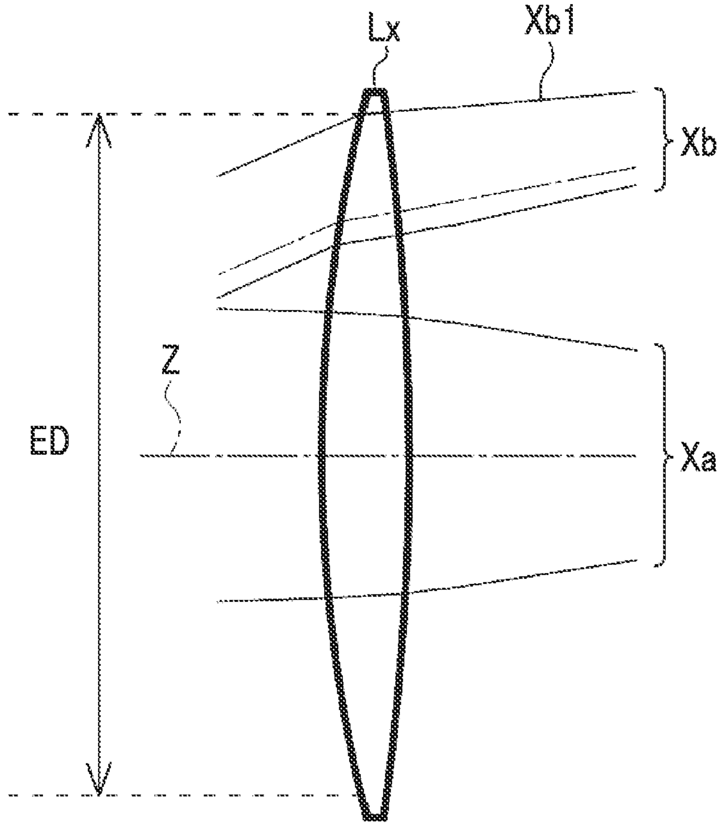
FIG. 4 is a diagram for explaining an effective diameter.

As an explanatory diagram, FIG. 4 shows an example of an effective diameter ED. In FIG. 4, the left side is the object side, and the right side is the image side. FIG. 4 shows an on-axis luminous flux Xa and an off-axis luminous flux Xb passing through a lens Lx. In the example of FIG. 4, a ray Xb1, which is the upper ray of the off-axis luminous flux Xb, is the ray passing through the outermost side. Therefore, in the example of FIG. 4, twice the distance to the optical axis Z from the intersection between the ray Xb1 and the object side surface of the lens Lx is the effective diameter ED of the object side surface of the lens Lx. In FIG. 4, the upper ray of the off-axis luminous flux Xb is the ray passing through the outermost side, but which ray is the ray passing through the outermost side depends on the optical system.

Assuming that a back focal length of the whole system at the wide angle end in the state in which the infinite distance object is in focus is Bfw, a focal length of the whole system at the wide angle end in the state in which the infinite distance object is in focus is fw, a maximum half angle of view at the wide angle end in the state where the infinite distance object is in focus is ωw, and a sum of Bfw and a distance on the optical axis from a lens surface closest to the object side in the first lens group G1 at the wide angle end to a lens surface closest to the image side in the final group GE at the wide angle end is TLw, it is preferable that the zoom lens satisfies Conditional Expression (4). By not allowing the corresponding value of Conditional Expression (4) to be equal to or less than the lower limit, it is easy to provide a zoom lens having high optical performance. By not allowing the corresponding value of Conditional Expression (4) to be equal to or greater than the upper limit, it is easy to provide a compact and lightweight camera system. In order to obtain more favorable characteristics, it is more preferable that the zoom lens satisfies Conditional Expression (4-1), and it is yet more preferable that the zoom lens satisfies Conditional Expression (4-2).

$$2.5 < TLw/(fw \times \tan|\omega w|) < 7 \tag{4}$$

$$2.75 < TLw/(fw \times \tan|\omega w|) < 5.75 \tag{4-1}$$

$$3 < TLw/(fw \times \tan|\omega w|) < 5 \tag{4-2}$$

Figure 5:
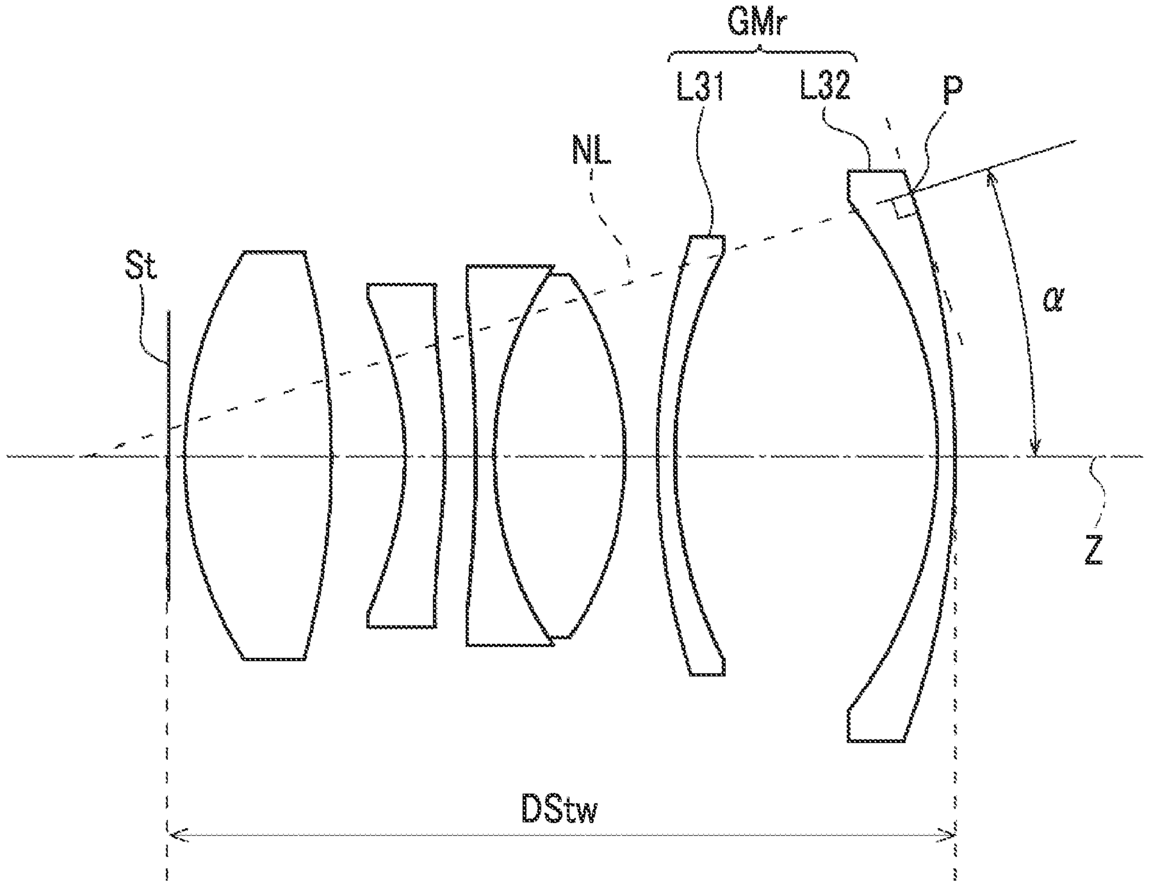

Assuming that an angle formed by the optical axis Z and a normal line NL of a lens surface at an effective diameter end of the lens surface is α, it is preferable that the rear subgroup GMr includes one or more lens surfaces as convex surfaces being in contact with air and satisfying Conditional Expression (5). In Conditional Expression (5), the unit of α is degrees. As an example, FIG. 5 shows the normal line NL of this surface at an effective diameter end P of the image side surface of the lens L32 with a broken line, and shows an angle α formed by the normal line NL and the optical axis Z. In FIG. 5, some reference numerals are not repeated. The effective diameter end P is the intersection between the ray passing through the outermost side and the lens surface in the above definition of the effective diameter. By not allowing the corresponding value of Conditional Expression (5) to be equal to or less than the lower limit, the refractive power acting on the off-axis luminous flux is prevented from becoming excessively weak. Therefore, it is possible to suppress the incident angle of the off-axis principal ray on the image plane Sim from becoming large. As a result, there is an advantage in ensuring the amount of peripheral light. By not allowing the corresponding value of Conditional Expression (5) to be equal to or greater than the upper limit, it is possible to suppress an increase in processing difficulty of the convex surface. As a result, there is an advantage in ensuring surface accuracy. In order to obtain more favorable characteristics, instead of Conditional Expression (5), it is more preferable that the zoom lens satisfies Conditional Expression (5-1), and it is yet more preferable that the zoom lens satisfies Conditional Expression (5-2).

$$13 < |\alpha| < 50 \tag{5}$$

$$15 < |\alpha| < 40 \tag{5-1}$$

$$17 < |\alpha| < 30 \tag{5-2}$$

It is preferable that the aperture stop St is disposed closest to the object side in the middle group GM or is disposed inside the middle group GM. The configuration in which the aperture stop St is disposed inside the middle group GM means a configuration in which one or more lenses are disposed on both the object side and the image side of the aperture stop St in the middle group GM. In a case where the aperture stop St is disposed closest to the object side in the middle group GM, it is possible to suppress an increase in incident angle of the off-axis principal ray on the image plane Sim. As a result, there is an advantage in ensuring the amount of peripheral light. Further, there is an advantage in achieving reduction in lens diameter of the first lens group G1. In a case where the aperture stop St is disposed inside the middle group GM, the optical symmetry is improved. As a result, there is an advantage in suppressing distortion and field curvature.

In a configuration in which the aperture stop St is disposed closest to the object side in the middle group GM or is disposed inside the middle group GM, it is preferable that the rear subgroup GMr includes one or more lens surfaces as the convex surfaces being in contract with the air satisfying Conditional Expression (5) and Conditional Expression (6). In Conditional Expression (6), a distance on the optical axis from the aperture stop St to the lens surface as the convex surface at the wide angle end in the state in which the infinite distance object is in focus is DStw, and a focal length of the rear subgroup GMr at the wide angle end in the state in which the infinite distance object is in focus is fMrw. By not allowing the corresponding value of Conditional Expression (6) to be equal to or less than the lower limit, a degree of separation between the on-axis luminous flux and the off-axis luminous flux on the lens surface as the convex surface is prevented from becoming excessively small. Therefore, there is an advantage in suppressing field curvature. By not allowing the corresponding value of Conditional Expression (6) to be equal to or greater than the upper limit, there is an advantage in achieving reduction in size of the optical system. In order to obtain more favorable characteristics, instead of Conditional Expression (6), it is more preferable that the zoom lens satisfies Conditional Expression (6-1), and it is yet more preferable that the zoom lens satisfies Conditional Expression (6-2).

$$0.05 < DStw/|fMrw| < 2.5 \tag{6}$$

$$0.35 < DStw/|fMrw| < 2 \tag{6-1}$$

$$0.5 < DStw/|fMrw| < 1.65 \tag{6-2}$$

Figure 6:
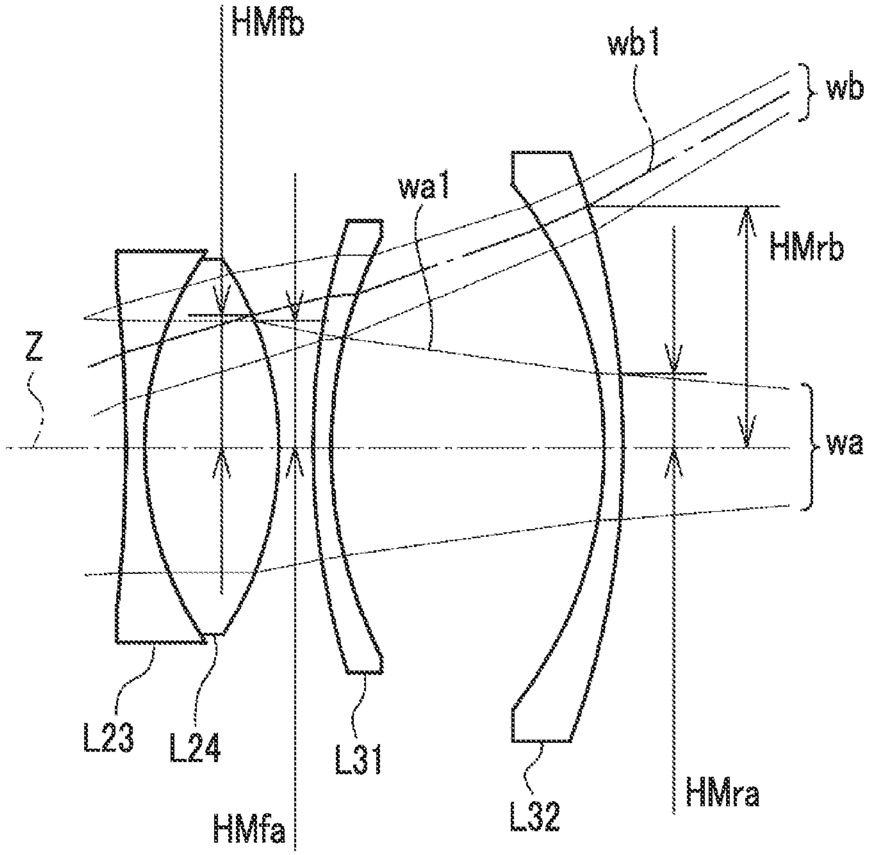
FIG. 6 is a diagram for explaining symbols of Conditional Expression (7).

It is preferable that the zoom lens satisfies Conditional Expression (7) with respect to an on-axis marginal ray wa1 and a principal ray wb1 having the maximum image height at the wide angle end in the state where the infinite distance object is in focus. The symbols used in Conditional Expression (7) are shown in FIG. 6 as an example. FIG. 6 shows a part of the middle group GM at the wide angle end of the zoom lens of FIG. 1 and an enlarged view of the luminous flux. HMfb is a height of the principal ray at the maximum image height from the optical axis Z on the lens surface closest to the image side in the front subgroup GMf at the wide angle end in a state where an infinite distance object is in focus. HMfa is a height of the on-axis marginal ray from the optical axis Z on the lens surface closest to the image side in the front subgroup GMf at the wide angle end in the state where the infinite distance object is in focus. HMrb is a height of the principal ray from the optical axis Z at the maximum image height on the lens surface closest to the image side in the rear subgroup GMr at the wide angle end in the state where the infinite distance object is in focus. HMra is a height of the on-axis marginal ray on the lens surface closest to the image side in the rear subgroup GMr at the wide angle end in the state where the infinite distance object is in focus from the optical axis Z. By not allowing the corresponding value of Conditional Expression (7) to be equal to or less than the lower limit, the height of the off-axis luminous flux from the optical axis Z in the rear subgroup GMr is prevented from becoming excessively high. Therefore, it is possible to minimize the amount of refraction in the final group GE. There is an advantage in correcting distortion. By not allowing the corresponding value of Conditional Expression (7) to be equal to or greater than the upper limit, the degree of separation between the on-axis luminous flux and the off-axis luminous flux in the rear subgroup GMr is prevented from becoming excessively small. Therefore, there is an advantage in correcting aberrations of the off-axis luminous flux. In order to obtain more favorable characteristics, it is more preferable that the zoom lens satisfies Conditional Expression (7-1), and it is yet more preferable that the zoom lens satisfies Conditional Expression (7-2).

$$0.08 < (HMfb/HMfa)/(HMrb/HMra) < 0.8 \quad (7)$$

$$0.1 < (HMfb/HMfa)/(HMrb/HMra) < 0.6 \quad (7\text{-}1)$$

$$0.12 < (HMfb/HMfa)/(HMrb/HMra) < 0.52 \quad (7\text{-}2)$$

In a case where the paraxial curvature radius of the lens surface closest to the object side in the front subgroup GMf is RMff and the paraxial curvature radius of the lens surface closest to the image side in the front subgroup GMf is RMfr, it is preferable that the zoom lens satisfies Conditional Expression (8). By not allowing the corresponding value of Conditional Expression (8) to be equal to or less than the lower limit, there is an advantage in suppressing insufficiency in correction of field curvature. By not allowing the corresponding value of Conditional Expression (8) to be equal to or greater than the upper limit, there is an advantage in suppressing overcorrection of field curvature. In order to obtain more favorable characteristics, it is more preferable that the zoom lens satisfies Conditional Expression (8-1), and it is yet more preferable that the zoom lens satisfies Conditional Expression (8-2).

$$-1 < (RMff + RMfr)/(RMff - RMfr) < 1 \quad (8)$$

$$-0.5 < (RMff + RMfr)/(RMff - RMfr) < 0.3 \quad (8\text{-}1)$$

$$-0.3 < (RMff + RMfr)/(RMff - RMfr) < 0.15 \quad (8\text{-}2)$$

Assuming that a focal length of the whole system at the wide angle end in the state where the infinite distance object is in focus is fw, and a focal length of the middle group GM at the wide angle end in the state where the infinite distance object is in focus is fMw, it is preferable that the zoom lens satisfies Conditional Expression (13). By not allowing the corresponding value of Conditional Expression (13) to be equal to or less than the lower limit, the amount of movement of the middle group GM during zooming is prevented from becoming excessively large. Thus, there is an advantage in reducing the total length. By not allowing the corresponding value of Conditional Expression (13) to be equal to or greater than the upper limit, there is an advantage in suppressing fluctuation in aberrations during zooming. In order to obtain more favorable characteristics, it is more preferable that the zoom lens satisfies Conditional Expression (13-1), and it is yet more preferable that the zoom lens satisfies Conditional Expression (13-2).

$$0.4 < fw/fMw < 1.5 \quad (13)$$

$$0.5 < fw/fMw < 1.35 \quad (13\text{-}1)$$

$$0.6 < fw/fMw < 1.2 \quad (13\text{-}2)$$

Assuming that a focal length of the whole system at the wide angle end in the state where the infinite distance object is in focus is fw, and a focal length of the focus group is ffoc, it is preferable that the zoom lens satisfies Conditional Expression (14). By not allowing the corresponding value of Conditional Expression (14) to be equal to or less than the lower limit, the amount of movement of the focus group during focusing is prevented from becoming excessively large. Thus, there is an advantage in achieving reduction in size of the focus unit. By not allowing the corresponding value of Conditional Expression (14) to be equal to or greater than the upper limit, it is possible to suppress the strictness of the position accuracy of the focus group during focusing. Therefore, control therefor is made to be easy. In order to obtain more favorable characteristics, it is more preferable that the zoom lens satisfies Conditional Expression (14-1), and it is yet more preferable that the zoom lens satisfies Conditional Expression (14-2).

$$0.05 < fx/|ffoc| < 2.5 \quad (14)$$

$$0.08 < fx/|ffoc| < 2 \quad (14\text{-}1)$$

$$0.12 < fx/|ffoc| < 1.5 \quad (14\text{-}2)$$

In a case where the average value of the specific gravities of all the lenses included in the middle group GM is GMave, it is preferable that the zoom lens satisfies Conditional Expression (15). By not allowing the corresponding value of Conditional Expression (15) to be equal to or less than the lower limit, the range of materials that can be used for the middle group GM can be increased. As a result, there is an advantage in correcting longitudinal chromatic aberration. By not allowing the corresponding value of Conditional Expression (15) to be equal to or greater than the upper limit, the middle group GM is prevented from becoming excessively heavy. Therefore, it is possible to suppress an increase in size of the mechanism that drives the lens during zooming and/or focusing. In order to obtain more favorable characteristics, it is more preferable that the zoom lens satisfies Conditional Expression (15-1), and it is yet more preferable that the zoom lens satisfies Conditional Expression (15-2).

$$3 < GMave < 4.2 \quad (15)$$

$$3.1 < GMave < 4 \quad (15\text{-}1)$$

$$3.2 < GMave < 3.85 \quad (15\text{-}2)$$

Assuming that a partial dispersion ratio of the positive lens of the middle group GM between the g line and the F line is θMp and an Abbe number based on the d line is νMp, it is preferable that the zoom lens satisfies Conditional Expression (18). By not allowing the corresponding value of Conditional Expression (18) to be equal to or less than the lower limit, there is an advantage in suppressing insufficiency in correction of secondary spectrum of longitudinal chromatic aberration. By not allowing the corresponding value of Conditional Expression (18) to be equal to or greater than the upper limit, there is an advantage in suppressing overcorrection of secondary spectrum of longitudinal chromatic aberration. In order to obtain more favorable characteristics, it is more preferable that the zoom lens satisfies Conditional Expression (18-1), and it is yet more preferable that the zoom lens satisfies Conditional Expression (18-2).

$$0.01 < \theta Mp + 0.0018 \times \nu Mp - 0.64833 < 0.06 \quad (18)$$

$$0.017 < \theta Mp + 0.0018 \times \nu Mp - 0.64833 < 0.05 \quad (18\text{-}1)$$

$$0.022 < \theta Mp + 0.0018 \times \nu Mp - 0.64833 < 0.04 \quad (18\text{-}2)$$

Assuming that a focal length of the front subgroup GMf at the wide angle end in the state where the infinite distance object is in focus is fMfw, and a focal length of the rear subgroup GMr at the wide angle end in the state where the infinite distance object is in focus is fMrw, it is preferable that the zoom lens satisfies Conditional Expression (26). By not allowing the corresponding value of Conditional Expression (26) to be equal to or less than the lower limit, the refractive power of the rear subgroup GMr is prevented from becoming excessively weak. Thus, there is an advantage in correcting field curvature. By not allowing the corresponding value of Conditional Expression (26) to be equal to or greater than the upper limit, the refractive power of the front subgroup GMf is prevented from becoming excessively weak. Thus, there is an advantage in correcting spherical aberration. In order to obtain more favorable characteristics, it is more preferable that the zoom lens satisfies Conditional Expression (26-1), and it is yet more preferable that the zoom lens satisfies Conditional Expression (26-2).

$$0.25 < fMfw/|fMrw| < 2 \quad (26)$$

$$0.3 < fMfw/|fMrw| < 1.75 \quad (26\text{-}1)$$

$$0.35 < fMfw/|fMrw| < 1.5 \quad (26\text{-}2)$$

Assuming that a sum of the air spacing on the optical axis between the lens surface closest to the object side in the rear subgroup GMr and the lens surface closest to the image side in the rear subgroup GMr at the wide angle end in the state where the infinite distance object is in focus is DMra and a distance on the optical axis from the lens surface closest to the object side in the rear subgroup GMr to the lens surface closest to the image side in the rear subgroup GMr at the wide angle end in the state where the infinite distance object is in focus is DMrt, it is preferable that the zoom lens satisfies Conditional Expression (21). By not allowing the corresponding value of Conditional Expression (21) to be equal to or less than the lower limit, it is possible to suppress an increase in weight of the rear subgroup GMr. As a result, there is an advantage in achieving reduction in weight of the drive mechanism. By not allowing the corresponding value of Conditional Expression (21) to be equal to or greater than the upper limit, the aberration correction effect of the rear subgroup GMr can be ensured. As a result, there is an advantage in suppressing fluctuation in aberrations during zooming. In order to obtain more favorable characteristics, it is more preferable that the zoom lens satisfies Conditional Expression (21-1), and it is yet more preferable that the zoom lens satisfies Conditional Expression (21-2).

$$0.2 < DMra/DMrt < 0.95 \quad (21)$$

$$0.35 < DMra/DMrt < 0.92 \quad (21\text{-}1)$$

$$0.6 < DMra/DMrt < 0.9 \quad (21\text{-}2)$$

It is preferable that the rear subgroup GMr includes an image side negative lens of which the image side surface is convex. In such a case, there is an advantage in suppressing field curvature. Further, it is preferable that the rear subgroup GMr includes an object side negative lens of which the object side surface is a convex surface closer to the object side than the image side negative lens. In such a case, there is an advantage in suppressing spherical aberration. In the example of FIG. 1, the object side negative lens corresponds to the lens L31, and the image side negative lens corresponds to the lens L32.

Assuming that a paraxial curvature radius of the image side surface of the object side negative lens is Rnor and a paraxial curvature radius of the object side surface of the image side negative lens is Rnif, it is preferable that the rear subgroup GMr includes one or more pairs of the object side negative lens and the image side negative lens satisfying Conditional Expression (22). By not allowing the corresponding value of Conditional Expression (22) to be equal to or less than the lower limit, there is an advantage in suppressing spherical aberration. By not allowing the corresponding value of Conditional Expression (22) to be equal to or greater than the upper limit, there is an advantage in suppressing field curvature. In order to obtain more favorable characteristics, instead of Conditional Expression (22), it is more preferable that the zoom lens satisfies Conditional Expression (22-1), and it is yet more preferable that the zoom lens satisfies Conditional Expression (22-2).

$$-1.5 < (Rnor + Rnif)/(Rnor - Rnif) < 1 \quad (22)$$

$$-1.2 < (Rnor + Rnif)/(Rnor - Rnif) < 0.5 \quad (22\text{-}1)$$

$$-0.8 < (Rnor + Rnif)/(Rnor - Rnif) < 0.25 \quad (22\text{-}2)$$

Assuming that a focal length of the whole system at the wide angle end in the state where the infinite distance object is in focus is fw, and a focal length of the rear subgroup GMr at the wide angle end in the state where the infinite distance object is in focus is fMrw, it is preferable that the zoom lens satisfies Conditional Expression (25). By not allowing the corresponding value of Conditional Expression (25) to be equal to or less than the lower limit, the refractive power of the rear subgroup GMr is prevented from becoming excessively weak. Thus, there is an advantage in correcting field curvature. By not allowing the corresponding value of Conditional Expression (25) to be equal to or greater than the upper limit, the refractive power of the rear subgroup GMr is prevented from becoming excessively strong. As a result, there is an advantage in achieving reduction in diameter of the final group GE. In order to obtain more favorable characteristics, it is more preferable that the zoom lens satisfies Conditional Expression (25-1), and it is yet more preferable that the zoom lens satisfies Conditional Expression (25-2).

$$0.15 < fw/|fMrw| < 2 \tag{25}$$

$$0.22 < fw/|fMrw| < 1.75 \tag{25-1}$$

$$0.28 < fw/|fMrw| < 1.5 \tag{25-2}$$

Assuming that a temperature coefficient of the relative refractive index at the d line in the range of 20° C. to 40° C. of the positive lens included in the middle group GM is $(dNMp/dT)\times10^{-6}$ and the unit of dNMp/dT is $K^{-1}$ (Kelvin), it is preferable that the middle group GM includes one or more positive lenses satisfying Conditional Expression (29). In general, since many materials have a positive temperature coefficient, by adopting a configuration in which the middle group GM includes a positive lens in the range of Conditional Expression (29), there is an advantage in suppressing change in performance in a case where the temperature changes.

In order to obtain more favorable characteristics, instead of Conditional Expression (29), it is more preferable that the zoom lens satisfies Conditional Expression (29-1), and it is yet more preferable that the zoom lens satisfies Conditional Expression (29-2).

$$-15 < dNMp/dT < 0 \tag{29}$$

$$-10 < dNMp/dT < -3 \tag{29-1}$$

$$-7 < dNMp/dT < -5 \tag{29-2}$$

It is preferable that the middle group GM has a positive refractive power as a whole. In such a case, the first lens group G1 having a negative refractive power and the middle group GM having a positive refractive power make it easy to increase the zoom ratio, and there is also an advantage in correcting spherical aberration. Further, since the diameter of the final group GE subsequent to the middle group GM can be reduced by the middle group GM having a positive refractive power, there is also an advantage in the overall reduction in size.

The middle group GM may be configured to consist of a front subgroup GMf and a rear subgroup GMr. In such a case, there is an advantage in reducing the size and the weight as compared with the case where the groups other than the front subgroup GMf and the rear subgroup GMr are included. However, the middle group GM may be configured to consist of a front subgroup GMf, a rear subgroup GMr, and other groups. In such a case, there is an advantage in ensuring higher optical performance.

It is preferable that the lens closest to the object side in the front subgroup GMf is a positive lens. In such a case, there is an advantage in reducing the diameter of the middle group GM. It is preferable that the lens closest to the image side in the front subgroup GMf is a positive lens. In such a case, there is an advantage in reducing the diameter of the rear subgroup GMr.

It is preferable that the rear subgroup GMr includes two or more lenses. In such a case, there is an advantage in suppressing change in performance during zooming.

The lens closest to the image side in the rear subgroup GMr may be configured to be a negative lens. In such a case, since the height of the off-axis ray incident on the final group GE can be increased, it is possible to suppress an increase in incident angle of the off-axis principal ray on the imaging element disposed on the image plane Sim. As a result, there is an advantage in ensuring the amount of peripheral light.

For example, the rear subgroup GMr may be configured to consist of two negative lenses. More specifically, the rear subgroup GMr may be configured to consist of two negative meniscus lenses with concave surfaces facing each other. The "negative meniscus lens" is a meniscus lens having a negative refractive power. Alternatively, the rear subgroup GMr may be configured to consist of two negative lenses and one positive lens. The rear subgroup GMr may be configured to consist of a cemented lens, which is formed by cementing one negative lens and one positive lens, and one negative lens. The rear subgroup GMr may be configured to include a biconvex air lens.

A biconcave air lens may be formed between the front subgroup GMf and the rear subgroup GMr. In such a case, there is an advantage in reducing the diameter of the rear subgroup GMr. In the example of FIG. 1, a biconcave air lens is formed by an image side surface of the lens L24 and an object side surface of the lens L31.

During zooming, the spacing between the front subgroup GMf and the rear subgroup GMr may be changed. In such a case, there is an advantage in suppressing change in performance during zooming. In a case where the middle group GM consists of a plurality of lens groups that move by changing the optical axis spacing from the adjacent group during zooming, the front subgroup GMf and the rear subgroup GMr may be configured to be separated from each other by any of the spacings that change during zooming. For example, the front subgroup GMf and the rear subgroup GMr may be separated by the spacing closest to the object side, among the spacings that change during zooming of the middle group GM. Alternatively, the front subgroup GMf and the rear subgroup GMr may be separated by the spacing closest to the image side, among the spacings that change during zooming of the middle group GM.

The middle group GM consists of one lens group that moves by changing the spacing between the adjacent groups in the direction of the optical axis during zooming, and the focus group consists of only a part of the middle group GM. In such a case, a configuration may be made such that a portion of the middle group GM closer to the object side than the focus group is the front subgroup GMf and a portion of the middle group GM closer to the image side than the front subgroup GMf is the rear subgroup GMr. In such a case, since the front subgroup GMf has a positive refractive power, there is an advantage in achieving reduction in diameter of the focus group.

During focusing, at least a part of the front subgroup GMf may move along the optical axis Z, and the other group may remain stationary with respect to the image plane Sim. As described above, in a case where the focus group is formed by the lens of the front subgroup GMf having a relatively small effective diameter, there is an advantage in achieving reduction in size of the focus unit. The focus group may be configured to consist of only a part of the front subgroup GMf, or may be configured to consist of the entire front subgroup GMf. For example, in a case where the front subgroup GMf consists of a plurality of lens groups that move by changing the spacing between the adjacent groups in the direction of the optical axis during zooming, only the lens group closest to the object side among the plurality of lens groups may form the focus group. In a case where the aperture stop St is disposed inside the front subgroup GMf, only the portion of the front subgroup GMf closer to the object side than the aperture stop St may form the focus group. In addition, the phrase "the aperture stop St is disposed inside the front subgroup GMf" means a configuration of one or more lenses are disposed on both the object side and the image side of the aperture stop St in the front subgroup GMf.

During focusing, at least a part of the rear subgroup GMr may move along the optical axis Z, and the other group may remain stationary with respect to the image plane Sim. In such a case, there is an advantage in suppressing fluctuations in spherical aberration due to changes in the imaging distance. The focus group may be configured to consist of only a part of the rear subgroup GMr, or may be configured to consist of the entire rear subgroup GMr. Further, in a case where the focus group consists of only one lens closest to the object side in the rear subgroup GMr, it is possible to obtain an advantage that the focus unit is reduced in size.

In addition, all the lenses that move during focusing may move in the same movement locus. That is, the movement locus of the focus group included in the zoom lens may be configured to be one type. By unifying the focus group in such a manner, there is an advantage in reducing the size and the weight of the focus unit.

It is preferable that the first lens group G1 includes a negative meniscus lens of which the object side surface is a convex surface closest to the object side. By disposing the negative lens closest to the object side, the entrance pupil can be brought to be close to the object side. This configuration is able to contribute to ensuring the angle of view at the wide angle end and to reducing the diameter. Further, by making the lens closest to the object side a meniscus shape, there is an advantage in suppressing astigmatism and distortion.

In a configuration in which the first lens group G1 includes a negative meniscus lens of which an object side surface is a convex surface closest to the object side, assuming that a paraxial curvature radius of the object side surface of the negative meniscus lens is R1f and a paraxial curvature radius of the image side surface is R1r, it is preferable that the zoom lens satisfies Conditional Expression (10). By not allowing the corresponding value of Conditional Expression (10) to be equal to or less than the lower limit, there is an advantage in suppressing astigmatism in a range from the wide angle end to the telephoto end. By not allowing the corresponding value of Conditional Expression (10) to be equal to or greater than the upper limit, there is an advantage in suppressing distortion and field curvature at the wide angle end. In order to obtain more favorable characteristics, it is more preferable that the zoom lens satisfies Conditional Expression (10-1), and it is yet more preferable that the zoom lens satisfies Conditional Expression (10-2).

$$1 < (R1f + R1r)/(R1f - R1r) < 6. \tag{10}$$

$$1.5 < (R1f + R1r)/(R1f - R1r) < 4.3 \tag{10-1}$$

$$2.2 < (R1f + R1r)/(R1f - R1r) < 3.2 \tag{10-2}$$

It is preferable that the first lens group G1 includes two or more negative meniscus lenses of which object side surfaces are convex surfaces. In such a case, since the negative refractive power can be shared by the plurality of lenses, it is easy to increase the absolute value of the curvature radius of the image side surface of each negative meniscus lens. Thereby, there is an advantage in suppressing astigmatism on the wide angle side.

Assuming that a refractive index of a positive lens included in the first lens group G1 at the d line is N1p, it is preferable that the first lens group G1 includes one or more positive lenses satisfying Conditional Expression (11). By not allowing the corresponding value of Conditional Expression (11) to be equal to or less than the lower limit, the absolute value of the curvature radius of the positive lens in the first lens group G1 is prevented from becoming excessively small. As a result, there is an advantage in suppressing astigmatism. By not allowing the corresponding value of Conditional Expression (11) to be equal to or greater than the upper limit, the absolute value of the curvature radius of the positive lens in the first lens group G1 is prevented from becoming excessively large. As a result, there is an advantage in correcting field curvature. In order to obtain more favorable characteristics, instead of Conditional Expression (11), it is more preferable that the zoom lens satisfies Conditional Expression (11-1), and it is yet more preferable that the zoom lens satisfies Conditional Expression (11-2).

$$1.6 < N1p < 2.15 \tag{11}$$

$$1.75 < N1p < 2.07 \tag{11-1}$$

$$1.83 < N1p < 2.02 \tag{11-2}$$

Assuming that a focal length of the whole system at the wide angle end in the state where the infinite distance object is in focus is fw, and a focal length of the first lens group G1 is f1, it is preferable that the zoom lens satisfies Conditional Expression (12). By not allowing the corresponding value of Conditional Expression (12) to be equal to or less than the lower limit, the amount of change in the spacing between the first lens group G1 and the group closest to the object side in the middle group GM is prevented from becoming excessively large. Therefore, there is an advantage in shortening the total length. By not allowing the corresponding value of Conditional Expression (12) to be equal to or greater than the upper limit, the diameter of the luminous flux incident on the middle group GM is prevented from becoming excessively large.

Thus, there is an advantage in achieving reduction in size of the whole lens system. In order to obtain more favorable characteristics, it is more preferable that the zoom lens satisfies Conditional Expression (12-1), and it is yet more preferable that the zoom lens satisfies Conditional Expression (12-2).

$$0.3 < fw/|f1| < 1.5. \tag{12}$$

$$0.45 < fw/|f1| < 1.25 \tag{12-1}$$

$$0.6 < fw/|f1| < 1.1 \tag{12-2}$$

Assuming that a temperature coefficient of a relative refractive index of the negative lens included in the first lens group G1 at the d line in a range of 20° C. to 40° C. is $(dN1n/dT)\times10^{-6}$ and a unit of dN1n/dT is $K^{-1}$ (Kelvin), it is preferable that the first lens group G1 includes one or more negative lenses satisfying Conditional Expression (16). In general, since many materials have a positive temperature coefficient, by adopting a configuration in which the first lens group G1 includes a negative lens in the range of Conditional Expression (16), there is an advantage in suppressing change in performance in a case where the temperature changes. In order to obtain more favorable characteristics, instead of Conditional Expression (16), it is more preferable that the zoom lens satisfies Conditional Expression (16-1), and it is yet more preferable that the zoom lens satisfies Conditional Expression (16-2).

$$-15 < dN1n/dT < 0 \tag{16}$$

$$-10 < dN1n/dT < -3 \tag{16-1}$$

$$-7 < dN1n/dT < -5 \tag{16-2}$$

A part of the first lens group G1 may be configured as a vibration-proof group so as to move in a direction intersecting the optical axis Z during image blur correction. In the present specification, the group that moves during image blur correction is referred to as a "vibration-proof group". The image blur correction is performed by moving the vibration-proof group. By forming the vibration-proof group with only a part of the first lens group G1, the entire first lens group G1 and the vibration-proof group can have different refractive powers. Therefore, it is easy to control the refractive power of the vibration-proof group. As a result, there is an advantage in achieving both favorable vibration-proof performance and reduction in size. For example, the vibration-proof group may be configured to consist of one lens closest to the image side in the first lens group G1. In such a case, there is an advantage in achieving reduction in size of the vibration-proof group.

In a configuration in which the zoom lens has a vibration-proof group, assuming that a focal length of the whole system at the wide angle end in the state where the infinite distance object is in focus is fw, and a focal length of the vibration-proof group is fis, it is preferable that the zoom lens satisfies Conditional Expression (17). By not allowing the corresponding value of Conditional Expression (17) to be equal to or less than the lower limit, the amount of movement of the vibration-proof group during image blur correction is prevented from becoming excessively large. Thus, there is an advantage in achieving reduction in size of the vibration-proof group. By not allowing the corresponding value of Conditional Expression (17) to be equal to or greater than the upper limit, there is an advantage in suppressing fluctuation in aberrations during image blur correction. By satisfying Conditional Expression (17), there is an advantage in obtaining favorable image blur correction performance while reducing the size of the vibration-proof group. In order to obtain more favorable characteristics, it is more preferable that the zoom lens satisfies Conditional Expression (17-1), and it is yet more preferable that the zoom lens satisfies Conditional Expression (17-2).

$$0.05 < fw/|fis| < 0.75 \tag{17}$$

$$0.1 < fw/|fis| < 0.5 \tag{17-1}$$

$$0.15 < fw/|fis| < 0.25 \tag{17-2}$$

Assuming that a refractive index of the negative lens closest to the object side in the first lens group G1 at the d line is N1n, it is preferable that the zoom lens satisfies Conditional Expression (20). By not allowing the corresponding value of Conditional Expression (20) to be equal to or less than the lower limit, the absolute value of the curvature radius of this negative lens is prevented from becoming excessively small. As a result, there is an advantage in suppressing off-axis aberrations in a range from the wide angle end to the telephoto end. By not allowing the corresponding value of Conditional Expression (20) to be equal to or greater than the upper limit, it is easy to suppress high dispersion and high specific gravity of the negative lens. Therefore, there is an advantage in achieving reduction in weight and correcting lateral chromatic aberration at the wide angle end. In order to obtain more favorable characteristics, it is more preferable that the zoom lens satisfies Conditional Expression (20-1), and it is yet more preferable that the zoom lens satisfies Conditional Expression (20-2).

$$1.6 < N1n < 2.15 \tag{20}$$

$$1.65 < N1n < 2.07 \tag{20-1}$$

$$1.7 < N1n < 2 \tag{20-2}$$

In a case where the average value of the specific gravities of all the lenses included in the first lens group G1 is G1ave, it is preferable that the zoom lens satisfies Conditional Expression (23). By not allowing the corresponding value of Conditional Expression (23) to be equal to or less than the lower limit, the range of materials that can be used for the first lens group G1 can be increased. As a result, there is an advantage in correcting lateral chromatic aberration. By not allowing the corresponding value of Conditional Expression (23) to be equal to or greater than the upper limit, the first lens group G1 is prevented from becoming excessively heavy. Therefore, the center of gravity of the entire optical system can be suppressed from moving toward the object side. Thereby, this configuration is able to contribute to reducing the burden on a user while holding the zoom lens. In order to obtain more favorable characteristics, it is more preferable that the zoom lens satisfies Conditional Expression (23-1), and it is yet more preferable that the zoom lens satisfies Conditional Expression (23-2).

$$3 < Glave < 4.5 \quad (23)$$

$$3.15 < Glave < 4.3 \quad (23\text{-}1)$$

$$3.2 < Glave < 4.2 \quad (23\text{-}2)$$

As in the example of FIG. 1, the first lens group G1 may be configured to move along the optical axis Z by changing the spacing from the middle group GM during zooming. In such a case, there is an advantage in suppressing fluctuation in aberrations during zooming. Alternatively, during zooming, the first lens group G1 may be configured to remain stationary with respect to the image plane Sim. In such a case, since the movable mechanism of the first lens group G1 is not necessary, the mechanical configuration is simplified. As a result, there is an advantage in achieving reduction in size and weight.

It is preferable that the number of lenses included in the first lens group G1 is 3 or more and 6 or less. In such a case, there is an advantage in reducing the size and the weight and suppressing fluctuation in various aberrations during zooming. The number of lenses included in the first lens group G1 is more preferably 3 or more and 5 or less, and even more preferably 4 or more and 5 or less.

The first lens group G1 may be configured to include a cemented lens in which a negative lens and a positive lens are cemented. In such a case, there is an advantage in correcting chromatic aberration. In one of the cemented lenses included in the first lens group G1, the negative lens and the positive lens may be cemented in order from the object side. Further, the cementing surface of the cemented lens included in the first lens group G1 may have a shape in which the convex surface faces the object side.

The first lens group G1 may be configured to consist of three negative lenses and one positive lens. In such a case, the first lens group G1 may be configured to consist of, in order from the object side to the image side, two single lenses, a negative lens, and a cemented lens in which a negative lens and a positive lens are cemented in order from the object side. Alternatively, the first lens group G1 may be configured to consist of, in order from the object side to the image side, one negative lens, a cemented lens in which the negative lens and the positive lens are cemented in order from the object side, and one negative lens.

The first lens group G1 may be configured to consist of four negative lenses and one positive lens. In such a case, for example, the first lens group G1 may be configured to consist of, in order from the object side to the image side, negative lenses which are two single lenses, a cemented lens in which a negative lens and a positive lens are cemented in order from the object side, and a negative lens which is one single lens.

Assuming that a focal length of the whole system at the wide angle end in the state where the infinite distance object is in focus is fw, and a focal length of the final group GE at the wide angle end is fE, it is preferable that the zoom lens satisfies Conditional Expression (27). By not allowing the corresponding value of Conditional Expression (27) to be equal to or less than the lower limit, there is an advantage in suppressing an increase in incident angle of the off-axis principal ray to the image plane Sim, particularly at the wide angle end. By not allowing the corresponding value of Conditional Expression (27) to be equal to or greater than the upper limit, it is easy to suppress field curvature. In order to obtain more favorable characteristics, it is more preferable that the zoom lens satisfies Conditional Expression (27-1), and it is yet more preferable that the zoom lens satisfies Conditional Expression (27-2).

$$0.01 < fw/fE < 0.75 \quad (27)$$

$$0.03 < fw/fE < 0.6 \quad (27\text{-}1)$$

$$0.15 < fw/fE < 0.52 \quad (27\text{-}2)$$

In a case where the average value of the specific gravities of all the lenses included in the final group GE is GEave, it is preferable that the zoom lens satisfies Conditional Expression (24). By not allowing the corresponding value of Conditional Expression (24) to be equal to or less than the lower limit, the final group GE is prevented from becoming excessively light. Therefore, the center of gravity of the entire optical system can be suppressed from moving toward the object side. Thereby, this configuration is able to contribute to reducing the burden on the user while holding the zoom lens. By not allowing the corresponding value of Conditional Expression (24) to be equal to or greater than the upper limit, the final group GE is prevented from becoming excessively heavy. As a result, there is an advantage in achieving reduction in weight of the entire lens system. In order to obtain more favorable characteristics, it is more preferable that the zoom lens satisfies Conditional Expression (24-1), and it is yet more preferable that the zoom lens satisfies Conditional Expression (24-2).

$$2.5 < GEave < 5 \quad (24)$$

$$3 < GEave < 4 \quad (24\text{-}1)$$

$$3.2 < GEave < 3.7 \quad (24\text{-}2)$$

It is preferable that the final group GE has a positive refractive power. In such a case, it is possible to suppress an increase in incident angle of the off-axis principal ray on the image plane Sim. As a result, there is an advantage in ensuring the amount of peripheral light.

It is preferable that, during zooming, the final group GE remains stationary with respect to the image plane Sim. By disposing the group remaining stationary during zooming closest to the image side, there is an advantage in suppressing fluctuation in the lateral chromatic aberration during zooming.

The final group GE may be configured to consist of two or fewer lenses. In such a case, there is an advantage in achieving reduction in size and weight. In a case where the final group GE consists of a cemented lens formed by cementing one positive lens and one negative lens, there is an advantage in correcting lateral chromatic aberration. Alternatively, the final group GE may be configured to consist of one lens. In such a case, there is a greater advantage in achieving reduction in size and weight.

Assuming that a distance from the image plane Sim to the exit pupil position at the wide angle end in the state where the infinite distance object is in focus is Pexpw, and a focal length of the whole system at the wide angle end in the state where the infinite distance object is in focus is fw, it is preferable that the zoom lens satisfies Conditional Expression (9). By not allowing the corresponding value of Conditional Expression (9) to be equal to or less than the lower limit, the incident angle of the off-axis principal ray on the image plane Sim is prevented from becoming excessively large. As a result, there is an advantage in ensuring the amount of peripheral light. By not allowing the corresponding value of Conditional Expression (9) to be equal to or greater than the upper limit, there is an advantage in achieving reduction in size of the lens system. In order to obtain more favorable characteristics, it is more preferable that the zoom lens satisfies Conditional Expression (9-1), and it is yet more preferable that the zoom lens satisfies Conditional Expression (9-2).

$$0.5 < Pexpw/fw < 5 \tag{9}$$

$$1 < Pexpw/fw < 4.2 \tag{9-1}$$

$$1.4 < Pexpw/fw < 3.7 \tag{9-2}$$

Assuming that a sum of a distance on the optical axis from the lens surface closest to the object side in the first lens group G1 at the telephoto end to the lens surface closest to the image side in the final group GE at the telephoto end and a back focal length at the air conversion distance of the whole system at the telephoto end in the state where the infinite distance object is in focus is TLt, a focal length of the whole system at the telephoto end in the state in which the infinite distance object is in focus is ft, and a maximum half angle of view at the telephoto end in the state in which the infinite distance object is in focus is ωt, it is preferable that the zoom lens satisfies Conditional Expression (19). FIG. 2 shows an example of ωt. By not allowing the corresponding value of Conditional Expression (19) to be equal to or less than the lower limit, it is easy to provide a zoom lens having high optical performance. By not allowing the corresponding value of Conditional Expression (19) to be equal to or greater than the upper limit, it is easy to provide a compact and lightweight camera system. In order to obtain more favorable characteristics, it is more preferable that the zoom lens satisfies Conditional Expression (19-1), and it is yet more preferable that the zoom lens satisfies Conditional Expression (19-2).

$$2.85 < TLt/(ft \times \tan|\omega t|) < 7 \tag{19}$$

$$3.2 < TLt/(ft \times \tan|\omega t|) < 6 \tag{19-1}$$

$$3.5 < TLt/(ft \times \tan|\omega t|) < 5.25 \tag{19-2}$$

Assuming that a focal length of the whole system at the wide angle end in the state where the infinite distance object is in focus is fw, and a focal length of the whole system at the telephoto end in the state where the infinite distance object is in focus is ft, it is preferable that the zoom lens satisfies Conditional Expression (28). By not allowing the corresponding value of Conditional Expression (28) to be equal to or less than the lower limit, it is possible to ensure a significant zoom ratio for the zoom lens. By not allowing the corresponding value of Conditional Expression (28) to be equal to or greater than the upper limit, there is an advantage in achieving reduction in size. In order to obtain more favorable characteristics, it is more preferable that the zoom lens satisfies Conditional Expression (28-1), and it is yet more preferable that the zoom lens satisfies Conditional Expression (28-2).

$$1.3 < ft/fw < 5 \tag{28}$$

$$1.4 < ft/fw < 3 \tag{28-1}$$

$$1.45 < ft/fw < 2.5 \tag{28-2}$$

Assuming that a maximum half angle of view at the wide angle end in the state where the infinite distance object is in focus is ωw and the unit of ωw is degrees, it is preferable that the zoom lens satisfies Conditional Expression (30). By not allowing the corresponding value of Conditional Expression (30) to be equal to or less than the lower limit, the angle of view is prevented from becoming excessively narrow. Therefore, in a lens system in which the first lens group G1 closest to the object side has a negative refractive power, there is an advantage in shortening the total length. By not allowing the corresponding value of Conditional Expression (30) to be equal to or greater than the upper limit, the angle of view is prevented from becoming excessively wide. Therefore, the diameter of the first lens group G1 can be easily reduced, and the enlargement of the entire lens system can be suppressed. In order to obtain more favorable characteristics, it is more preferable that the zoom lens satisfies Conditional Expression (30-1), and it is yet more preferable that the zoom lens satisfies Conditional Expression (30-2).

$$28 < \omega w < 90 \tag{30}$$

$$32 < \omega w < 65 \tag{30-1}$$

$$35 < \omega w < 60 \tag{30-2}$$

The above-mentioned preferred configurations and available configurations including the configurations relating to the conditional expressions may be any combination, and it is preferable to appropriately selectively adopt the configurations in accordance with necessary specifications. It should be noted that the conditional expressions that the zoom lens of the present disclosure preferably satisfies are not limited to the conditional expressions described in the form of the expressions, and the lower limits and the upper limits are selected from the preferable, more preferable, and yet more preferable conditional expressions. The conditional expressions may include all conditional expressions obtained through optional combinations.

As an example, a preferred embodiment of the zoom lens of the present disclosure consists of a first lens group G1 having a negative refractive power, a middle group GM, and a final group GE in order from the object side to the image side. During zooming, the spacing between the first lens group G1 and the middle group GM changes, and the spacing between the middle group GM and the final group GE changes. During focusing, at least a part of the middle group GM moves, as the focus group, along the optical axis Z, and the first lens group G1 and the final group GE remain stationary with respect to the image plane Sim. With such a configuration, the zoom lens satisfies Conditional Expression (1). According to this preferred embodiment, it is possible to provide a compact and lightweight zoom lens having a large image circle and high optical performance.

Next, examples of the zoom lens of the present disclosure will be described, with reference to the drawings. The reference numerals attached to the lenses in the cross-sectional views of each example are used independently for each example in order to avoid complication of description and drawings because of an increase in the number of digits of the reference numerals. Therefore, even in a case where common reference numerals are attached in the drawings of different examples, components do not necessarily have a common configuration.

Example 1

FIG. 1 is a cross-sectional view of a configuration of a zoom lens of Example 1, and an illustration method and a configuration thereof are as described above. Therefore, some description is not repeated herein. The zoom lens shown in Example 1 consists of, in order from the object side to the image side along the optical axis Z, a first lens group G1 having a negative refractive power, a second lens group G2 having a positive refractive power, a third lens group G3 having a negative refractive power, and a fourth lens group G4 having a positive refractive power. The middle group GM consists of the second lens group G2 and the third lens group G3. The front subgroup GMf consists of the second lens group G2. The rear subgroup GMr consists of the third lens group G3. The final group GE consists of the fourth lens group G4.

During zooming, the first lens group G1, the second lens group G2, and the third lens group G3 move along the optical axis Z by changing the spacing between the adjacent groups in the direction of the optical axis, and the fourth lens group G4 remains stationary with respect to the image plane Sim. The focus group consists of the entire third lens group G3.

Regarding the zoom lens of Example 1, Table 1 shows basic lens data, Table 2 shows specifications and variable surface spacings, and Table 3 shows aspherical surface coefficients thereof. Table 1 is noted as follows. The column of Sn shows surface numbers in a case where the surface closest to the object side is the first surface, and the number is increased one by one toward the image side. The column of R shows a curvature radius of each surface. The column of D shows a surface spacing between each surface and the surface adjacent to the image side on the optical axis. The column of Nd shows a refractive index of each component at the d line. The column of νd shows an Abbe number of each component based on the d line. The column of θgF shows a partial dispersion ratio of each component between the g line and the F line. The column of SG shows a specific gravity of each component. The column of dNd/dT shows a temperature coefficient of the relative refractive index of each component at the d line in the range from 20° C. to 40° C. multiplied by 106. The unit of temperature coefficient is $K^{-1}$ (Kelvin). The column of ED shows an effective diameter in diameter. The ED indicates only a lens surface closest to the object side in the middle group GM and a lens surface closest to the image side in the middle group GM.

In Table 1, the sign of the curvature radius of the surface convex toward the object side is positive, and the sign of the curvature radius of the surface convex toward the image side is negative. Table 1 also shows the aperture stop St and the optical member PP. In a cell of a surface number of a surface corresponding to the aperture stop St, the surface number and a term of (St) are noted. A value at the bottom cell of D in Table 1 indicates a spacing between the image plane Sim and the surface closest to the image side in the table. In Table 1, the symbol DD[ ] is used for each variable surface spacing, and the object side surface number of the spacing is given in [ ] and is noted in the column of D.

Table 2 shows the zoom ratio Zr, the focal length f, the back focal length at the air conversion distance, the open F number FNo., the maximum total angle of view 2ω, and the variable surface spacing in each zooming state and each in-focus state. The approximate size of the image circle can be obtained from f and ω. (°) in the cell of 2ω indicates that the unit thereof is a degree. In Table 2, the columns denoted by “wide angle end”, “middle”, and “telephoto end” show values in the wide angle end state, the middle focal length state, and the telephoto end state, respectively. Further, in Table 2, a column in which “Infinity” is noted shows values in the state where the infinite distance object is in focus, and a column in which “β=−0.1” is noted shows values in the state where the imaging magnification is −0.1 times. It should be noted that some numerical values are omitted in the column in which “β=−0.1” is noted. The values shown in Tables 1 and 2 are based on the d line.

In basic lens data, a reference sign * is attached to surface numbers of aspherical surfaces, and numerical values of the paraxial curvature radius are written into the column of the curvature radius of the aspherical surface. In Table 3, the row of Sn shows surface numbers of the aspherical surfaces, and the rows of KA and Am show numerical values of the aspherical surface coefficients for each aspherical surface. It should be noted that m of Am is an integer of 3 or more, and differs depending on the surface. For example, on the eleventh surface, m=3, 4, 5, . . . , 10. The “E±n” (n: an integer) in numerical values of the aspherical surface coefficients of Table 3 indicates “$\times 10^{\pm n}$”. KA and Am are the aspherical surface coefficients in the aspherical surface expression represented by the following expression.

$$Zd = C\times h^2/\left\{1+\left(1-KA\times C^2\times h^2\right)^{1/2}\right\}+\sum Am\times h^m$$

Here,

Zd is an aspherical surface depth (a length of a perpendicular from a point on an aspherical surface at height h to a plane that is perpendicular to the optical axis Z and that is in contact with the vertex of the aspherical surface), h is a height (a distance from the optical axis Z to the lens surface), C is an inverse of the paraxial curvature radius, KA and Am are aspherical surface coefficients, and Σ in the aspherical surface expression means the sum with respect to m.

In the data of each table, degrees are used as a unit of an angle, and millimeters (mm) are used as a unit of a length, but appropriate different units may be used since the optical system can be used even in a case where the system is enlarged or reduced in proportion. Each of the following tables shows numerical values rounded off to predetermined decimal places.

TABLE 1

| Example 1 | | | | | | | | |
|---|---|---|---|---|---|---|---|---|
| Sn | R | D | Nd | νd | θgF | SG | dNd/dT | ED |
| 1 | 69.10435 | 1.150 | 1.80518 | 25.46 | 0.61572 | 3.36 | 0.9 | |
| 2 | 29.85137 | 2.352 | | | | | | |
| 3 | 52.09331 | 1.000 | 1.58313 | 59.46 | 0.54336 | 3.24 | 3.4 | |
| 4 | 22.56329 | 7.149 | | | | | | |
| 5 | ∞ | 0.960 | 1.48749 | 70.39 | 0.53005 | 2.48 | −1.5 | |
| 6 | 22.93740 | 5.040 | 1.91083 | 35.26 | 0.58293 | 5.07 | 4.4 | |
| 7 | 101.46452 | DD[7] | | | | | | |
| 8(St) | ∞ | 0.800 | | | | | | |
| 9 | 18.96999 | 7.000 | 1.49700 | 81.61 | 0.53887 | 3.70 | −7.5 | 16.58 |
| 10 | −38.73407 | 3.487 | | | | | | |
| *11 | −14.21597 | 1.890 | 1.58313 | 59.46 | 0.54056 | 3.01 | 3.9 | |
| *12 | −28.12065 | 1.500 | | | | | | |
| 13 | −70.09062 | 0.860 | 1.51741 | 52.16 | 0.56212 | 2.52 | −0.4 | |
| 14 | 16.72780 | 6.170 | 1.49700 | 81.61 | 0.53887 | 3.70 | −6.2 | |
| 15 | −16.72780 | DD[15] | | | | | | |
| 16 | 36.63948 | 0.850 | 1.67790 | 55.56 | 0.54672 | 3.80 | 0.9 | |
| 17 | 22.72340 | 12.500 | | | | | | |
| 18 | −20.61508 | 0.850 | 1.64769 | 33.84 | 0.59227 | 2.73 | 0.8 | |
| 19 | −41.33431 | DD[19] | | | | | | 25.84 |
| 20 | ∞ | 6.040 | 1.58144 | 40.75 | 0.57841 | 2.61 | 2.3 | |
| 21 | −68.19290 | 19.092 | | | | | | |
| 22 | ∞ | 2.850 | 1.51680 | 64.20 | 0.53430 | | | |
| 23 | ∞ | 1.122 | | | | | | |

TABLE 2

| Example 1 | | | | | |
|---|---|---|---|---|---|
| | Wide angle end Infinity | Middle Infinity | Telephoto end Infinity | Wide angle end β = −0.1 | Telephoto end β = −0.1 |
| Zr | 1.0 | 1.4 | 1.9 | 1.0 | 1.9 |
| f | 36.046 | 49.434 | 67.893 | — | — |
| Bf | 22.090 | 22.090 | 22.090 | — | — |
| FNo. | 4.62 | 4.78 | 5.76 | — | — |
| 2ω(°) | 77.8 | 58.4 | 43.8 | — | — |
| DD[7] | 28.056 | 13.223 | 3.086 | 28.056 | 3.086 |
| DD[15] | 1.546 | 2.342 | 2.836 | 2.918 | 4.242 |
| DD[19] | 7.642 | 16.725 | 30.610 | 6.270 | 29.205 |

TABLE 3

| Example 1 | | |
|---|---|---|
| Sn | 11 | 12 |
| KA | 1.0000000E+00 | 1.0000000E+00 |
| A3 | 0.0000000E+00 | 0.0000000E+00 |
| A4 | 1.9333299E−04 | 2.0939860E−04 |
| A5 | −3.2634652E−06 | −2.7452878E−06 |
| A6 | −1.3836702E−07 | −1.1927223E−07 |
| A7 | 3.1412740E−08 | 2.9002318E−08 |
| A8 | −1.7877300E−08 | −1.1774910E−08 |
| A9 | 1.6054978E−09 | 6.5535125E−10 |
| A10 | −2.4959670E−11 | 1.0444752E−11 |

Figure 7:
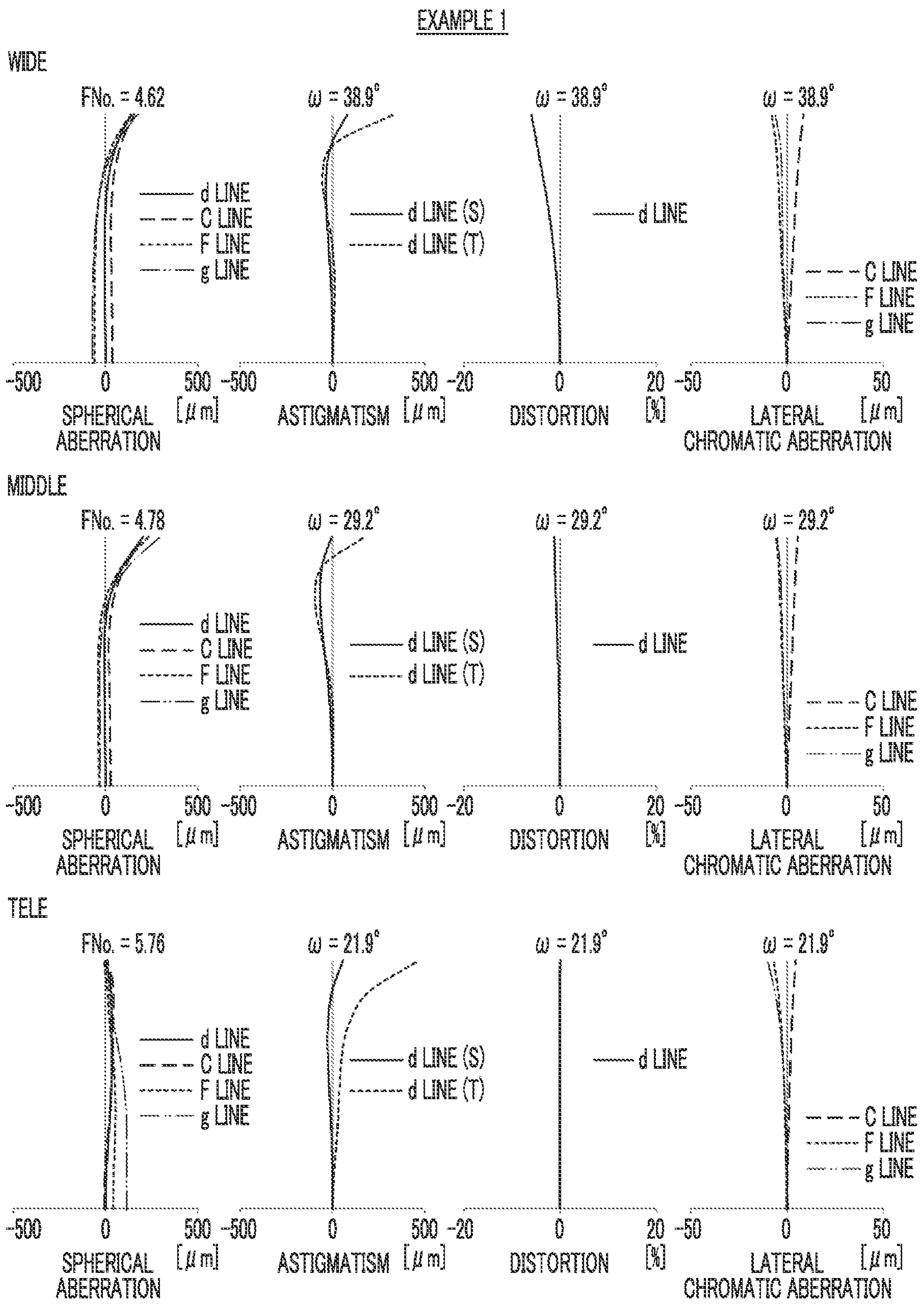
FIG. 7 is a diagram showing aberrations of the zoom lens of Example 1.

FIG. 7 is a diagram showing aberrations of the zoom lens of Example 1 in a state where the infinite distance object is in focus. In FIG. 7, spherical aberration, astigmatism, distortion, and lateral chromatic aberration are shown in order from the left side. In FIG. 7, the upper part labeled "WIDE" shows aberrations in the wide angle end state, the middle part labeled "MIDDLE" shows aberrations in the middle focal length state, and the lower part labeled "TELE" shows aberrations in the telephoto end state. In the spherical aberration diagram, aberrations at the d line, the C line, the F line, and the g line are indicated by a solid line, a long broken line, a short broken line, and a two-dot chain line, respectively. In the astigmatism diagram, aberration in a sagittal direction at the d line is indicated by a solid line, and aberration in a tangential direction at the d line is indicated by a short broken line. In the distortion diagram, aberration at the d line is indicated by a solid line. In the lateral chromatic aberration diagram, aberrations at the C line, the F line, and the g line are respectively indicated by a long broken line, a short broken line, and a two-dot chain line. In the spherical aberration diagram, the value of the open F number is shown after "FNo.=". In other aberration diagrams, the value of the maximum half angle of view is shown after "ω=".

Symbols, meanings, description methods, and illustration methods of the respective data pieces according to Example 1 are the same as those in the following examples unless otherwise specified. Therefore, in the following description, repeated description will be omitted.

Example 2

Figure 8:
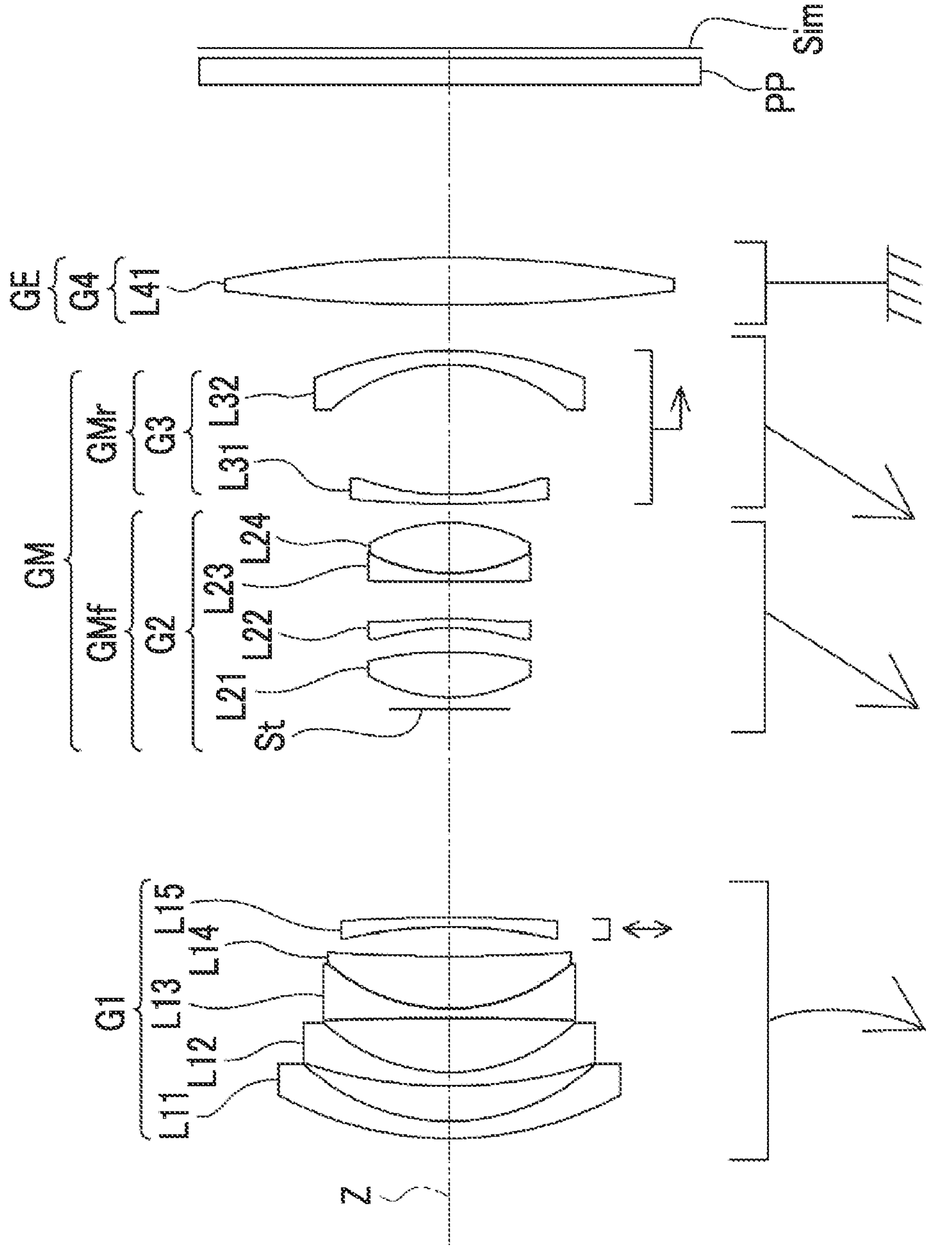
FIG. 8 is a cross-sectional view of a configuration of a zoom lens of Example 2 and a diagram showing movement loci thereof.

FIG. 8 shows a cross-sectional view of the configuration and movement loci of the zoom lens of Example 2 at the wide angle end in a state where the infinite distance object is in focus. The zoom lens shown in Example 2 consists of, in order from the object side to the image side along the optical axis Z, a first lens group G1 having a negative refractive power, a second lens group G2 having a positive refractive power, a third lens group G3 having a negative refractive power, and a fourth lens group G4 having a positive refractive power. The middle group GM consists of the second lens group G2 and the third lens group G3. The front subgroup GMf consists of the second lens group G2. The rear subgroup GMr consists of the third lens group G3. The final group GE consists of the fourth lens group G4.

The first lens group G1 consists of five lenses L11 to L15 in order from the object side to the image side. The second lens group G2 consists of an aperture stop St and four lenses L21 to L24 in order from the object side to the image side. The third lens group G3 consists of two lenses L31 and L32 in order from the object side to the image side. The fourth lens group G4 consists of one lens L41.

During zooming, the first lens group G1, the second lens group G2, and the third lens group G3 move along the optical axis Z by changing the spacing between the adjacent groups in the direction of the optical axis, and the fourth lens group G4 remains stationary with respect to the image plane Sim. The focus group consists of the entire third lens group G3. The vibration-proof group consists of the lens L15. In FIG. 8, a vertical double-headed arrow is drawn below the vibration-proof group. The method of showing the vibration-proof group is the same in the following examples.

Figure 9:
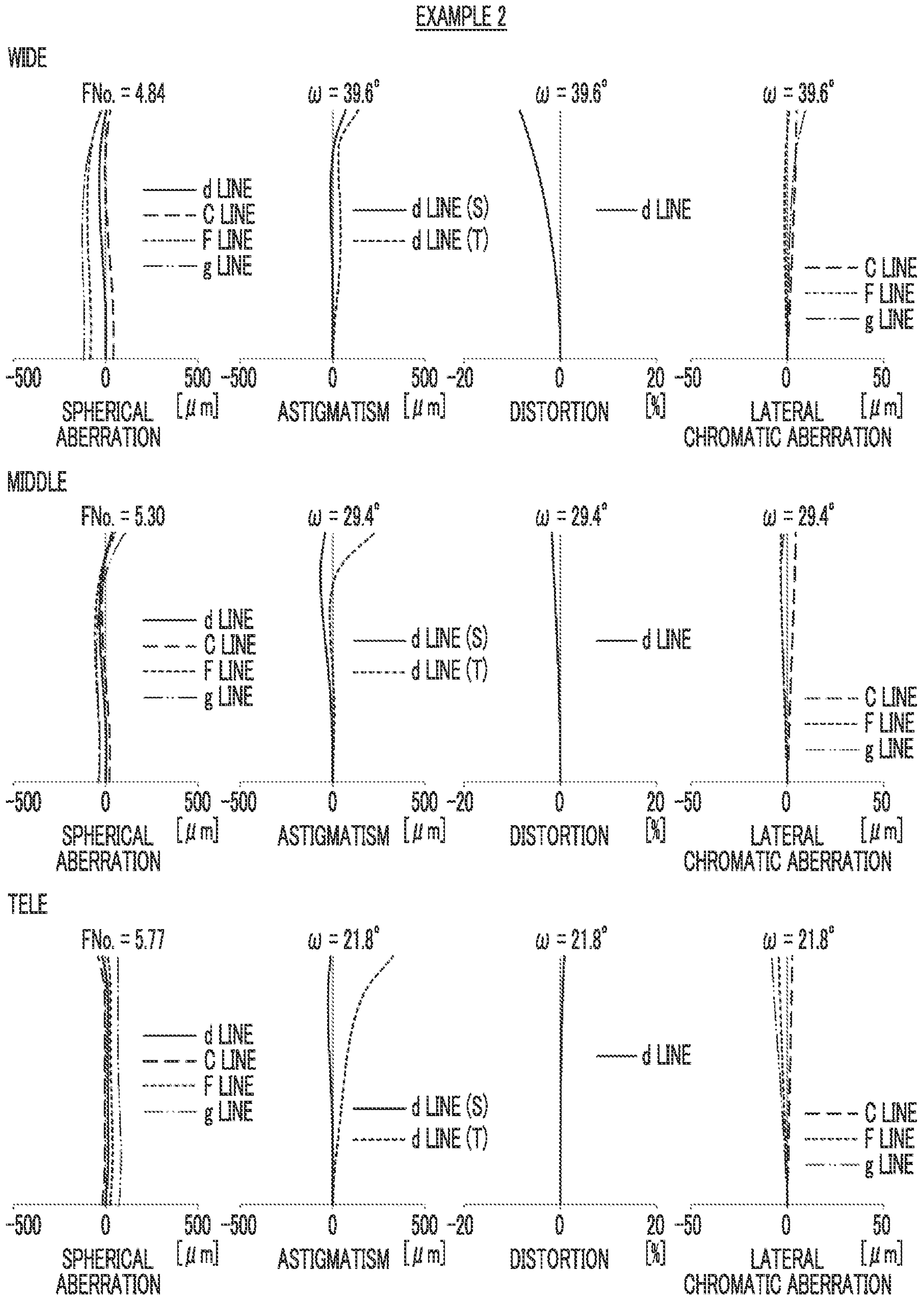
FIG. 9 is a diagram showing aberrations of the zoom lens of Example 2.

Regarding the zoom lens of Example 2, Table 4 shows basic lens data, Table 5 shows specifications and variable surface spacings, and Table 6 shows aspherical surface coefficients thereof. FIG. 9 shows aberration diagrams.

TABLE 4

Example 2

| Sn | R | D | Nd | νd | θgF | SG | dNd/dT | ED |
|---|---|---|---|---|---|---|---|---|
| 1 | 41.01322 | 1.850 | 1.74000 | 28.30 | 0.60790 | 3.11 | 2.4 | |
| 2 | 24.32746 | 3.829 | | | | | | |
| 3 | 54.22078 | 1.500 | 1.58313 | 59.37 | 0.54345 | 3.19 | 3.5 | |
| 4 | 20.93596 | 5.878 | | | | | | |
| 5 | −371.47191 | 1.010 | 1.51742 | 52.43 | 0.55649 | 2.46 | 2.4 | |
| 6 | 21.26359 | 5.680 | 1.91082 | 35.25 | 0.58224 | 4.97 | 5.3 | |
| 7 | 201.03756 | 3.078 | | | | | | |
| 8 | −59.57656 | 1.029 | 1.48749 | 70.44 | 0.53062 | 2.45 | −1.4 | |
| 9 | −193.21632 | DD[9] | | | | | | |
| 10(St) | ∞ | 1.292 | | | | | | |
| 11 | 18.56917 | 4.933 | 1.49700 | 81.61 | 0.53887 | 3.70 | −6.2 | 16.87 |
| 12 | −41.16804 | 2.621 | | | | | | |
| *13 | −20.63867 | 1.000 | 1.58313 | 59.38 | 0.54237 | 3.05 | 3.7 | |
| *14 | −35.83396 | 3.952 | | | | | | |
| 15 | 325.50755 | 1.000 | 1.74400 | 44.79 | 0.56560 | 4.32 | 3.0 | |
| 16 | 19.85611 | 5.434 | 1.49700 | 81.61 | 0.53887 | 3.70 | −6.2 | |
| 17 | −19.33201 | DD[17] | | | | | | |
| 18 | 118.65126 | 1.000 | 1.48749 | 70.44 | 0.53062 | 2.45 | −1.4 | |
| 19 | 29.73613 | 14.109 | | | | | | |
| 20 | −20.52482 | 1.500 | 1.74000 | 28.30 | 0.60790 | 3.11 | 2.4 | |
| 21 | −39.71670 | DD[21] | | | | | | 28.29 |
| 22 | 208.75166 | 5.125 | 1.84666 | 23.78 | 0.61923 | 3.50 | 1.4 | |
| 23 | −135.57356 | 18.777 | | | | | | |
| 24 | ∞ | 2.850 | 1.51680 | 64.20 | 0.53430 | | | |
| 25 | ∞ | 1.129 | | | | | | |

TABLE 5

Example 2

| | Wide angle end Infinity | Middle Infinity | Telephoto end Infinity | Wide angle end β = −0.1 | Telephoto end β = −0.1 |
|---|---|---|---|---|---|
| Zr | 1.0 | 1.4 | 1.9 | 1.0 | 1.9 |
| f | 36.066 | 49.461 | 67.931 | — | — |
| Bf | 21.785 | 21.785 | 21.785 | — | — |
| FNo. | 4.84 | 5.30 | 5.77 | — | — |
| 2ω(°) | 79.2 | 58.8 | 43.6 | — | — |
| DD[9] | 22.619 | 10.563 | 1.470 | 22.619 | 1.470 |
| DD[17] | 2.062 | 3.337 | 4.883 | 3.419 | 6.344 |
| DD[21] | 4.882 | 13.563 | 24.954 | 3.525 | 23.493 |

TABLE 6

| Example 2 | | |
|---|---|---|
| Sn | 13 | 14 |
| KA | 1.0000000E+00 | 1.0000000E+00 |
| A3 | 0.0000000E+00 | 0.0000000E+00 |
| A4 | 1.2894697E−04 | 1.6815912E−04 |
| A5 | −1.9157405E−06 | −3.9879210E−06 |
| A6 | −5.4548703E−07 | 3.8433489E−07 |
| A7 | 9.9605706E−08 | −9.0228037−08 |
| A8 | −1.5444211E−08 | 8.5412426E−09 |
| A9 | 1.0067884E−09 | −5.0227346E−10 |
| A10 | −2.5854550E−11 | 7.2931536E−12 |

Example 3

Figure 10:
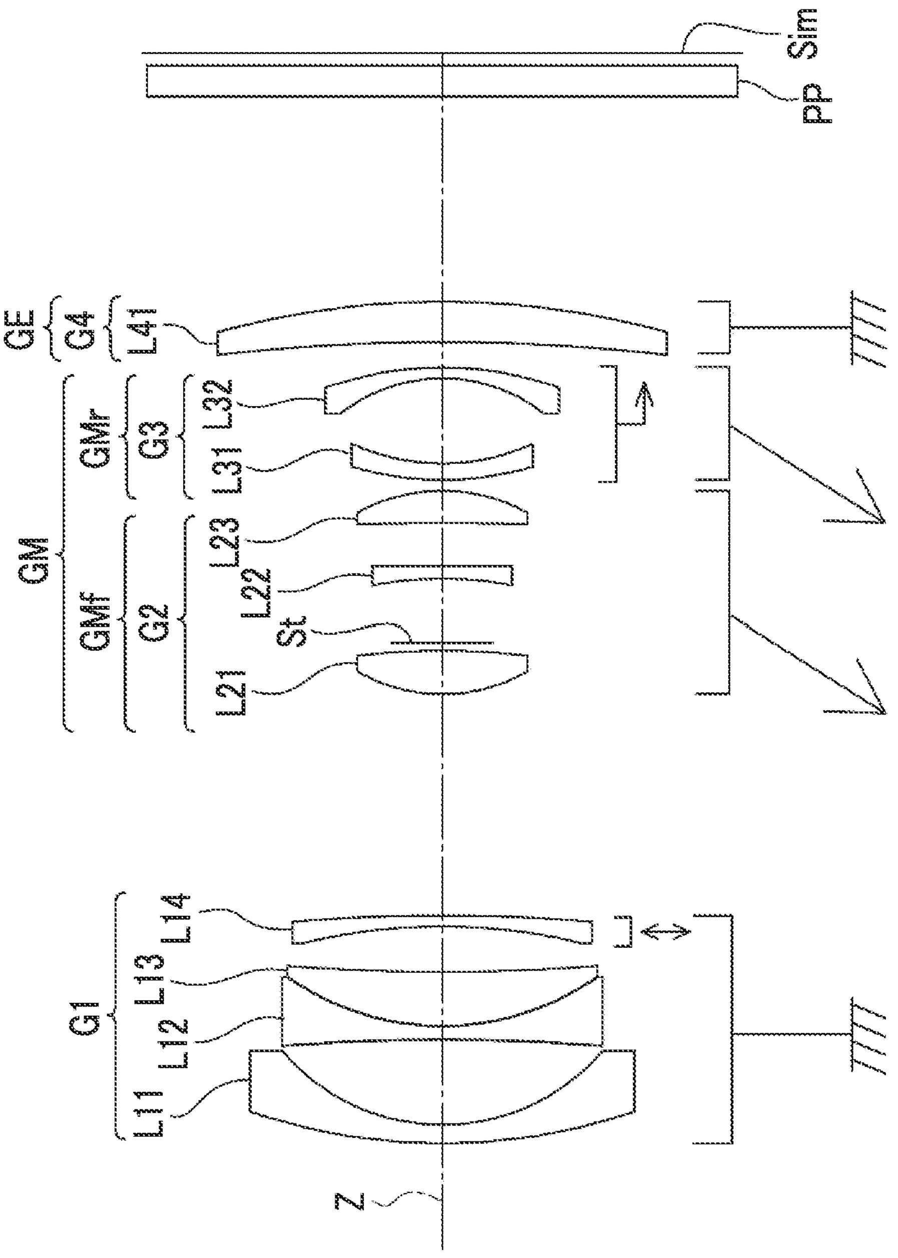
FIG. 10 is a cross-sectional view of a configuration of a zoom lens of Example 3 and a diagram showing movement loci thereof.

FIG. 10 shows a cross-sectional view of the configuration and movement loci of the zoom lens of Example 3 at the wide angle end in a state where the infinite distance object is in focus. The zoom lens shown in Example 3 consists of, in order from the object side to the image side along the optical axis Z, a first lens group G1 having a negative refractive power, a second lens group G2 having a positive refractive power, a third lens group G3 having a negative refractive power, and a fourth lens group G4 having a positive refractive power. The middle group GM consists of the second lens group G2 and the third lens group G3. The front subgroup GMf consists of the second lens group G2. The rear subgroup GMr consists of the third lens group G3. The final group GE consists of the fourth lens group G4.

The first lens group G1 consists of four lenses L11 to L14 in order from the object side to the image side. The second lens group G2 consists of a lens L21, an aperture stop St, a lens L22, and a lens L23 in order from the object side to the image side. The third lens group G3 consists of two lenses L31 and L32 in order from the object side to the image side. The fourth lens group G4 consists of one lens L41.

During zooming, the second lens group G2 and the third lens group G3 move along the optical axis Z by changing the spacing between the adjacent groups in the direction of the optical axis, and the first lens group G1 and the fourth lens group G4 remain stationary with respect to the image plane Sim. The focus group consists of the entire third lens group G3. The vibration-proof group consists of the lens L14.

Figure 11:
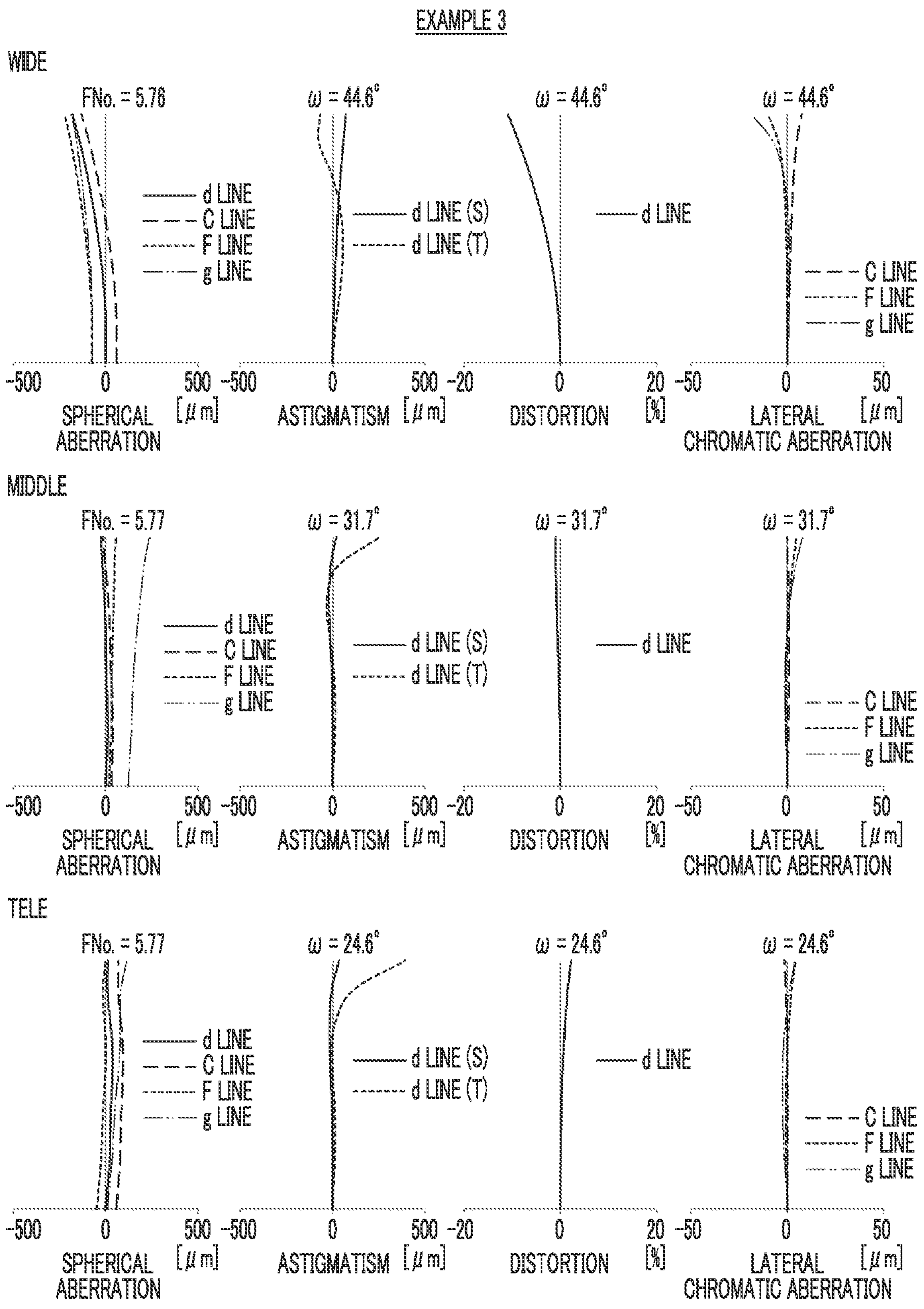
FIG. 11 is a diagram showing aberrations of the zoom lens of Example 3.

Regarding the zoom lens of Example 3, Table 7 shows basic lens data, Table 8 shows specifications and variable surface spacings, and Table 9 shows aspherical surface coefficients thereof. FIG. 11 shows aberration diagrams.

TABLE 7

| Example 3 | | | | | | | | |
|---|---|---|---|---|---|---|---|---|
| Sn | R | D | Nd | νd | θgF | SG | dNd/dT | ED |
| 1 | 56.89184 | 1.694 | 1.92286 | 20.88 | 0.63900 | 3.94 | 1.8 | |
| 2 | 19.97616 | 7.793 | | | | | | |
| 3 | −189.48592 | 1.260 | 1.49700 | 81.61 | 0.53887 | 3.70 | −6.2 | |
| 4 | 25.64305 | 4.941 | 1.96300 | 24.11 | 0.62126 | 4.2 | 3.0 | |
| 5 | 190.72948 | 4.157 | | | | | | |
| 6 | −55.46940 | 1.000 | 1.48749 | 70.44 | 0.53062 | 2.45 | −1.4 | |
| 7 | −175.58702 | DD[7] | | | | | | |
| 8 | 16.13878 | 3.972 | 1.49700 | 81.61 | 0.53887 | 3.7 | −6.2 | 15.93 |
| 9 | −65.65560 | 0.667 | | | | | | |
| 10(St) | ∞ | 5.810 | | | | | | |
| *11 | −62.54010 | 1.169 | 1.68948 | 31.02 | 0.59874 | 2.88 | 0.0 | |
| *12 | 145.82688 | 3.951 | | | | | | |
| 13 | −260.43747 | 2.949 | 1.49700 | 81.61 | 0.53887 | 3.70 | −6.2 | |
| 14 | −16.47960 | DD[14] | | | | | | |
| 15 | 30.04223 | 1.500 | 1.96300 | 24.11 | 0.62126 | 4.2 | 3.0 | |
| 16 | 20.80076 | 7.772 | | | | | | |
| 17 | −15.66420 | 1.000 | 1.63980 | 34.47 | 0.59233 | 2.76 | 2.5 | |
| 18 | −32.85641 | DD[18] | | | | | | 21.73 |
| 19 | −187.09863 | 3.671 | 1.92286 | 20.88 | 0.63900 | 3.94 | 1.8 | |
| 20 | −81.25018 | 18.784 | | | | | | |
| 21 | ∞ | 2.850 | 1.51680 | 64.20 | 0.53430 | | | |
| 22 | ∞ | 1.132 | | | | | | |

TABLE 8

| Example 3 | | | | | |
|---|---|---|---|---|---|
| | Wide angle end Infinity | Middle Infinity | Telephoto end Infinity | Wide angle end β = −0.1 | Telephoto end β = −0.1 |
| Zr | 1.0 | 1.4 | 1.9 | 1.0 | 1.9 |
| f | 31.062 | 44.730 | 58.506 | — | — |
| Bf | 21.795 | 21.795 | 21.795 | — | — |
| FNo. | 5.76 | 5.77 | 5.77 | — | — |
| 2ω(°) | 89.2 | 63.4 | 49.2 | — | — |
| DD[7] | 20.257 | 9.310 | 1.255 | 20.257 | 1.255 |
| DD[14] | 1.000 | 1.228 | 2.653 | 2.176 | 3.850 |
| DD[18] | 2.340 | 13.059 | 19.689 | 1.164 | 18.492 |

TABLE 9

| Example 3 | | |
|---|---|---|
| Sn | 11 | 12 |
| KA | 1.0000000E+00 | 1.0000000E+00 |
| A3 | 0.0000000E+00 | 0.0000000E+00 |
| A4 | −2.3183977E−04 | −1.4214998E−04 |
| A5 | 1.9868927E−06 | −2.9656599E−06 |
| A6 | 3.4257964E−07 | 2.6194127E−06 |
| A7 | 3.6614054E−07 | 2.4386812E−08 |
| A8 | −3.5045121E−08 | −1.6384001E−08 |
| A9 | −9.0930354E−10 | 2.2953942E−10 |
| A10 | 1.4875183E−10 | 2.6214402E−11 |

Example 4

Figure 12:
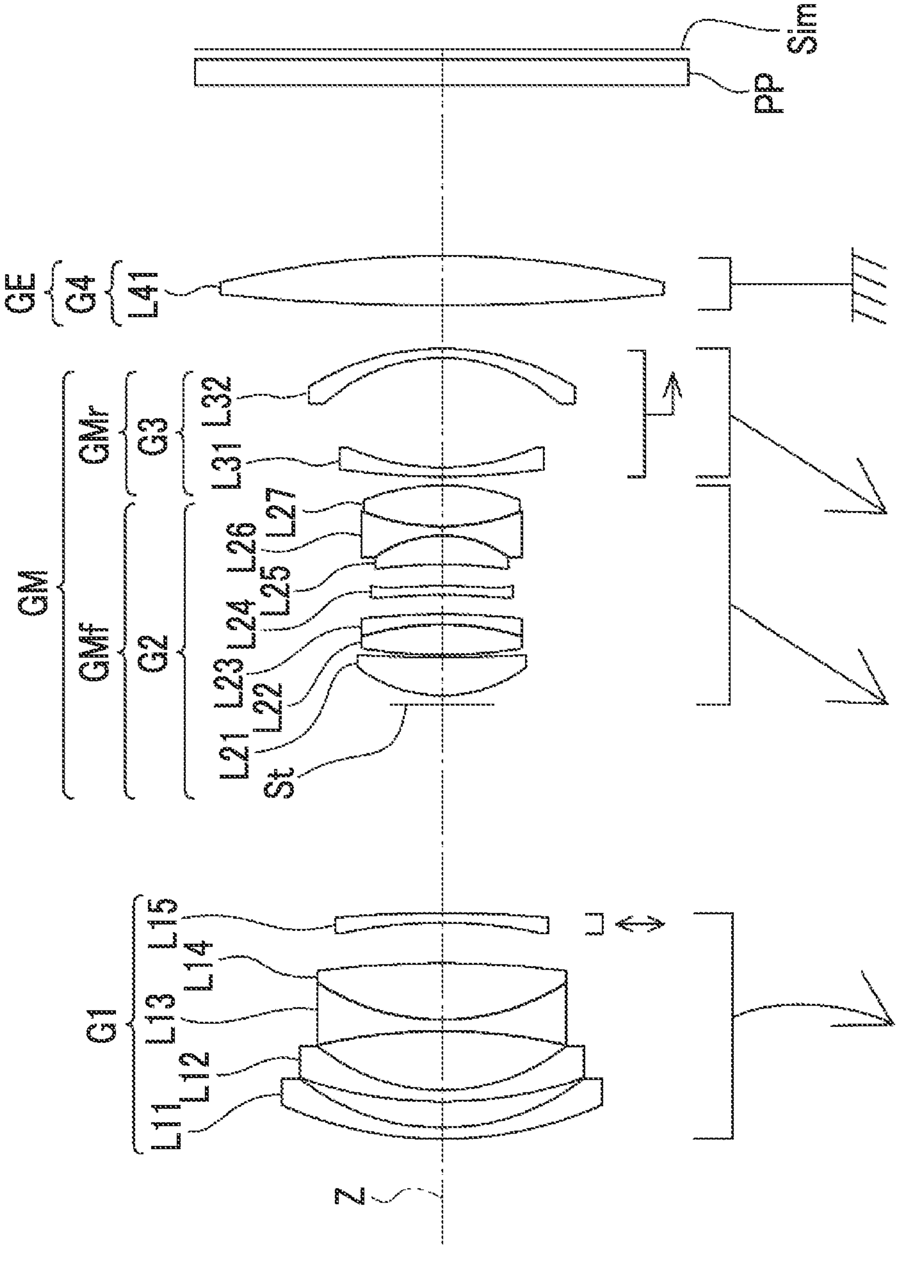
FIG. 12 is a cross-sectional view of a configuration of a zoom lens of Example 4 and a diagram showing movement loci thereof.

FIG. 12 shows a cross-sectional view of the configuration and movement loci of the zoom lens of Example 4 at the wide angle end in a state where the infinite distance object is in focus. The zoom lens shown in Example 4 consists of, in order from the object side to the image side along the optical axis Z, a first lens group G1 having a negative refractive power, a second lens group G2 having a positive refractive power, a third lens group G3 having a negative refractive power, and a fourth lens group G4 having a positive refractive power. The middle group GM consists of the second lens group G2 and the third lens group G3. The front subgroup GMf consists of the second lens group G2. The rear subgroup GMr consists of the third lens group G3. The final group GE consists of the fourth lens group G4.

The first lens group G1 consists of five lenses L11 to L15 in order from the object side to the image side. The second lens group G2 consists of an aperture stop St and seven lenses L21 to L27 in order from the object side to the image side. The third lens group G3 consists of two lenses L31 and L32 in order from the object side to the image side. The fourth lens group G4 consists of one lens L41.

During zooming, the first lens group G1, the second lens group G2, and the third lens group G3 move along the optical axis Z by changing the spacing between the adjacent groups in the direction of the optical axis, and the fourth lens group G4 remains stationary with respect to the image plane Sim. The focus group consists of the entire third lens group G3. The vibration-proof group consists of the lens L15.

Figure 13:
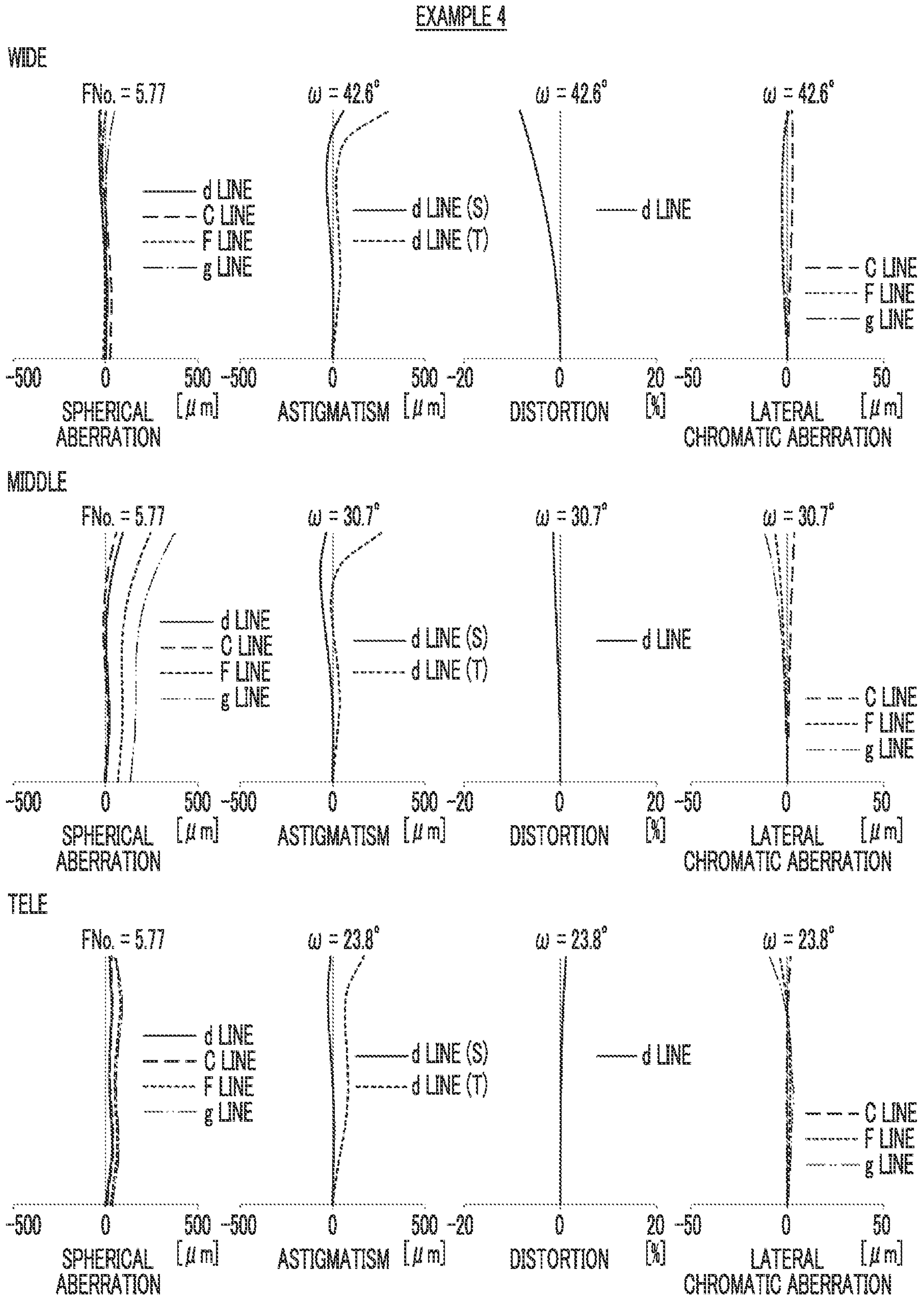
FIG. 13 is a diagram showing aberrations of the zoom lens of Example 4.

Regarding the zoom lens of Example 4, Table 10 shows basic lens data, Table 11 shows specifications and variable surface spacings, and Table 12 shows aspherical surface coefficients thereof. FIG. 13 shows aberration diagrams.

TABLE 10

| Example 4 | | | | | | | | |
|---|---|---|---|---|---|---|---|---|
| Sn | R | D | Nd | νd | θgF | SG | dNd/dT | ED |
| 1 | 44.97328 | 1.250 | 1.91082 | 35.25 | 0.58224 | 4.97 | 5.3 | |
| 2 | 26.38035 | 2.904 | | | | | | |
| 3 | 50.52795 | 1.250 | 1.90366 | 31.31 | 0.59481 | 4.51 | 4.0 | |
| 4 | 22.61953 | 6.491 | | | | | | |
| 5 | −64.44855 | 1.260 | 1.49700 | 81.61 | 0.53887 | 3.70 | −6.2 | |
| 6 | 26.03752 | 6.210 | 1.90043 | 37.37 | 0.57720 | 5.19 | 4.3 | |
| 7 | −118.97763 | 4.503 | | | | | | |
| 8 | −52.40377 | 1.031 | 1.48749 | 70.44 | 0.53062 | 2.45 | −1.4 | |
| 9 | −149.01756 | DD[9] | | | | | | |
| 10(St) | ∞ | 1.000 | | | | | | |
| 11 | 15.96026 | 4.208 | 1.48749 | 70.44 | 0.53062 | 2.45 | −1.4 | 17.55 |
| 12 | 178.61656 | 0.284 | | | | | | |
| 13 | 55.69847 | 3.342 | 1.49700 | 81.61 | 0.53887 | 3.70 | −6.2 | |
| 14 | −31.56993 | 1.010 | 1.59551 | 39.22 | 0.58042 | 2.62 | 2.4 | |
| 15 | −83.87250 | 2.167 | | | | | | |
| *16 | 44.22838 | 1.000 | 1.68948 | 31.02 | 0.59874 | 2.88 | 0.0 | |
| *17 | −43.57239 | 2.336 | | | | | | |
| 18 | −52.16682 | 3.170 | 1.75575 | 24.71 | 0.62909 | 3.19 | −0.5 | |
| 19 | −12.86196 | 1.010 | 1.73800 | 32.33 | 0.59005 | 3.19 | 5.1 | |
| 20 | 24.45061 | 4.509 | 1.49700 | 81.61 | 0.53887 | 3.70 | −6.2 | |
| 21 | −25.01634 | DD[21] | | | | | | |
| 22 | 84.38029 | 1.000 | 1.49700 | 81.61 | 0.53887 | 3.70 | −6.2 | |
| 23 | 26.86525 | 12.089 | | | | | | |
| 24 | −19.80243 | 1.000 | 1.92286 | 20.88 | 0.63900 | 3.94 | 1.8 | |
| 25 | −28.83430 | DD[25] | | | | | | 26.84 |
| 26 | 257.76070 | 5.485 | 1.90366 | 31.31 | 0.59481 | 4.51 | 4.0 | |
| 27 | −106.66340 | 18.784 | | | | | | |
| 28 | ∞ | 2.850 | 1.51680 | 64.20 | 0.53430 | | | |
| 29 | ∞ | 1.125 | | | | | | |

TABLE 11

| Example 4 | | | | | |
|---|---|---|---|---|---|
| | Wide angle end Infinity | Middle Infinity | Telephoto end Infinity | Wide angle end β = −0.1 | Telephoto end β = −0.1 |
| Zr | 1.0 | 1.4 | 1.9 | 1.0 | 1.9 |
| f | 32.473 | 46.761 | 61.162 | — | — |
| Bf | 21.788 | 21.788 | 21.788 | — | — |
| FNo. | 5.77 | 5.77 | 5.77 | — | — |
| 2ω(°) | 85.2 | 61.4 | 47.6 | — | — |

TABLE 11-continued

| Example 4 | | | | | |
|---|---|---|---|---|---|
| | Wide angle end Infinity | Middle Infinity | Telephoto end Infinity | Wide angle end β = −0.1 | Telephoto end β = −0.1 |
| DD[9] | 22.978 | 10.349 | 1.487 | 22.978 | 1.487 |
| DD[21] | 1.000 | 2.765 | 5.950 | 2.539 | 7.791 |
| DD[25] | 4.759 | 15.623 | 21.300 | 3.220 | 19.459 |

TABLE 12

| Example 4 | | |
|---|---|---|
| Sn | 16 | 17 |
| KA | 1.0000000E+00 | 1.0000000E+00 |
| A3 | 0.0000000E+00 | 0.0000000E+00 |
| A4 | 4.4423566E−05 | 1.0452164E−04 |
| A5 | −2.9662980E−06 | −5.9427317E−06 |
| A6 | 1.5237040E−06 | 2.4767436E−06 |
| A7 | 1.1900923E−07 | 2.0860763E−08 |
| A8 | −1.8970021E−08 | −1.5969660E−08 |
| A9 | −1.7565654E−10 | 6.5536000E−10 |
| A10 | 2.2906649E−11 | −1.8144157 − 11 |

Example 5

Figure 14:
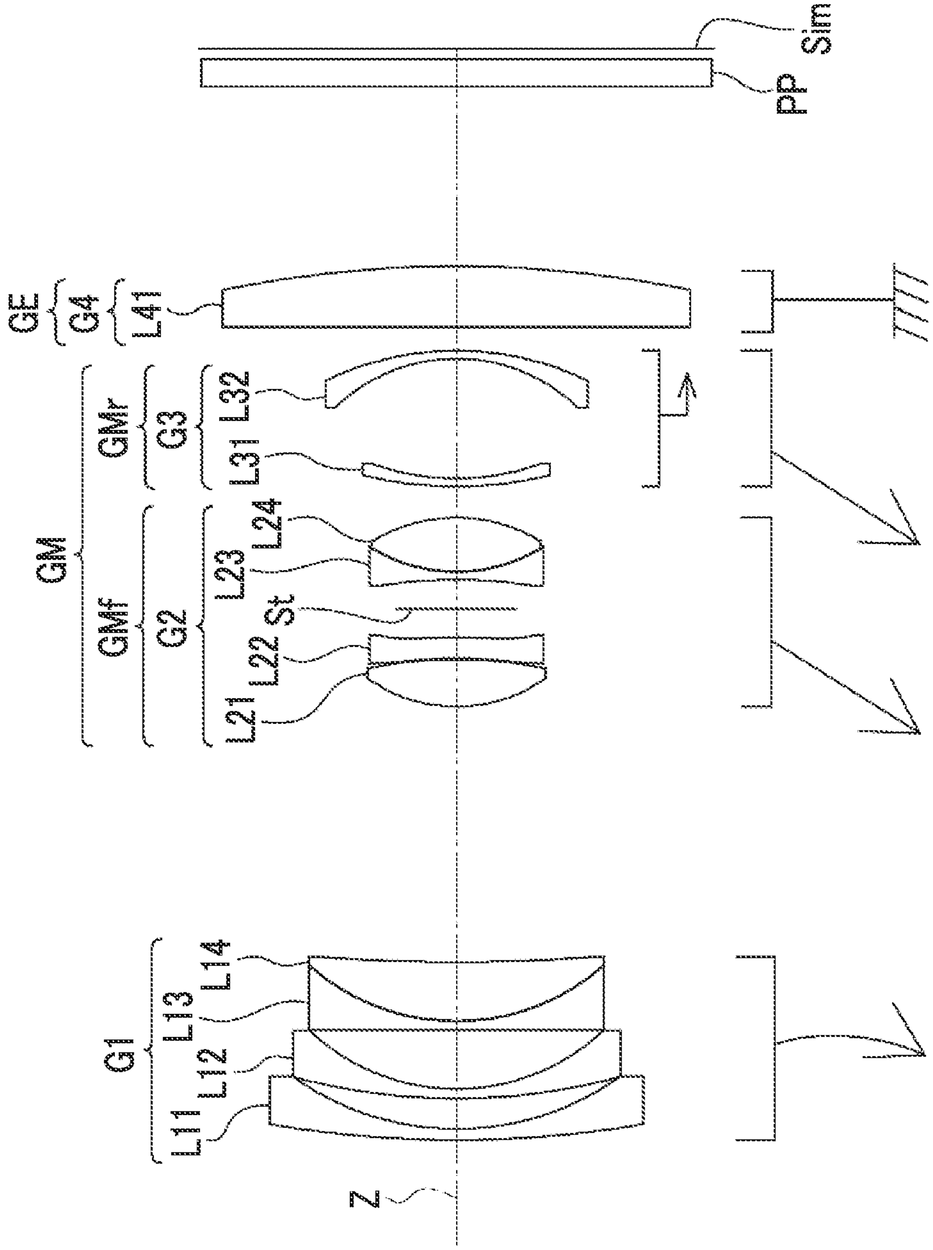
FIG. 14 is a cross-sectional view of a configuration of a zoom lens of Example 5 and a diagram showing movement loci thereof.

FIG. 14 shows a cross-sectional view of the configuration and movement loci of the zoom lens of Example 5 at the wide angle end in a state where the infinite distance object is in focus. The zoom lens shown in Example 5 consists of, in order from the object side to the image side along the optical axis Z, a first lens group G1 having a negative refractive power, a second lens group G2 having a positive refractive power, a third lens group G3 having a negative refractive power, and a fourth lens group G4 having a positive refractive power. The middle group GM consists of the second lens group G2 and the third lens group G3. The front subgroup GMf consists of the second lens group G2. The rear subgroup GMr consists of the third lens group G3. The final group GE consists of the fourth lens group G4.

The first lens group G1 consists of four lenses L11 to L14 in order from the object side to the image side. The second lens group G2 consists of a lens L21, a lens L22, an aperture stop St, a lens L23, and a lens L24 in order from the object side to the image side. The third lens group G3 consists of two lenses L31 and L32 in order from the object side to the image side. The fourth lens group G4 consists of one lens L41.

During zooming, the first lens group G1, the second lens group G2, and the third lens group G3 move along the optical axis Z by changing the spacing between the adjacent groups in the direction of the optical axis, and the fourth lens group G4 remains stationary with respect to the image plane Sim. The focus group consists of the entire third lens group G3.

Figure 15:
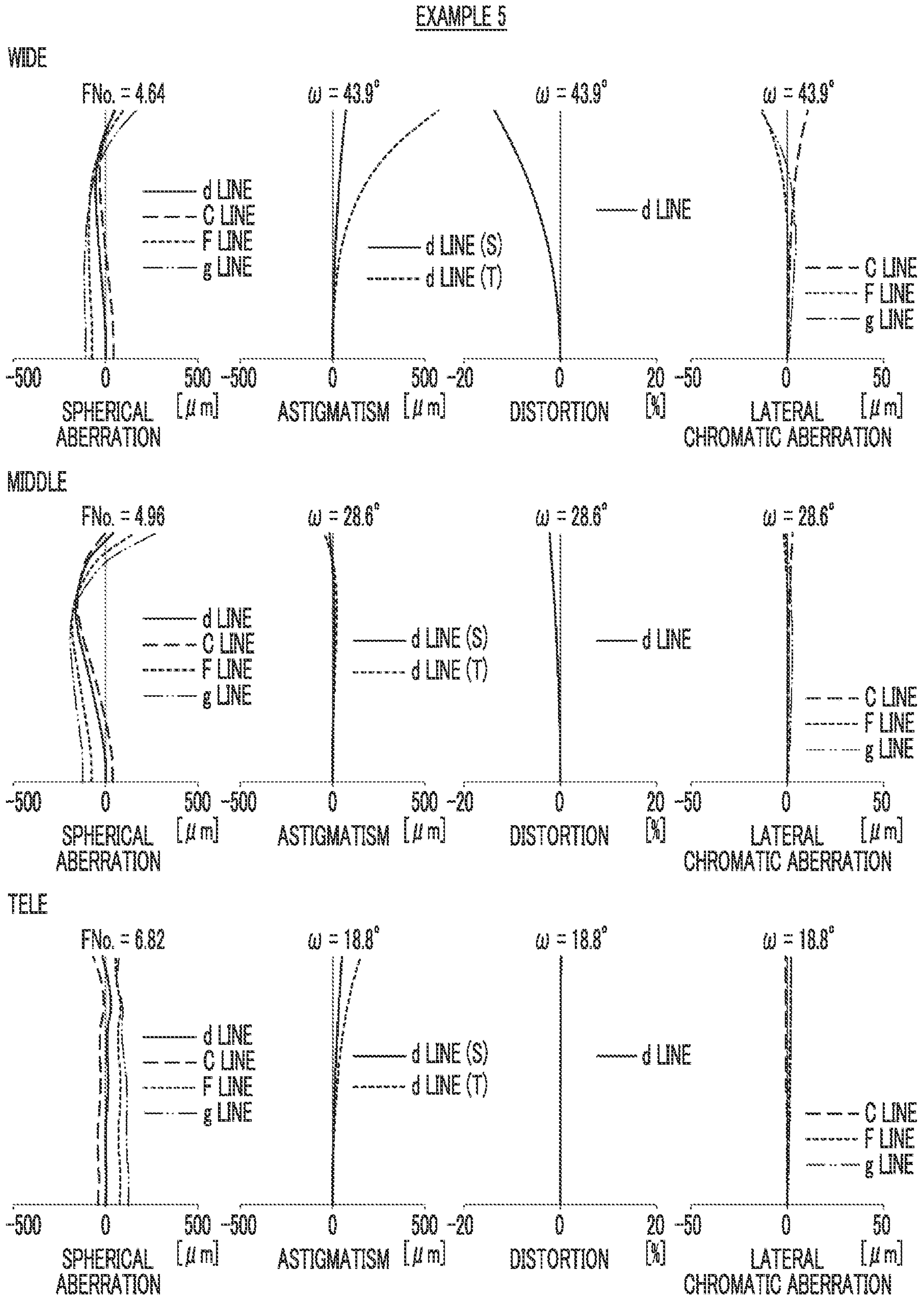
FIG. 15 is a diagram showing aberrations of the zoom lens of Example 5.

Regarding the zoom lens of Example 5, Table 13 shows basic lens data, Table 14 shows specifications and variable surface spacings, and Table 15 shows aspherical surface coefficients thereof. FIG. 15 shows aberration diagrams.

TABLE 13

| Example 5 | | | | | | | | |
|---|---|---|---|---|---|---|---|---|
| Sn | R | D | Nd | νd | θgF | SG | dNd/dT | ED |
| 1 | 121.76613 | 1.150 | 1.95375 | 32.32 | 0.59015 | 5.10 | 4.9 | |
| 2 | 30.82121 | 3.192 | | | | | | |
| 3 | 68.91678 | 1.000 | 1.58313 | 59.46 | 0.54336 | 3.24 | 3.4 | |
| 4 | 23.31262 | 6.127 | | | | | | |
| 5 | ∞ | 0.960 | 1.48749 | 70.39 | 0.53005 | 2.48 | −1.5 | |
| 6 | 24.28656 | 6.175 | 1.91082 | 35.25 | 0.58224 | 4.97 | 5.3 | |
| 7 | 199.51444 | DD[7] | | | | | | |
| 8 | 16.68949 | 4.957 | 1.49700 | 81.61 | 0.53887 | 3.7 | −6.2 | 18.00 |
| 9 | −46.07000 | 0.100 | | | | | | |
| *10 | −38.36541 | 2.192 | 1.58660 | 59.01 | 0.54152 | 2.7 | 5.1 | |
| *11 | −64.49761 | 3.002 | | | | | | |
| 12(St) | ∞ | 3.003 | | | | | | |
| 13 | −55.10725 | 0.850 | 1.67003 | 47.20 | 0.56411 | 3.61 | 4.7 | |
| 14 | 17.65797 | 5.649 | 1.49700 | 81.61 | 0.53887 | 3.70 | −6.2 | |
| 15 | −17.65797 | DD[15] | | | | | | |
| 16 | 42.35716 | 0.850 | 1.72916 | 54.67 | 0.54534 | 4.05 | 3.4 | |
| 17 | 27.14128 | 12.500 | | | | | | |
| 18 | −18.97503 | 0.850 | 1.91082 | 35.25 | 0.58224 | 4.97 | 5.3 | |
| 19 | −32.67690 | DD[19] | | | | | | 25.41 |
| 20 | ∞ | 6.236 | 1.92119 | 23.96 | 0.62025 | 3.84 | 2.4 | |
| 21 | −127.88100 | 18.775 | | | | | | |
| 22 | ∞ | 2.850 | 1.51680 | 64.20 | 0.53430 | | | |
| 23 | ∞ | 1.127 | | | | | | |

TABLE 14

| Example 5 | | | | | |
|---|---|---|---|---|---|
| | Wide angle end Infinity | Middle Infinity | Telephoto end Infinity | Wide angle end β = −0.1 | Telephoto end β = −0.1 |
| Zr | 1.0 | 1.6 | 2.4 | 1.0 | 2.4 |
| f | 32.972 | 51.398 | 80.123 | — | — |
| Bf | 21.780 | 21.780 | 21.780 | — | — |
| FNo. | 4.64 | 4.96 | 6.82 | — | — |
| 2ω(°) | 87.8 | 57.2 | 37.6 | — | — |
| DD[7] | 26.579 | 10.203 | 1.567 | 26.579 | 1.567 |
| DD[15] | 3.260 | 5.351 | 6.132 | 4.633 | 7.421 |
| DD[19] | 2.471 | 13.552 | 35.647 | 1.098 | 34.358 |

TABLE 15

| Example 5 | | |
|---|---|---|
| Sn | 10 | 11 |
| KA | 1.0000000E+00 | 1.0000000E+00 |
| A3 | 0.0000000E+00 | 0.0000000E+00 |
| A4 | 8.4920932E−05 | 1.4039088E−04 |
| A5 | −1.7647480E−07 | −1.8591463E−06 |
| A6 | 1.6500597E−07 | 1.1655413E−06 |
| A7 | 6.9139011E−08 | −1.2697382E−07 |
| A8 | −2.3300086E−08 | 2.3071068E−09 |
| A9 | 1.9163258E−09 | 4.0206908E−10 |
| A10 | −5.5644267E−11 | −2.6214400E−11 |

Example 6

Figure 16:
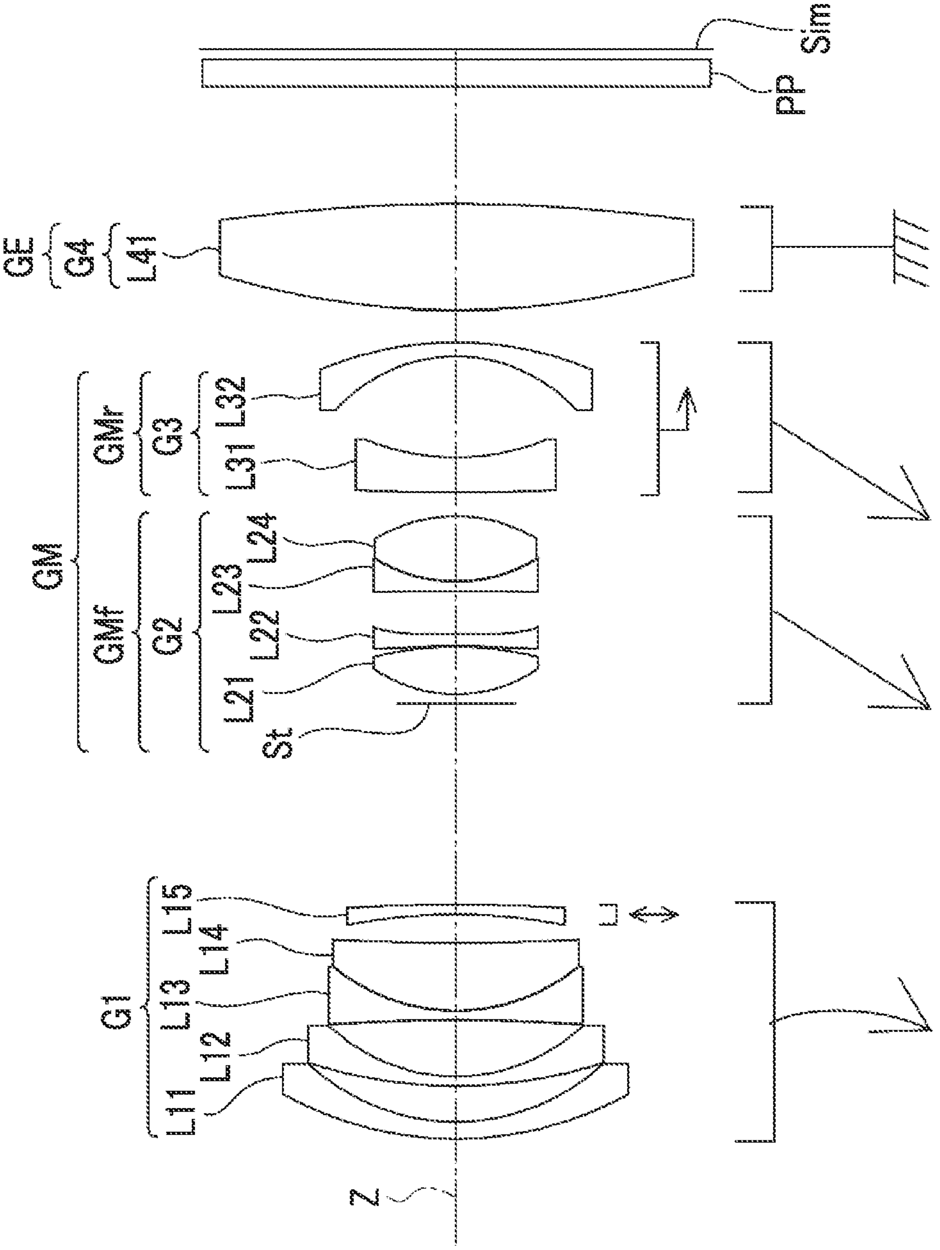
FIG. 16 is a cross-sectional view of a configuration of a zoom lens of Example 6 and a diagram showing movement loci thereof.

FIG. 16 shows a cross-sectional view of the configuration and movement loci of the zoom lens of Example 6 at the wide angle end in a state where the infinite distance object is in focus. The zoom lens shown in Example 6 consists of, in order from the object side to the image side along the optical axis Z, a first lens group G1 having a negative refractive power, a second lens group G2 having a positive refractive power, a third lens group G3 having a negative refractive power, and a fourth lens group G4 having a positive refractive power. The middle group GM consists of the second lens group G2 and the third lens group G3. The front subgroup GMf consists of the second lens group G2. The rear subgroup GMr consists of the third lens group G3. The final group GE consists of the fourth lens group G4.

The first lens group G1 consists of five lenses L11 to L15 in order from the object side to the image side. The second lens group G2 consists of an aperture stop St and four lenses L21 to L24 in order from the object side to the image side. The third lens group G3 consists of two lenses L31 and L32 in order from the object side to the image side. The fourth lens group G4 consists of one lens L41.

During zooming, the first lens group G1, the second lens group G2, and the third lens group G3 move along the optical axis Z by changing the spacing between the adjacent groups in the direction of the optical axis, and the fourth lens group G4 remains stationary with respect to the image plane Sim. The focus group consists of the entire third lens group G3. The vibration-proof group consists of the lens L15.

Figure 17:
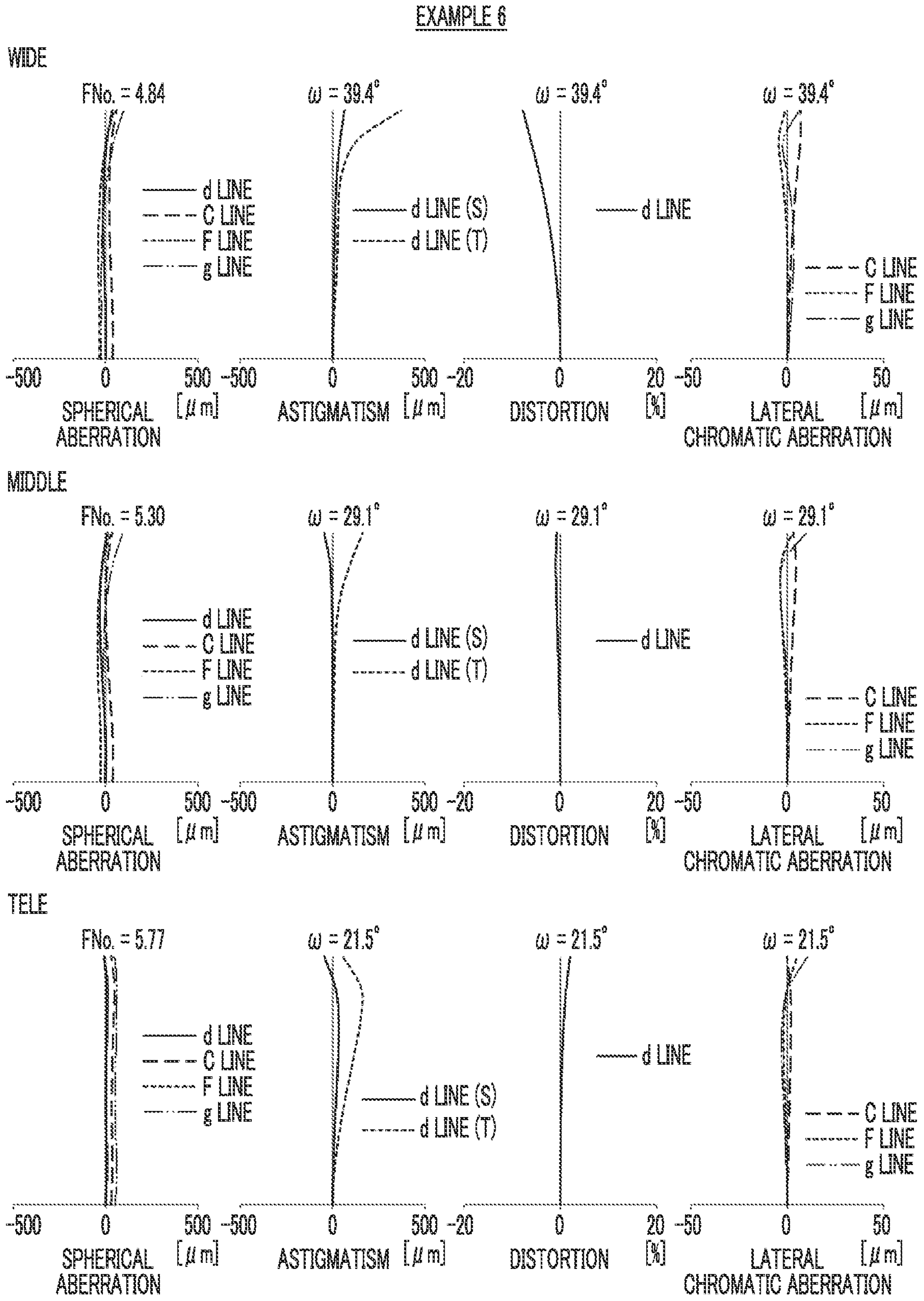
FIG. 17 is a diagram showing aberrations of the zoom lens of Example 6.

Regarding the zoom lens of Example 6, Table 16 shows basic lens data, Table 17 shows specifications and variable surface spacings, and Table 18 shows aspherical surface coefficients thereof. FIG. 17 shows aberration diagrams.

TABLE 16

| Example 6 | | | | | | | | |
|---|---|---|---|---|---|---|---|---|
| Sn | R | D | Nd | νd | θgF | SG | dNd/dT | ED |
| 1 | 39.98959 | 1.850 | 1.74000 | 28.30 | 0.60790 | 3.11 | 2.4 | |
| 2 | 24.37501 | 3.848 | | | | | | |
| 3 | 54.94631 | 1.000 | 1.55200 | 70.73 | 0.54190 | 3.74 | −2.9 | |
| 4 | 20.66326 | 6.032 | | | | | | |
| 5 | −208.92870 | 1.010 | 1.51742 | 52.43 | 0.55649 | 2.46 | 2.4 | |
| 6 | 21.63078 | 7.285 | 1.91082 | 35.25 | 0.58224 | 4.97 | 5.3 | |
| 7 | 268.18627 | 2.943 | | | | | | |
| 8 | −61.85589 | 1.039 | 1.48749 | 70.42 | 0.53039 | 2.43 | −1.8 | |
| 9 | −205.40726 | DD[9] | | | | | | |
| 10(St) | ∞ | 1.000 | | | | | | |
| 11 | 16.30809 | 5.105 | 1.49700 | 81.59 | 0.53701 | 3.70 | −6.6 | 16.81 |
| 12 | −37.42224 | 0.100 | | | | | | |
| *13 | −54.52659 | 1.250 | 1.58313 | 59.38 | 0.54237 | 3.05 | 3.7 | |
| *14 | −204.87140 | 4.643 | | | | | | |
| 15 | −255.75168 | 1.000 | 1.74400 | 44.79 | 0.56560 | 4.32 | 3.0 | |
| 16 | 17.51443 | 6.989 | 1.47329 | 78.16 | 0.54930 | 3.66 | −5.9 | |
| 17 | −17.66529 | DD[17] | | | | | | |
| 18 | 235.18307 | 3.750 | 1.48749 | 70.44 | 0.53062 | 2.45 | −1.5 | |
| 19 | 26.85953 | 10.841 | | | | | | |
| 20 | −18.10750 | 1.500 | 1.74000 | 28.30 | 0.60790 | 3.11 | 2.4 | |
| 21 | −39.64836 | DD[21] | | | | | | 28.31 |
| 22 | 92.47888 | 11.342 | 1.84666 | 23.78 | 0.61923 | 3.50 | 1.4 | |
| 23 | −194.68781 | 12.645 | | | | | | |
| 24 | ∞ | 2.850 | 1.51680 | 64.20 | 0.53430 | | | |
| 25 | ∞ | 1.123 | | | | | | |

TABLE 17

| Example 6 | | | | | |
|---|---|---|---|---|---|
| | Wide angle end Infinity | Middle Infinity | Telephoto end Infinity | Wide angle end β = −0.1 | Telephoto end β = −0.1 |
| Zr | 1.0 | 1.4 | 1.9 | 1.0 | 1.9 |
| f | 36.060 | 49.453 | 67.920 | — | — |
| Bf | 15.647 | 15.647 | 15.647 | — | — |
| FNo. | 4.84 | 5.30 | 5.77 | — | — |
| 2ω(°) | 78.8 | 58.2 | 43.0 | — | — |
| DD[9] | 21.567 | 9.713 | 1.489 | 21.567 | 1.489 |
| DD[17] | 2.561 | 3.716 | 4.721 | 3.802 | 5.966 |
| DD[21] | 3.376 | 11.306 | 23.039 | 2.135 | 21.794 |

TABLE 18

| Example 6 | | |
|---|---|---|
| Sn | 13 | 14 |
| KA | 1.0000000E+00 | 1.0000000E+00 |
| A3 | 0.0000000E+00 | 0.0000000E+00 |
| A4 | 1.0426306E−04 | 1.7318619E−04 |
| A5 | −2.5911222E−06 | −4.3440832E−06 |
| A6 | −1.3693691E−07 | 7.6826995E−07 |
| A7 | 7.2961792E−08 | −9.2639546E−08 |
| A8 | −2.0983661E−08 | 2.5353790E−09 |
| A9 | 1.3814194E−09 | −3.5684015E−10 |
| A10 | −2.1618987E−11 | 2.6214400E−11 |

Example 7

Figure 18:
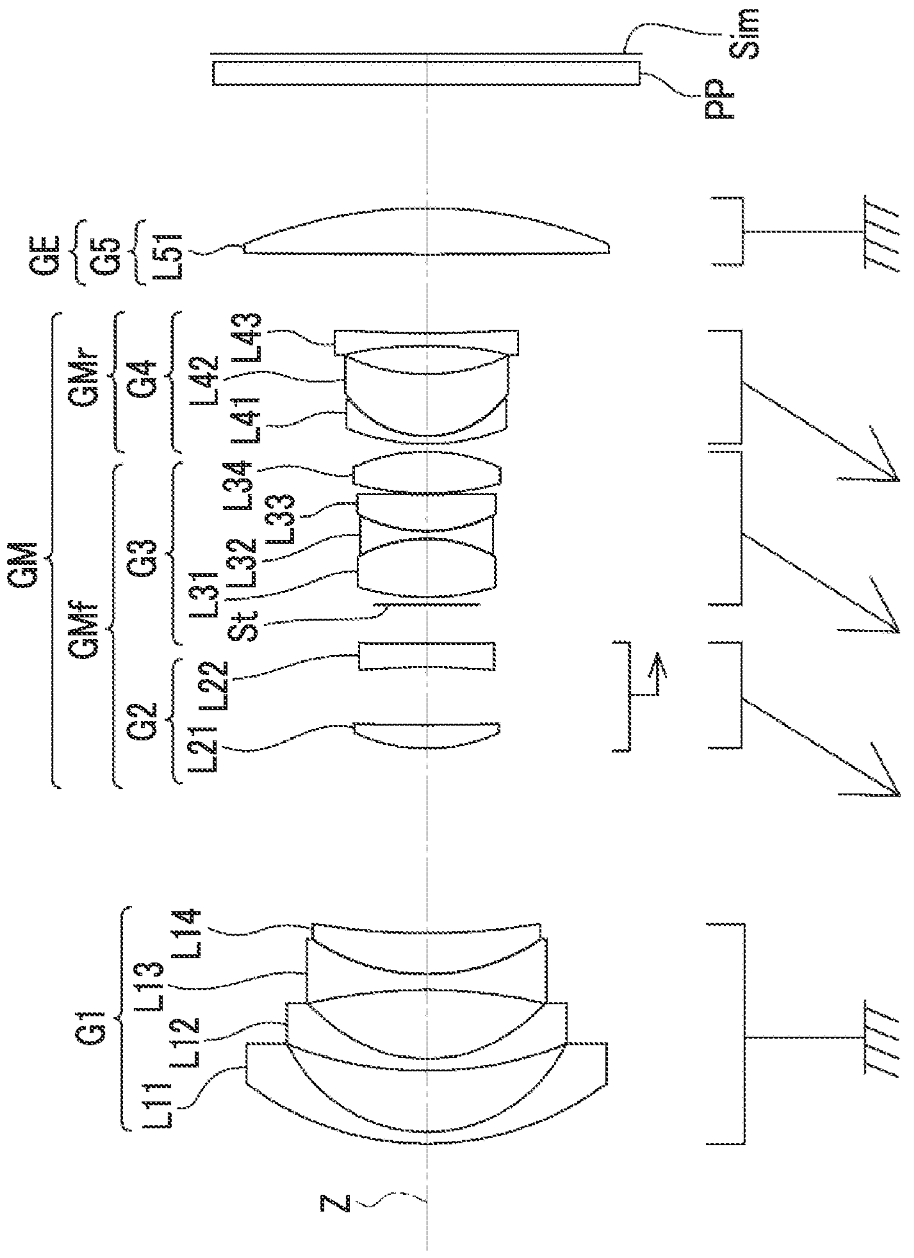
FIG. 18 is a cross-sectional view of a configuration of a zoom lens of Example 7 and a diagram showing movement loci thereof.

FIG. 18 shows a cross-sectional view of the configuration and movement loci of the zoom lens of Example 7 at the wide angle end in a state where the infinite distance object is in focus. The zoom lens of Example 7 consists of, in order from the object side to the image side along the optical axis Z, a first lens group G1 having a negative refractive power, a second lens group G2 having a positive refractive power, a third lens group G3 having a positive refractive power, a fourth lens group G4 having a negative refractive power, and a fifth lens group G5 having a positive refractive power. The middle group GM consists of the second lens group G2, the third lens group G3, and the fourth lens group G4. The front subgroup GMf consists of the second lens group G2 and the third lens group G3. The rear subgroup GMr consists of the fourth lens group G4. The final group GE consists of the fifth lens group G5.

The first lens group G1 consists of four lenses L11 to L14 in order from the object side to the image side. The second lens group G2 consists of two lenses L21 and L22 in order from the object side to the image side. The third lens group G3 consists of the aperture stop St and four lenses L31 to L34 in order from the object side to the image side. The fourth lens group G4 consists of three lenses L41 to L43 in order from the object side to the image side. The fifth lens group G5 consists of one lens L51.

During zooming, the second lens group G2, the third lens group G3, and the fourth lens group G4 move along the optical axis Z by changing the spacing between the adjacent groups in the direction of the optical axis, and the first lens group G1 and the fifth lens group G5 remain stationary with respect to the image plane Sim. The focus group consists of the entire second lens group G2.

Figure 19:
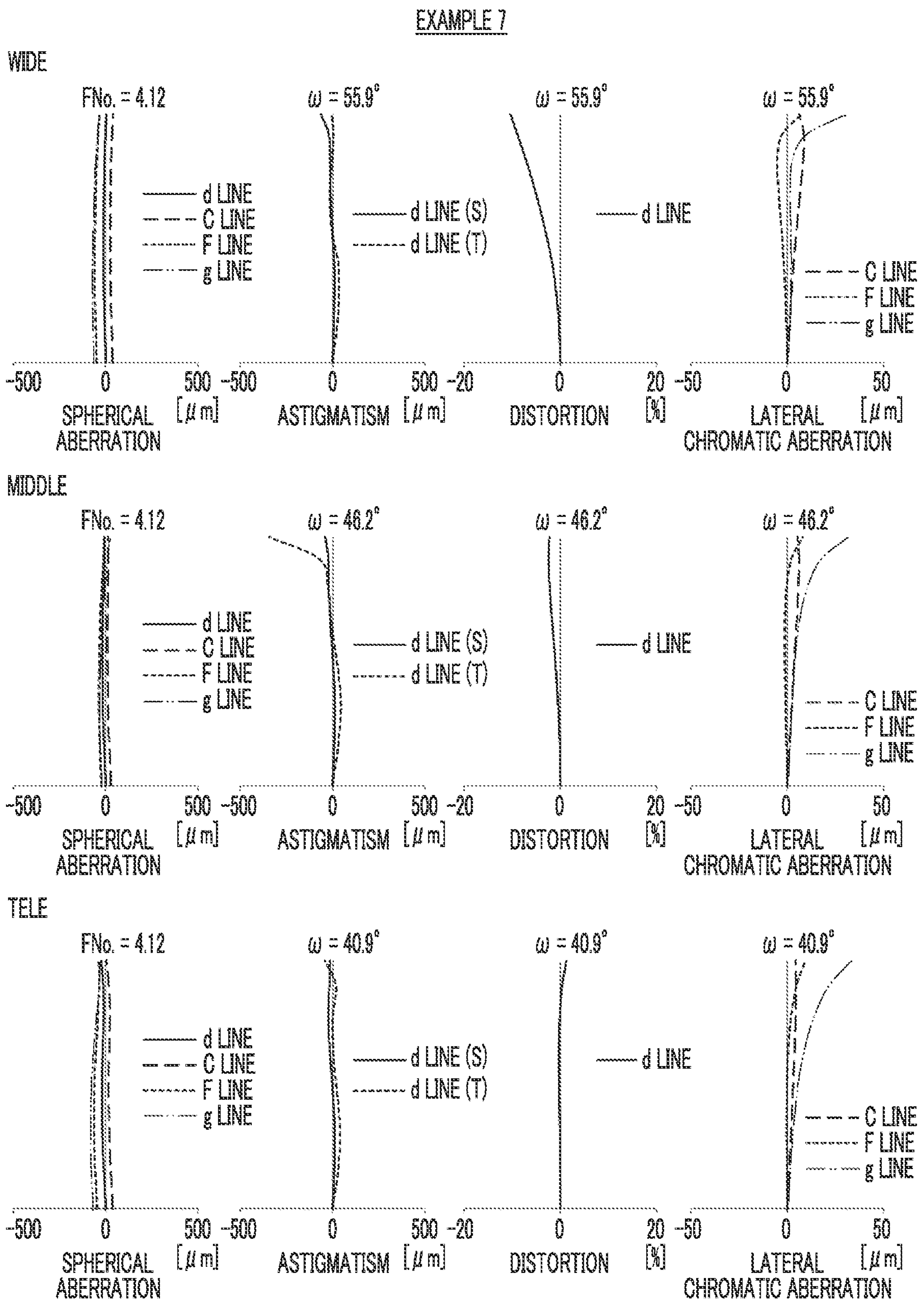
FIG. 19 is a diagram showing aberrations of the zoom lens of Example 7.

Regarding the zoom lens of Example 7, Table 19 shows basic lens data, Table 20 shows specifications and variable surface spacings, and Table 21 shows aspherical surface coefficients thereof. FIG. 19 shows aberration diagrams.

TABLE 19

| Example 7 | | | | | | | | |
|---|---|---|---|---|---|---|---|---|
| Sn | R | D | Nd | νd | θgF | SG | dNd/dT | ED |
| 1 | 39.69500 | 1.500 | 1.92119 | 23.96 | 0.62025 | 3.84 | 2.4 | |
| 2 | 20.29884 | 7.846 | | | | | | |
| *3 | 63.03240 | 1.500 | 1.58313 | 59.38 | 0.54237 | 3.05 | 3.7 | |
| *4 | 19.66119 | 8.773 | | | | | | |
| 5 | −70.63009 | 2.010 | 1.49700 | 81.61 | 0.53887 | 3.70 | −6.2 | |
| 6 | 26.83729 | 5.250 | 1.84666 | 23.78 | 0.61923 | 3.50 | 1.4 | |
| 7 | 90.33591 | DD[7] | | | | | | |
| 8 | 22.89876 | 3.000 | 1.61800 | 63.33 | 0.54414 | 3.67 | −3.6 | 18.70 |
| 9 | 319.45534 | 7.421 | | | | | | |
| *10 | −58.08644 | 3.000 | 1.58313 | 59.38 | 0.54237 | 3.05 | 3.7 | |
| *11 | −117.44311 | DD[11] | | | | | | |
| 12(St) | ∞ | 1.000 | | | | | | |
| 13 | 30.63696 | 7.444 | 1.72047 | 34.71 | 0.58350 | 3.19 | 3.5 | |
| 14 | −18.54761 | 1.000 | 1.91082 | 35.25 | 0.58224 | 4.97 | 5.3 | |
| 15 | 19.72774 | 4.711 | 1.49700 | 81.61 | 0.53887 | 3.7 | −6.2 | |
| 16 | 675.80986 | 0.100 | | | | | | |
| *17 | 36.52058 | 5.311 | 1.49710 | 81.56 | 0.53848 | 3.64 | −5.5 | |
| *18 | −23.87397 | DD[18] | | | | | | |
| 19 | 27.79508 | 1.000 | 1.78800 | 47.37 | 0.55598 | 4.3 | 4.4 | |
| 20 | 12.93313 | 7.899 | 1.49700 | 81.61 | 0.53887 | 3.70 | −6.2 | |
| 21 | 24.76814 | 3.613 | | | | | | |
| *22 | −75.32474 | 1.632 | 1.68948 | 31.02 | 0.59874 | 2.88 | 0.0 | |
| *23 | 97.86013 | DD[23] | | | | | | 23.59 |
| 24 | 1168.45304 | 5.943 | 1.91082 | 35.25 | 0.58224 | 4.97 | 5.3 | |

TABLE 19-continued

| Example 7 | | | | | | | | |
|---|---|---|---|---|---|---|---|---|
| Sn | R | D | Nd | νd | θgF | SG | dNd/dT | ED |
| 25 | −63.35665 | 15.722 | | | | | | |
| 26 | ∞ | 2.850 | 1.51680 | 64.20 | 0.53430 | | | |
| 27 | ∞ | 1.134 | | | | | | |

TABLE 20

| Example 7 | | | | | |
|---|---|---|---|---|---|
| | Wide angle end Infinity | Middle Infinity | Telephoto end Infinity | Wide angle end β = −0.1 | Telephoto end β = −0.1 |
| Zr | 1.0 | 1.3 | 1.5 | 1.0 | 1.5 |
| f | 20.617 | 26.802 | — | — | — |
| Bf | 18.734 | 18.734 | — | — | — |
| FNo. | 4.12 | 4.12 | — | — | — |
| 2ω(°) | 111.8 | 92.4 | — | — | — |
| DD[7] | 23.587 | 15.707 | 11.573 | 25.523 | 12.812 |
| DD[11] | 4.767 | 3.640 | 2.598 | 2.831 | 1.359 |
| DD[18] | 1.000 | 4.239 | 6.914 | 1.000 | 6.914 |
| DD[23] | 10.036 | 15.804 | 18.305 | 10.036 | 18.305 |

TABLE 21

| Example 7 | | | | |
|---|---|---|---|---|
| Sn | 3 | 4 | 10 | 11 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 3.5816737E−05 | 2.8181319E−05 | 4.6273834E−05 | 6.5932623E−05 |
| A5 | −2.3937693E−06 | −2.5079307E−06 | −3.9107444E−07 | 6.9486685E−07 |
| A6 | −3.2341788E−08 | −7.8607255E−09 | 1.7995092E−07 | 3.6793258E−08 |
| A7 | 6.2935812E−09 | 1.6418839E−09 | −4.0188906E−09 | 7.3789501E−09 |
| A8 | 8.8860872E−11 | −1.4838582E−10 | −1.2578521E−09 | 3.7796441E−10 |
| A9 | −1.8230771E−11 | 2.9188013E−11 | 6.2121478E−11 | −1.5471753E−10 |
| A10 | 3.8806925E−13 | −1.4280793E−12 | −6.2487552E−13 | 7.7430616E−12 |
| Sn | 17 | 18 | 22 | 23 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 7.1174964E−07 | 9.0712036E−07 | −4.7563389E−05 | −3.2226551E−05 |
| A5 | 4.7209889E−07 | −3.9052718E−07 | 1.3180024E−06 | −3.4319459E−07 |
| A6 | −1.3286512E−07 | 2.7997124E−08 | 7.7425059E−08 | 3.2104805E−07 |
| A7 | 1.1039354E−08 | −8.7558245E−10 | −4.6460082E−09 | −1.3287663E−08 |
| A8 | 3.5916008E−10 | −1.4568551E−10 | −4.6981680E−10 | −1.3322015E−09 |
| A9 | −9.6668909E−11 | 1.0823575E−11 | 1.1106969E−10 | 1.4823734E−10 |
| A10 | 3.4252859E−12 | −7.1189034E−13 | −7.7800126E−12 | −5.7904702E−12 |

Example 8

Figure 20:
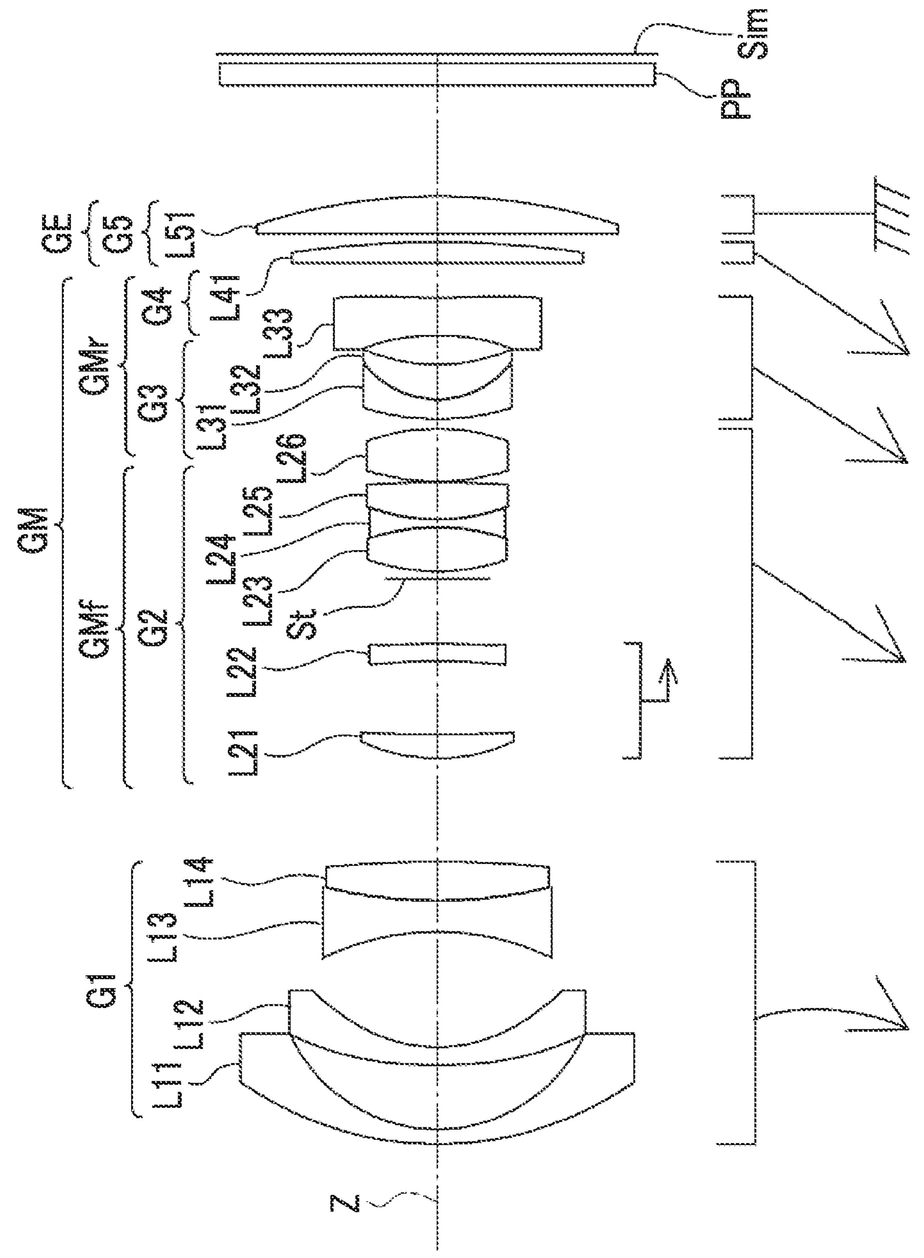
FIG. 20 is a cross-sectional view of a configuration of a zoom lens of Example 8 and a diagram showing movement loci thereof.

FIG. 20 shows a cross-sectional view of the configuration and movement loci of the zoom lens of Example 8 at the wide angle end in a state where the infinite distance object is in focus. The zoom lens of Example 8 consists of, in order from the object side to the image side along the optical axis Z, a first lens group G1 having a negative refractive power, a second lens group G2 having a positive refractive power, a third lens group G3 having a negative refractive power, a fourth lens group G4 having a positive refractive power, and a fifth lens group G5 having a positive refractive power. The middle group GM consists of the second lens group G2, the third lens group G3, and the fourth lens group G4. The front subgroup GMf consists of the second lens group G2. The rear subgroup GMr consists of the third lens group G3 and the fourth lens group G4. The final group GE consists of the fifth lens group G5.

The first lens group G1 consists of four lenses L11 to L14 in order from the object side to the image side. The second lens group G2 consists of two lenses L21 and L22, an aperture stop St, and four lenses L23 to L26 in order from the object side to the image side. The third lens group G3 consists of three lenses L31 to L33 in order from the object side to the image side. The fourth lens group G4 consists of one lens L41. The fifth lens group G5 consists of one lens L51.

During zooming, the first lens group G1, the second lens group G2, the third lens group G3, and the fourth lens group G4 move along the optical axis Z by changing the spacing between the adjacent groups in the direction of the optical axis, and the fifth lens group G5 remains stationary with respect to the image plane Sim. The focus group consists of two lenses L21 and L22.

Figure 22:
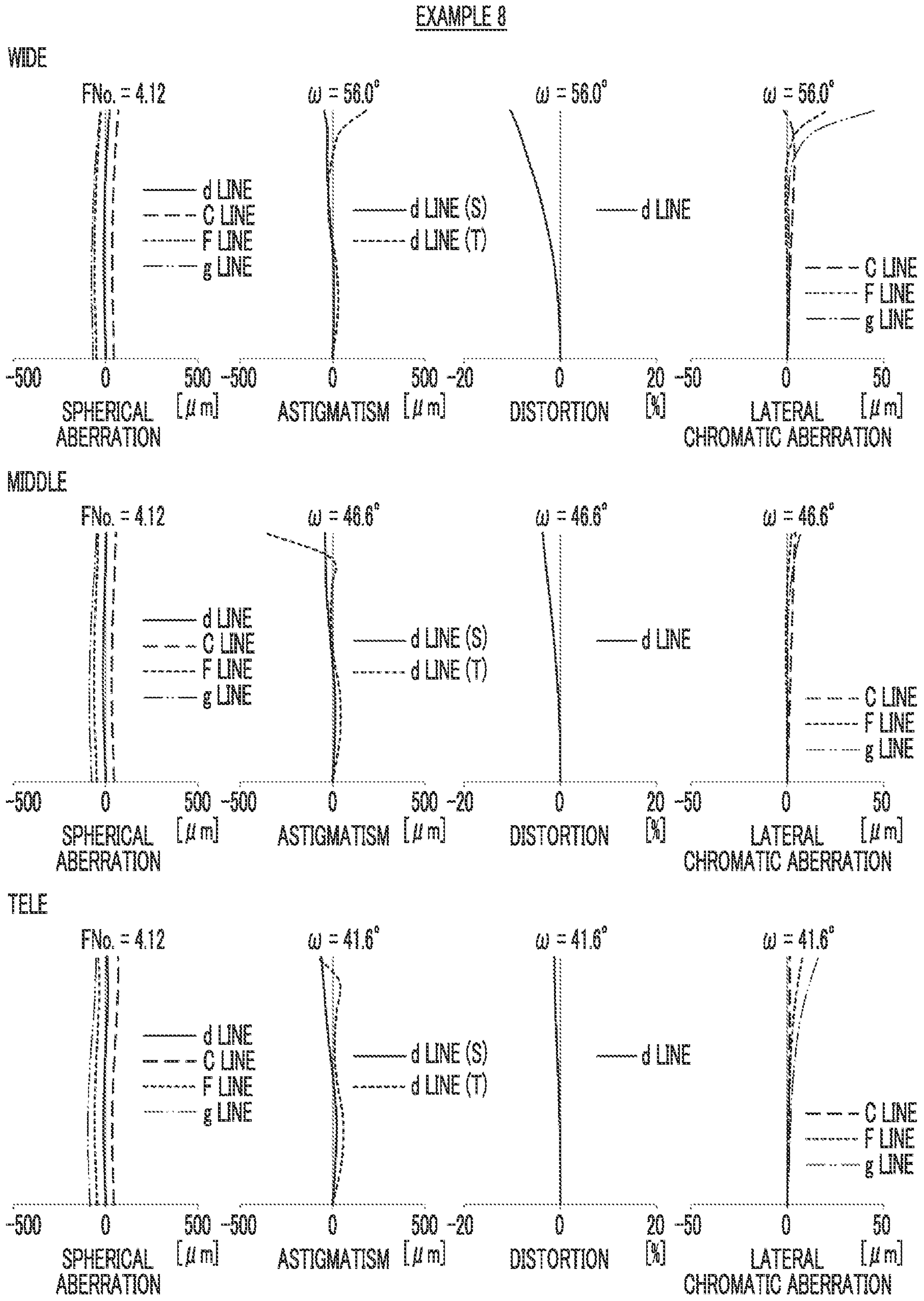
FIG. 22 is a diagram showing aberrations of the zoom lens of Example 8.

Regarding the zoom lens of Example 8, Table 22 shows basic lens data, Table 23 shows specifications and variable surface spacings, and Table 24 shows aspherical surface coefficients thereof. FIG. 22 shows aberration diagrams.

TABLE 22

| Example 8 | | | | | | | | |
|---|---|---|---|---|---|---|---|---|
| Sn | R | D | Nd | νd | θgF | SG | dNd/dT | ED |
| 1 | 44.62317 | 1.850 | 1.90366 | 31.31 | 0.59481 | 3.19 | 4.0 | |
| 2 | 20.83349 | 7.997 | | | | | | |
| *3 | 64.27125 | 2.255 | 1.58313 | 59.38 | 0.54237 | 3.05 | 3.7 | |
| *4 | 19.83007 | 14.377 | | | | | | |
| 5 | −34.46726 | 3.940 | 1.49700 | 81.61 | 0.53887 | 3.70 | −6.2 | |
| 6 | 63.36355 | 4.837 | 1.84666 | 23.78 | 0.61923 | 3.50 | 1.4 | |
| 7 | −148.22321 | DD[7] | | | | | | |
| 8 | 22.98470 | 3.000 | 1.58313 | 59.37 | 0.54345 | 3.19 | 3.5 | 19.5 |
| 9 | 226.52076 | 9.179 | | | | | | |
| *10 | −56.76410 | 2.150 | 1.58313 | 59.38 | 0.54237 | 3.05 | 3.7 | |
| *11 | −74.49170 | DD[11] | | | | | | |
| 12(St) | ∞ | 1.000 | | | | | | |
| 13 | 26.77357 | 5.498 | 1.73800 | 32.33 | 0.59005 | 3.19 | 5.1 | |
| 14 | −27.90173 | 1.000 | 2.00100 | 29.13 | 0.59952 | 5.12 | 4.4 | |
| 15 | 25.62780 | 4.630 | 1.43700 | 95.10 | 0.53364 | 3.53 | −6.3 | |
| 16 | −124.48506 | 0.100 | | | | | | |
| *17 | 28.51624 | 6.570 | 1.49710 | 81.56 | 0.53848 | 3.64 | −5.5 | |
| *18 | −27.06196 | DD[18] | | | | | | |
| 19 | 31.58398 | 2.467 | 1.88300 | 40.80 | 0.56557 | 5.42 | 5.1 | |
| 20 | 11.84725 | 4.371 | 1.49700 | 81.61 | 0.53887 | 3.70 | −6.2 | |
| 21 | 25.09888 | 3.547 | | | | | | |
| *22 | −38.38868 | 4.787 | 1.68948 | 31.02 | 0.59874 | 2.88 | 0.0 | |
| *23 | 118.31093 | DD[23] | | | | | | |
| 24 | ∞ | 2.570 | 1.98613 | 16.48 | 0.66558 | 3.54 | 8.5 | |
| 25 | −129.57389 | DD[25] | | | | | | 36.26 |
| 26 | ∞ | 4.703 | 1.86966 | 20.02 | 0.64349 | 3.37 | 1.0 | |
| 27 | −76.72190 | 13.790 | | | | | | |
| 28 | ∞ | 2.850 | 1.51680 | 64.20 | 0.53430 | | | |
| 29 | ∞ | 1.129 | | | | | | |

TABLE 23

| Example 8 | | | | | |
|---|---|---|---|---|---|
| | Wide angle end Infinity | Middle Infinity | Telephoto end Infinity | Wide angle end β = −0.1 | Telephoto end β = −0.1 |
| Zr | 1.0 | 1.3 | 1.5 | 1.0 | 1.5 |
| f | 20.618 | 26.803 | 31.133 | — | — |
| Bf | 16.798 | 16.798 | 16.798 | — | — |
| FNo. | 4.12 | 4.12 | 4.12 | — | — |
| 2ω(°) | 112.0 | 93.2 | 83.2 | — | — |
| DD[7] | 12.883 | 4.671 | 0.996 | 14.984 | 2.331 |
| DD[11] | 7.896 | 7.896 | 7.896 | 5.795 | 6.561 |
| DD[18] | 1.220 | 2.676 | 3.467 | 1.220 | 3.467 |
| DD[23] | 4.358 | 2.208 | 0.880 | 4.358 | 0.880 |
| DD[25] | 1.000 | 10.043 | 16.214 | 1.000 | 16.214 |

TABLE 24

| Example 8 | | | | |
|---|---|---|---|---|
| Sn | 3 | 4 | 10 | 11 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 3.5870440E−05 | 2.3281112E−05 | 2.8687032E−05 | 4.6534634E−05 |
| A5 | −2.3734946E−06 | −2.5599860E−06 | −5.3061919E−08 | 6.9839493E−07 |
| A6 | −3.6226413E−08 | −2.0630576E−08 | 2.5480340E−07 | 1.6193543E−07 |
| A7 | 6.4859358E−09 | 1.7665547E−09 | 3.7326117E−09 | 9.9919100E−09 |
| A8 | 9.6608518E−11 | −1.1523211E−10 | −1.1772298E−09 | 7.6898898E−11 |

TABLE 24-continued

| Example 8 | | | | |
|---|---|---|---|---|
| A9 | −1.7375638E−11 | 3.0890582E−11 | −1.2046567E−12 | −1.4127340E−10 |
| A10 | 3.5815091E−13 | −1.4729026E−12 | 1.0593069E−12 | 7.0569659E−12 |
| Sn | 17 | 18 | 22 | 23 |
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −1.2766474E−05 | 7.4543629E−07 | −6.6029575E−05 | −3.4285567E−05 |
| A5 | 2.7327401E−07 | −2.1540238E−07 | 1.9288596E−06 | −1.3136864E−06 |
| A6 | −1.0700992E−07 | 4.8985509E−09 | −7.3753189E−08 | 3.3305289E−07 |
| A7 | 8.5030244E−09 | 5.9851384E−10 | −1.7500291E−08 | −1.2424349E−08 |
| A8 | 1.0966673E−10 | −8.7746543E−12 | 3.8103247E−10 | −1.3104483E−09 |
| A9 | −6.6128529E−11 | −1.5763851E−11 | 3.3635421E−10 | 1.6342681E−10 |
| A10 | 2.8035224E−12 | 8.2341267E−13 | −2.4915940E−11 | −5.9543794E−12 |

Example 8A

Figure 21:
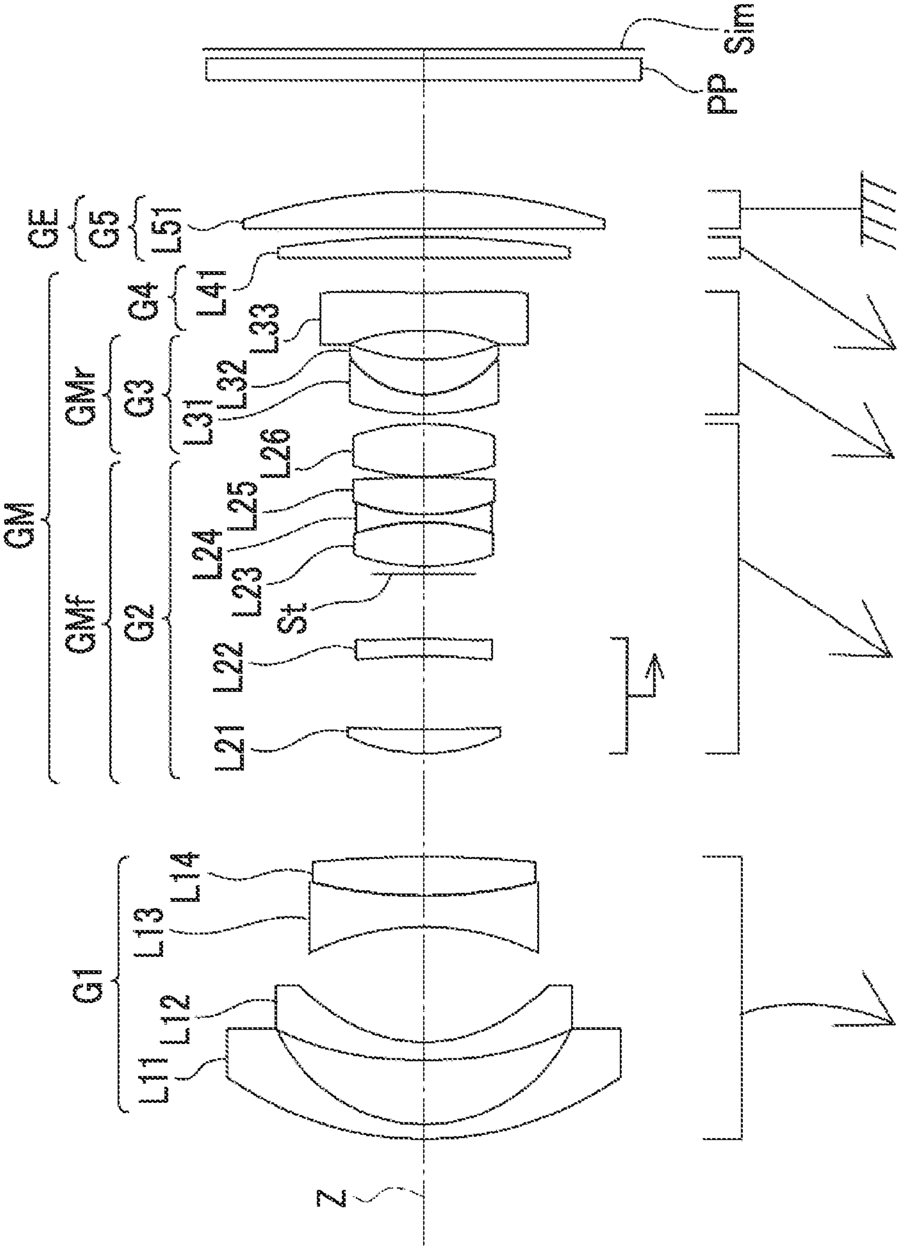
FIG. 21 is a cross-sectional view of a configuration of a zoom lens of Example 8A and a diagram showing movement loci thereof.

Example 8A is a modification example of Example 8. FIG. 21 shows a cross-sectional view of the configuration and movement loci of the zoom lens of Example 8A at the wide angle end in a state where the infinite distance object is in focus. Example 8A is different from Example 8 in that the rear subgroup GMr consists of only the third lens group G3, and the fourth lens group G4 is included in the middle group GM, but is not included in either the front subgroup GMf or the rear subgroup GMr. Except for the above-mentioned points, Example 8A is the same as Example 8. The basic lens data, the specifications and the variable surface spacings, the aspherical surface coefficients, and each aberration diagram for Example 8A are also the same as in Example 8.

Example 9

Figure 23:
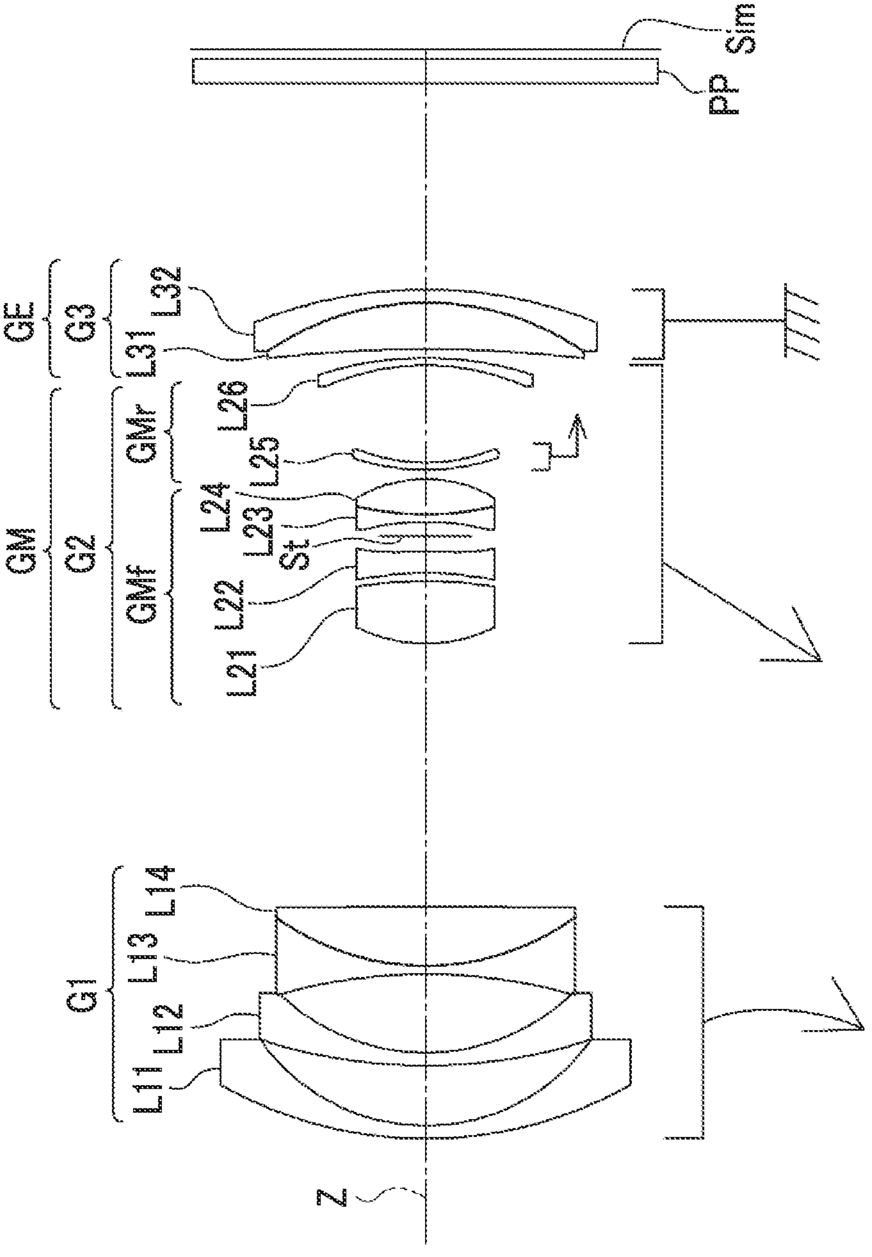
FIG. 23 is a cross-sectional view of a configuration of a zoom lens of Example 9 and a diagram showing movement loci thereof.

FIG. 23 shows a cross-sectional view of the configuration and movement loci of the zoom lens of Example 9 at the wide angle end in a state where the infinite distance object is in focus. The zoom lens of Example 9 consists of, in order from the object side to the image side along the optical axis Z, a first lens group G1 having a negative refractive power, a second lens group G2 having a positive refractive power, and a third lens group G3 having a positive refractive power.

The first lens group G1 consists of four lenses L11 to L14 in order from the object side to the image side. The second lens group G2 consists of two lenses L21 and L22, an aperture stop St, and four lenses L23 to L26 in order from the object side to the image side. The third lens group G3 consists of two lenses L31 and L32 in order from the object side to the image side.

The middle group GM consists of the second lens group G2. The front subgroup GMf consists of two lenses L21 and L22, an aperture stop St, and two lenses L23 and L24. The rear subgroup GMr consists of two lenses L25 and L26. The final group GE consists of the third lens group G3.

During zooming, the first lens group G1 and the second lens group G2 move along the optical axis Z by changing the spacing between the adjacent groups in the direction of the optical axis, and the third lens group G3 remains stationary with respect to the image plane Sim. The focus group consists of a lens L25.

Figure 24:
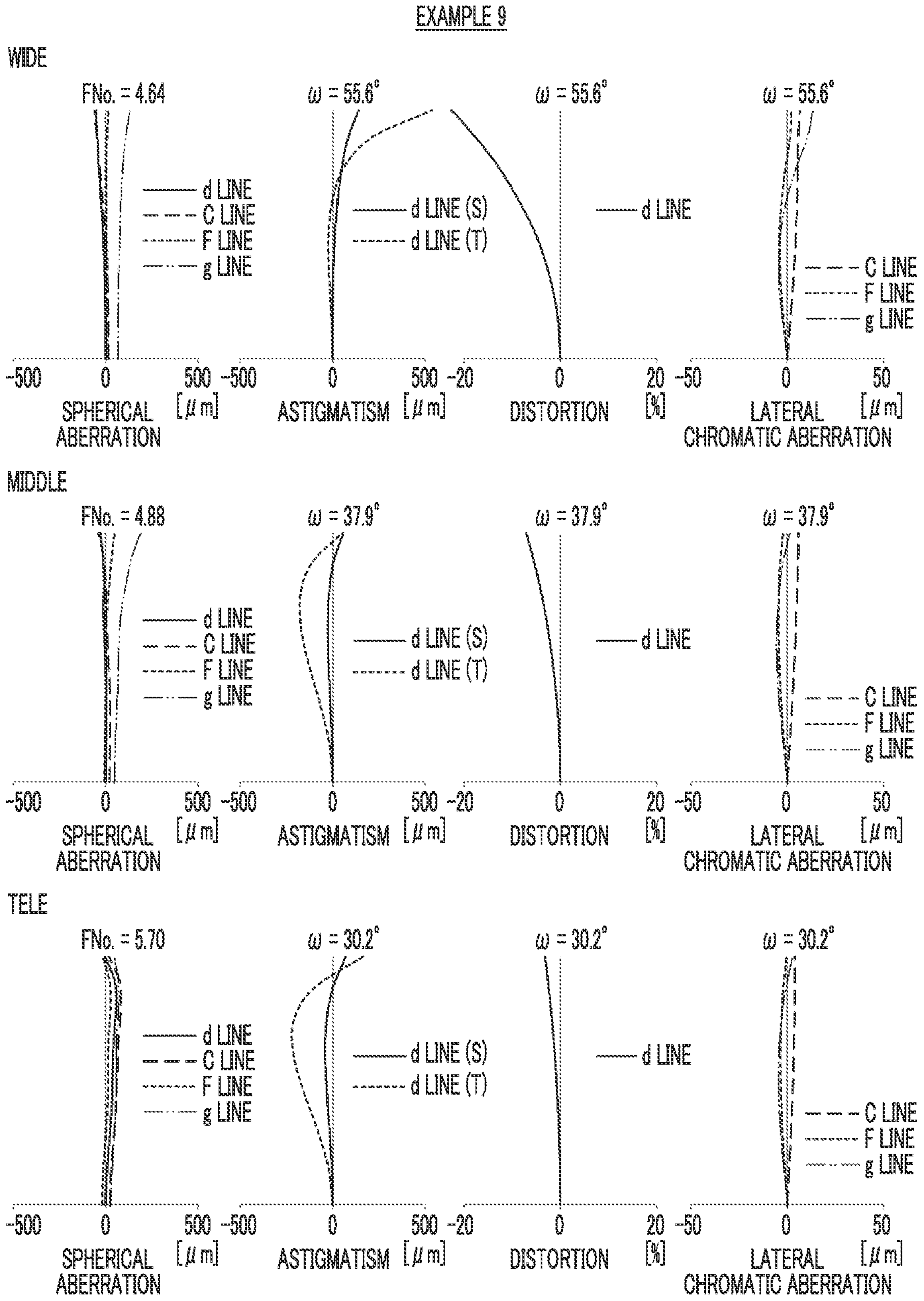
FIG. 24 is a diagram showing aberrations of the zoom lens of Example 9.

Regarding the zoom lens of Example 9, Table 25 shows basic lens data, Table 26 shows specifications and variable surface spacings, and Table 27 shows aspherical surface coefficients thereof. FIG. 24 shows aberration diagrams.

TABLE 25

| Example 9 | | | | | | | | |
|---|---|---|---|---|---|---|---|---|
| Sn | R | D | Nd | νd | θgF | SG | dNd/dT | ED |
| 1 | 49.62542 | 1.500 | 1.96300 | 24.11 | 0.62126 | 4.20 | 3.0 | |
| 2 | 23.94581 | 6.878 | | | | | | |
| 3 | 64.00404 | 1.500 | 1.72916 | 54.68 | 0.54451 | 4.18 | 4.0 | |
| 4 | 25.10976 | 8.985 | | | | | | |
| 5 | −64.45664 | 0.960 | 1.48749 | 70.39 | 0.53005 | 2.48 | −1.5 | |
| 6 | 30.30271 | 6.750 | 1.95375 | 32.32 | 0.59015 | 5.10 | 4.9 | |
| 7 | −1849.80094 | DD[7] | | | | | | |
| 8 | 18.50187 | 7.000 | 1.59522 | 67.73 | 0.54426 | 4.17 | −6.0 | 16.00 |
| 9 | −52.87445 | 1.000 | | | | | | |
| *10 | −27.93008 | 2.396 | 1.58660 | 59.01 | 0.54152 | 2.7 | 5.2 | |
| *11 | −94.28961 | 1.750 | | | | | | |
| 12(St) | ∞ | 1.674 | | | | | | |
| 13 | −29.94960 | 0.850 | 1.67300 | 38.26 | 0.57580 | 3.01 | 3.8 | |
| 14 | 35.25218 | 4.060 | 1.53775 | 74.70 | 0.53936 | 3.64 | −4.3 | |
| 15 | −15.87563 | DD[15] | | | | | | |
| 16 | 26.58098 | 0.850 | 1.74400 | 44.79 | 0.56560 | 4.32 | 3.0 | |
| 17 | 21.56987 | DD[17] | | | | | | |
| 18 | −29.48283 | 0.850 | 1.69895 | 30.13 | 0.60298 | 2.96 | 3.6 | |
| 19 | −41.07208 | DD[19] | | | | | | 22.96 |
| 20 | −165.69742 | 5.341 | 1.49700 | 81.61 | 0.53887 | 3.70 | −6.2 | |
| 21 | −33.54719 | 1.500 | 1.90525 | 35.04 | 0.58486 | 4.83 | 5.5 | |
| 22 | −54.73449 | 23.578 | | | | | | |

TABLE 25-continued

| Example 9 | | | | | | | | |
|---|---|---|---|---|---|---|---|---|
| Sn | R | D | Nd | νd | θgF | SG | dNd/dT | ED |
| 23 | ∞ | 2.850 | 1.51680 | 64.20 | 0.53430 | | | |
| 24 | ∞ | 1.095 | | | | | | |

TABLE 26

| Example 9 | | | | | |
|---|---|---|---|---|---|
| | Wide angle end Infinity | Middle Infinity | Telephoto end Infinity | Wide angle end β = −0.1 | Telephoto end β = −0.1 |
| Zr | 1.0 | 1.6 | 2.0 | 1.0 | 2.0 |
| f | 24.232 | 37.772 | 48.463 | — | — |
| Bf | 26.552 | 26.552 | 26.552 | — | — |
| FNo. | 4.64 | 4.88 | 5.70 | — | — |
| 2ω(°) | 111.2 | 75.8 | 60.4 | — | — |
| DD[7] | 30.183 | 11.472 | 4.085 | 30.183 | 4.085 |
| DD[15] | 1.033 | 1.033 | 1.033 | 4.892 | 7.585 |
| DD[17] | 11.132 | 11.132 | 11.132 | 7.273 | 4.580 |
| DD[19] | 1.000 | 14.213 | 24.646 | 1.000 | 24.646 |

TABLE 27

| Example 9 | | |
|---|---|---|
| Sn | 10 | 11 |
| KA | 1.0000000E+00 | 1.0000000E+00 |
| A3 | 0.0000000E+00 | 0.0000000E+00 |
| A4 | 1.4951659E−04 | 2.1394243E−04 |
| A5 | −5.8044374E−06 | −6.9020590E−06 |
| A6 | −1.5749888E−07 | 6.5613684E−07 |
| A7 | 7.4326647E−08 | −9.1963584E−08 |
| A8 | −2.2227321E−08 | 7.8292688E−09 |
| A9 | 2.1276560E−09 | −4.7593712E−10 |
| A10 | −7.7805047E−11 | −9.3255943E−12 |

Example 10

Figure 25:
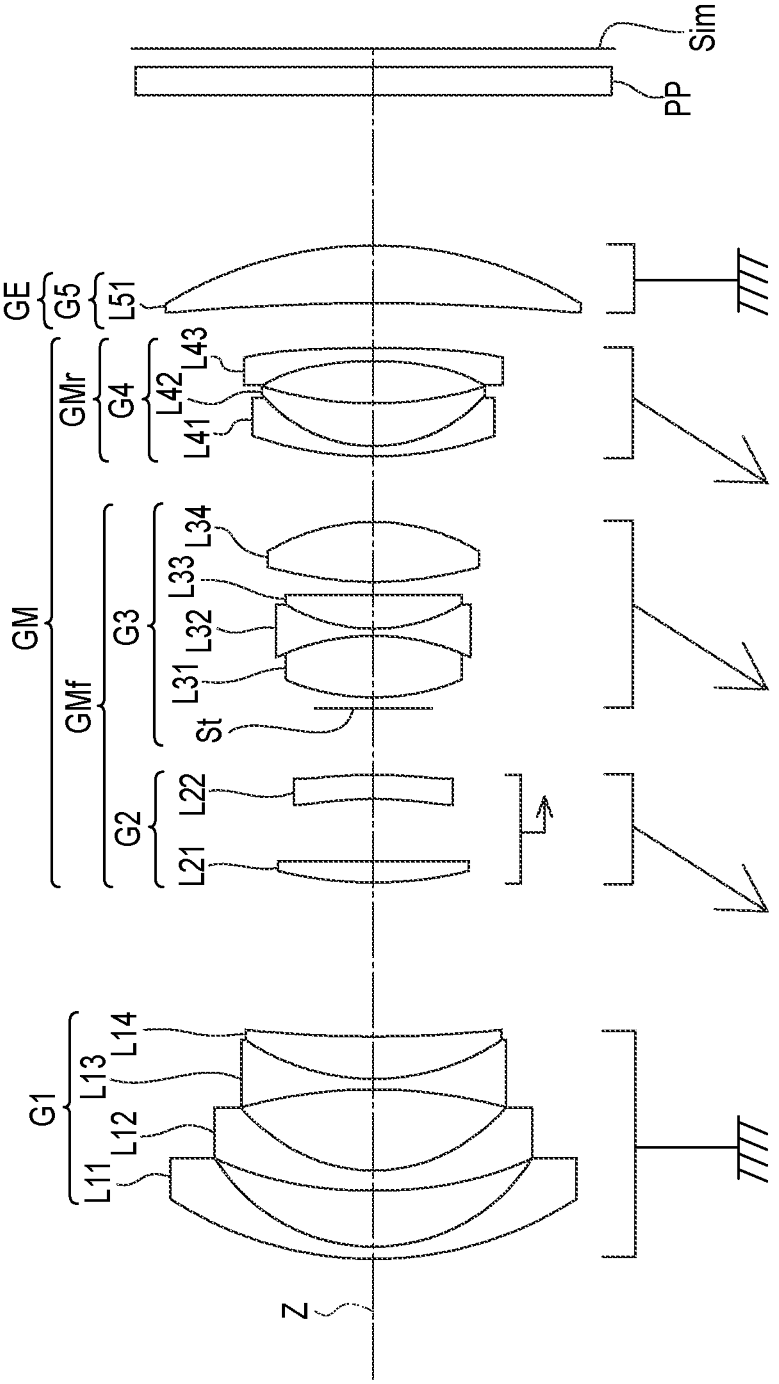
FIG. 25 is a cross-sectional view of a configuration of a zoom lens of Example 10 and a diagram showing movement loci thereof.

FIG. 25 shows a cross-sectional view of the configuration and movement loci of the zoom lens of Example 10 at the wide angle end in a state where the infinite distance object is in focus. The zoom lens of Example 10 consists of, in order from the object side to the image side along the optical axis Z, a first lens group G1 having a negative refractive power, a second lens group G2 having a positive refractive power, a third lens group G3 having a positive refractive power, a fourth lens group G4 having a negative refractive power, and a fifth lens group G5 having a positive refractive power. The middle group GM consists of the second lens group G2, the third lens group G3, and the fourth lens group G4. The front subgroup GMf consists of the second lens group G2 and the third lens group G3. The rear subgroup GMr consists of the fourth lens group G4. The final group GE consists of the fifth lens group G5.

The first lens group G1 consists of four lenses L11 to L14 in order from the object side to the image side. The second lens group G2 consists of two lenses L21 and L22 in order from the object side to the image side. The third lens group G3 consists of the aperture stop St and four lenses L31 to L34 in order from the object side to the image side. The fourth lens group G4 consists of three lenses L41 to L43 in order from the object side to the image side. The fifth lens group G5 consists of one lens L51.

During zooming, the second lens group G2, the third lens group G3, and the fourth lens group G4 move along the optical axis Z by changing the spacing between the adjacent groups in the direction of the optical axis, and the first lens group G1 and the fifth lens group G5 remain stationary with respect to the image plane Sim. The focus group consists of the entire second lens group G2.

Figure 26:
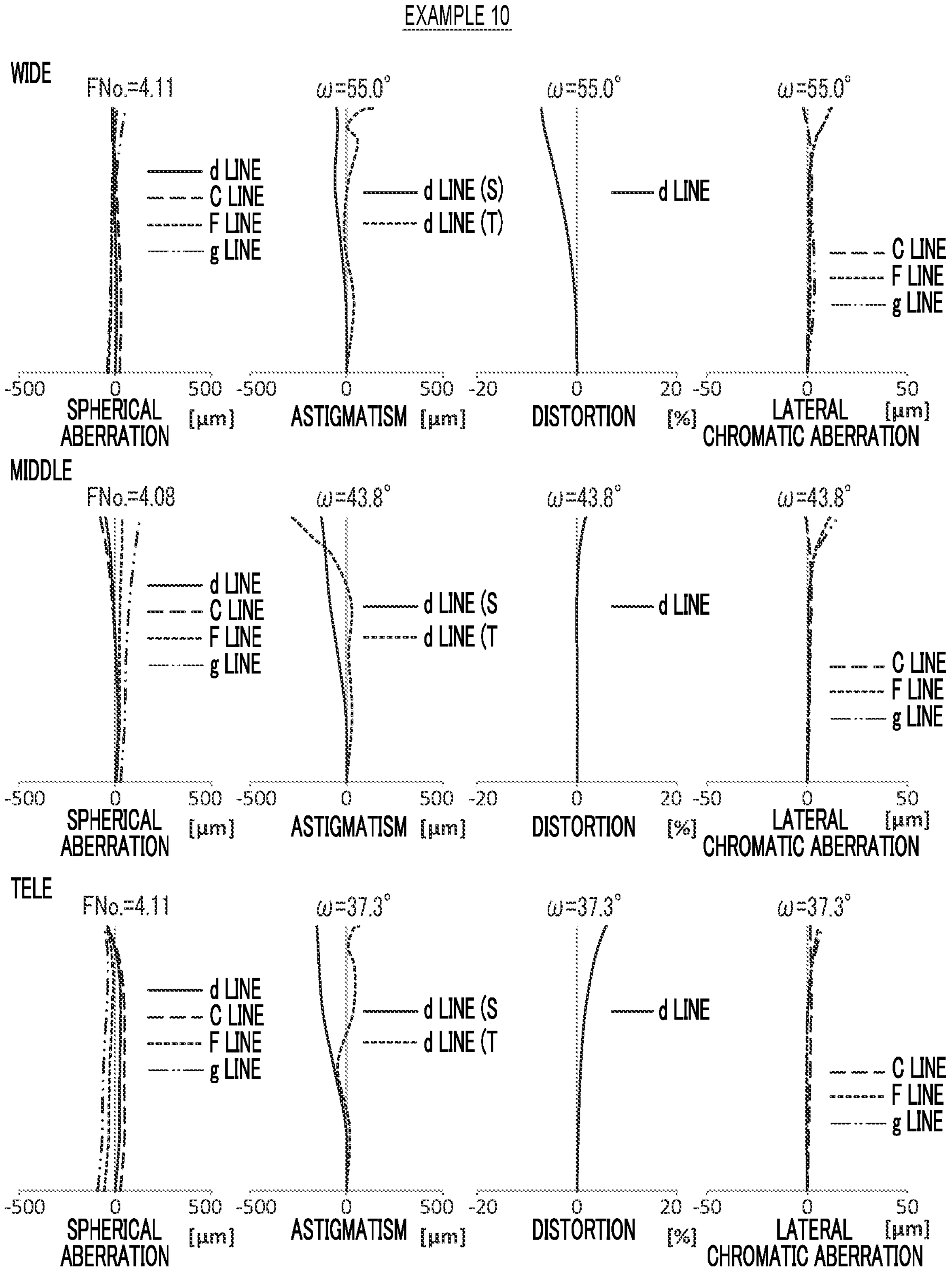
FIG. 26 is a diagram showing aberrations of the zoom lens of Example 10.

Regarding the zoom lens of Example 10, Table 28 shows basic lens data, Table 29 shows specifications and variable surface spacings, and Table 30 shows aspherical surface coefficients thereof. FIG. 26 shows aberration diagrams.

TABLE 28

| Example 10 | | | | | | | | |
|---|---|---|---|---|---|---|---|---|
| Sn | R | D | Nd | νd | θgF | SG | dNd/dT | ED |
| 1 | 42.2962 | 1.4000 | 1.95906 | 17.47 | 0.65862 | 3.49 | 4.2 | |
| 2 | 21.1899 | 6.3511 | | | | | | |
| *3 | 61.1798 | 2.2900 | 1.58313 | 59.46 | 0.54056 | 3.01 | 3.9 | |
| *4 | 19.1309 | 9.1788 | | | | | | |
| 5 | −56.2094 | 1.2100 | 1.49700 | 81.60 | 0.53774 | 3.68 | −6.2 | |
| 6 | 26.1773 | 4.7900 | 1.84667 | 23.79 | 0.61771 | 3.10 | 0.6 | |
| 7 | 137.3349 | DD[7] | | | | | | |
| 8 | 44.7695 | 2.4500 | 1.91082 | 35.25 | 0.58224 | 4.97 | 5.3 | 18.11 |
| 9 | ∞ | 7.0374 | | | | | | |

TABLE 28-continued

| Example 10 | | | | | | | | |
|---|---|---|---|---|---|---|---|---|
| Sn | R | D | Nd | νd | θgF | SG | dNd/dT | ED |
| *10 | −36.7101 | 2.7500 | 1.68863 | 31.20 | 0.60109 | 2.88 | 0.0 | |
| *11 | −44.4975 | DD[11] | | | | | | |
| 12(St) | ∞ | 1.2008 | | | | | | |
| 13 | 25.9750 | 6.9800 | 1.48749 | 70.44 | 0.52933 | 2.43 | −1.8 | |
| 14 | −25.9750 | 0.8000 | 1.75700 | 47.71 | 0.55566 | 4.06 | 5.5 | |
| 15 | 19.4240 | 3.8500 | 1.49700 | 81.61 | 0.53887 | 3.70 | −6.2 | |
| 16 | ∞ | 1.4526 | | | | | | |
| *17 | 39.3908 | 6.8000 | 1.49648 | 81.30 | 0.53743 | 3.62 | −6.2 | |
| *18 | −22.7697 | DD[18] | | | | | | |
| 19 | 41.5939 | 1.1500 | 1.90366 | 31.31 | 0.59481 | 4.51 | 4.0 | |
| 20 | 16.6618 | 4.8500 | 1.49700 | 81.61 | 0.53887 | 3.70 | −6.4 | |
| 21 | 42.3986 | 4.7645 | | | | | | |
| *22 | −45.8664 | 1.5000 | 1.69350 | 53.20 | 0.54661 | 3.52 | 4.5 | |
| *23 | −277.6916 | DD[23] | | | | | | 27.73 |
| 24 | −254.4443 | 6.5500 | 1.87070 | 40.73 | 0.56825 | 4.84 | 3.9 | |
| 25 | −45.2499 | 17.0778 | | | | | | |
| 26 | ∞ | 3.2000 | 1.51680 | 64.20 | 0.53430 | | | |
| 27 | ∞ | 2.0500 | | | | | | |

TABLE 29

| Example 10 | | | | | |
|---|---|---|---|---|---|
| | Wide angle end Infinity | Middle Infinity | Telephoto end Infinity | Wide angle end β = −0.1 | Telephoto end β = −0.1 |
| Zr | 1.0 | 1.4 | 1.6 | 1.0 | 1.6 |
| f | 20.60 | 28.03 | 33.99 | — | — |
| Bf | 21.24 | 21.24 | 21.24 | — | — |
| FNo. | 4.11 | 4.08 | 4.11 | — | — |
| 2ω(°) | 110.0 | 87.6 | 74.6 | — | — |
| DD[7] | 17.46 | 7.85 | 2.54 | 19.50 | 3.91 |
| DD[11] | 7.56 | 6.45 | 5.17 | 5.52 | 3.80 |
| DD[18] | 7.45 | 11.97 | 16.41 | 7.45 | 16.41 |
| DD[23] | 5.08 | 11.28 | 13.43 | 5.08 | 13.43 |

TABLE 30

Example 10

| Sn | 3 | 4 | 10 | 11 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | 4.1300441E−05 | 3.0099143E−05 | 5.8666005E−05 | 6.2126215E−05 |
| A5 | −2.4033683E−06 | −1.6543125E−06 | −1.1082747E−07 | −1.8583677E−06 |
| A6 | −4.8681225E−08 | −8.7456445E−08 | −2.0831316E−08 | 6.8611949E−07 |
| A7 | 5.3290405E−09 | 1.0604481E−09 | 3.2732275E−08 | −1.0884906E−07 |
| A8 | 1.7877787E−10 | −9.8343487E−12 | −5.0650804E−09 | 1.1559071E−08 |
| A9 | −1.7943006E−11 | 3.5349032E−11 | 3.6587411E−10 | −6.5016237E−10 |
| A10 | 3.2566028E−13 | −1.6366418E−12 | −1.0976748E−11 | 1.5338197E−11 |

| Sn | 17 | 18 | 22 | 23 |
|---|---|---|---|---|
| KA | 1.0000000E+00 | 1.0000000E+00 | 1.0000000E+00 | 1.0000000E+00 |
| A3 | 0.0000000E+00 | 0.0000000E+00 | 0.0000000E+00 | 0.0000000E+00 |
| A4 | −9.5480325E−06 | 5.1436650E−06 | −2.2230188E−05 | −1.4798556E−06 |
| A5 | 8.5764274E−07 | 3.5383265E−07 | −2.5662668E−06 | −3.9669057E−06 |
| A6 | −1.3625695E−07 | −5.7514914E−08 | 6.2977636E−08 | 1.9581443E−07 |
| A7 | 4.6449896E−09 | 1.6762465E−09 | 1.5501381E−08 | 1.5953243E−08 |
| A8 | 8.2283721E−10 | 1.7360953E−10 | −1.3231686E−09 | −8.6203549E−10 |
| A9 | −8.4896133E−11 | −1.4084261E−11 | 7.9174894E−11 | −4.6746994E−11 |
| A10 | 2.3243095E−12 | 8.0801659E−14 | −4.3970839E−12 | 2.4548978E−12 |

Tables 31, 32 and 33 show the corresponding values of Conditional Expressions (1) to (30) of the zoom lens of examples mentioned above. In Example 1, since there are two convex surfaces relating to Conditional Expressions (5)

and (6), the corresponding value of the object side convex surface of the two convex surfaces is described in the upper part and the corresponding value of the image side convex surface is described in the lower part. This notation method for Conditional Expressions (5) and (6) is the same for Examples 3, 9 and 10.

TABLE 31

| Expression | | Example 1 | Example 2 | Example 3 | Example 4 | Example 5 |
|---|---|---|---|---|---|---|
| (1) | Bfw/(fw × tan\|ωw\|) | 0.759 | 0.730 | 0.710 | 0.730 | 0.687 |
| (2) | \|Dfoct/DpM\| | 0.056 | 0.064 | 0.063 | 0.086 | 0.036 |
| (3) | EDMf/EDMr | 0.642 | 0.596 | 0.733 | 0.654 | 0.708 |
| (4) | TLw/(fw × tan\|ωw\|) | 4.089 | 3.924 | 3.217 | 3.986 | 3.563 |
| (5) | \|α\| | 14.98 | 20.86 | 16.27 | 27.74 | 22.88 |
| | | 18.21 | — | 19.31 | — | — |
| (6) | DStw/\|fMrw\| | 0.662 | 1.235 | 0.528 | 1.103 | 0.835 |
| | | 1.066 | — | 0.892 | — | — |
| (7) | (HMfb/HMfa)/(HMrb/HMra) | 0.314 | 0.252 | 0.353 | 0.323 | 0.479 |
| (8) | (RMff + RMfr)/(RMff − RMfr) | 0.063 | −0.020 | −0.010 | −0.221 | −0.028 |
| (9) | Pexpw/fw | 1.966 | 1.806 | 1.485 | 2.056 | 1.481 |
| (10) | (R1f + R1r)/(R1f − R1r) | 2.521 | 3.916 | 2.082 | 3.838 | 1.678 |
| (11) | N1p | 1.91083 | 1.91082 | 1.96300 | 1.90043 | 1.91082 |
| (12) | fw/\|f1\| | 0.663 | 0.770 | 0.755 | 0.785 | 0.782 |
| (13) | fw/fMw | 0.929 | 1.039 | 1.042 | 0.942 | 1.000 |
| (14) | fw/\|ffoc\| | 1.026 | 1.145 | 1.101 | 0.915 | 1.021 |
| (15) | GMave | 3.243 | 3.388 | 3.448 | 3.263 | 3.788 |
| (16) | dN1n/dT | −1.5 | −1.4 | −6.2 | −6.2 | −1.5 |
| (17) | fw/\|fis\| | — | 0.204 | 0.186 | 0.195 | — |
| (18) | θMp + 0.0018 × νMp − 0.64833 | 0.037 | 0.037 | 0.037 | 0.037 | 0.037 |
| (19) | TLt/(ft × tan\|ωt\|) | 4.351 | 4.320 | 3.690 | 4.405 | 4.539 |
| (20) | N1n | 1.80518 | 1.74000 | 1.92286 | 1.91082 | 1.95375 |
| (21) | DMra/DMrt | 0.880 | 0.849 | 0.757 | 0.858 | 0.880 |
| (22) | (Rnor + Rnif)/(Rnor − Rnif) | 0.049 | 0.183 | 0.141 | 0.151 | 0.177 |
| (23) | G1ave | 3.538 | 3.236 | 3.573 | 4.164 | 3.948 |
| (24) | GEave | 2.610 | 3.500 | 3.940 | 4.510 | 3.840 |
| (25) | fw/\|fMrw\| | 1.026 | 1.145 | 1.101 | 0.915 | 1.021 |
| (26) | fMfw/\|fMrw\| | 0.818 | 0.870 | 0.863 | 0.807 | 0.875 |
| (27) | fw/fE | 0.307 | 0.369 | 0.203 | 0.386 | 0.238 |
| (28) | ft/fw | 1.884 | 1.884 | 1.884 | 1.883 | 2.430 |
| (29) | dNMp/dT | −6.2 | −6.2 | −6.2 | −6.2 | −6.2 |
| (30) | ωw | 38.90 | 39.62 | 44.65 | 42.60 | 43.86 |

TABLE 32

| Expression | | Example 6 | Example 7 | Example 8 | Example 8A | Example 9 |
|---|---|---|---|---|---|---|
| (1) | Bfw/(fw × tan\|ωw\|) | 0.528 | 0.614 | 0.551 | 0.551 | 0.752 |
| (2) | \|Dfoct/DpM\| | 0.057 | 0.103 | 0.095 | 0.095 | 0.277 |
| (3) | EDMf/EDMr | 0.594 | 0.793 | 0.538 | 0.538 | 0.697 |
| (4) | TLw/(fw × tan\|ωw\|) | 3.901 | 4.526 | 4.424 | 4.424 | 3.503 |
| (5) | \|α\| | 20.92 | 21.90 | 17.35 | 17.35 | 17.18 |
| | | — | — | — | — | 16.23 |
| (6) | DStw/\|fMrw\| | 1.584 | 0.601 | 0.750 | 0.970 | 0.098 |
| | | — | — | — | — | 0.262 |
| (7) | (HMfb/HMfa)/(HMrb/HMra) | 0.245 | 0.330 | 0.256 | 0.145 | 0.206 |
| (8) | (RMff + RMfr)/(RMff − RMfr) | −0.040 | −0.021 | −0.081 | −0.081 | 0.076 |
| (9) | Pexpw/fw | 1.572 | 3.464 | 2.808 | 2.808 | 2.083 |
| (10) | (R1f + R1r)/(R1f − R1r) | 4.122 | 3.093 | 2.751 | 2.751 | 2.865 |
| (11) | N1p | 1.91082 | 1.84666 | 1.84666 | 1.84666 | 1.95375 |
| (12) | fw/\|f1\| | 0.739 | 1.052 | 1.013 | 1.013 | 0.660 |
| (13) | fw/fMw | 1.120 | 0.713 | 0.702 | 0.702 | 0.690 |
| (14) | fw/\|ffoc\| | 1.475 | 0.435 | 0.432 | 0.432 | 0.146 |
| (15) | GMave | 3.382 | 3.678 | 3.726 | 3.747 | 3.467 |
| (16) | dN1n/dT | −2.9 | −6.2 | −6.2 | −6.2 | −1.5 |
| (17) | fw/\|fis\| | 0.198 | — | — | — | — |
| (18) | θMp + 0.0018 × νMp − 0.64833 | 0.035 | 0.036 | 0.036 | 0.036 | 0.025 |
| (19) | TLt/(ft × tan\|ωt\|) | 4.380 | 5.112 | 4.951 | 4.951 | 4.295 |
| (20) | N1n | 1.74000 | 1.92119 | 1.90366 | 1.90366 | 1.96300 |
| (21) | DMra/DMrt | 0.674 | 0.255 | 0.358 | 0.234 | 0.868 |
| (22) | (Rnor + Rnif)/(Rnor − Rnif) | 0.195 | −0.707 | −0.528 | −0.528 | −0.155 |
| (23) | G1ave | 3.342 | 3.523 | 3.360 | 3.360 | 3.990 |
| (24) | GEave | 3.500 | 4.970 | 3.370 | 3.455 | 4.265 |
| (25) | fw/\|fMrw\| | 1.475 | 0.602 | 0.772 | 0.999 | 0.311 |
| (26) | fMfw/\|fMrw\| | 1.073 | 0.911 | 1.123 | 1.453 | 0.384 |
| (27) | fw/fE | 0.478 | 0.312 | 0.234 | 0.234 | 0.039 |
| (28) | ft/fw | 1.883 | 1.510 | 1.510 | 1.510 | 2.000 |
| (29) | dNMp/dT | −6.6 | −6.2 | −6.3 | −6.3 | −6.0 |
| (30) | ωw | 39.43 | 55.95 | 55.95 | 55.95 | 55.55 |

TABLE 33

| Expression | | Example 10 |
|---|---|---|
| (1) | Bfw/(fw × tan\|ωw\|) | 0.722 |
| (2) | \|Dfoct/DpM\| | 0.092 |
| (3) | EDMf/EDMr | 0.653 |
| (4) | TLw/(fw × tan\|ωw\|) | 4.628 |
| (5) | \|α\| | 17.11<br>10.89 |
| (6) | DStw/\|fMrw\| | 0.780<br>1.255 |
| (7) | (HMfb/HMfa)/(HMrb/HMra) | 0.278 |
| (8) | (RMff + FRMfr)/(RMff − RMfr) | 0.326 |
| (9) | Pexpw/fw | 5.000 |
| (10) | (R1f + R1r)/(R1f − R1r) | 3.008 |
| (11) | N1p | 1.84667 |
| (12) | fw/\|ff\| | 1.003 |
| (13) | fw/fMw | 0.677 |
| (14) | fw/\|ffoc\| | 0.360 |
| (15) | GMave | 3.710 |
| (16) | dN1n/dT | −6.2 |
| (17) | fw/\|fis\| | — |
| (18) | θMp + 0.0018 × νMp − 0.64833 | 0.037 |
| (19) | TLt/(ft × tan\|ωt\|) | 5.258 |
| (20) | N1n | 1.95906 |
| (21) | DMra/DMrt | 0.635 |
| (22) | (Rnor + Rnif)/(Rnor − Rnif) | −2.337 |
| (23) | G1ave | 3.320 |
| (24) | GEave | 4.840 |
| (25) | fw/\|fMrw\| | 0.563 |
| (26) | fMfw/\|fMrw\| | 0.891 |
| (27) | fw/fE | 0.331 |
| (28) | ft/fw | 1.650 |
| (29) | dNMp/dT | −6.4 |
| (30) | ωw | 55.00 |

Figure 27:
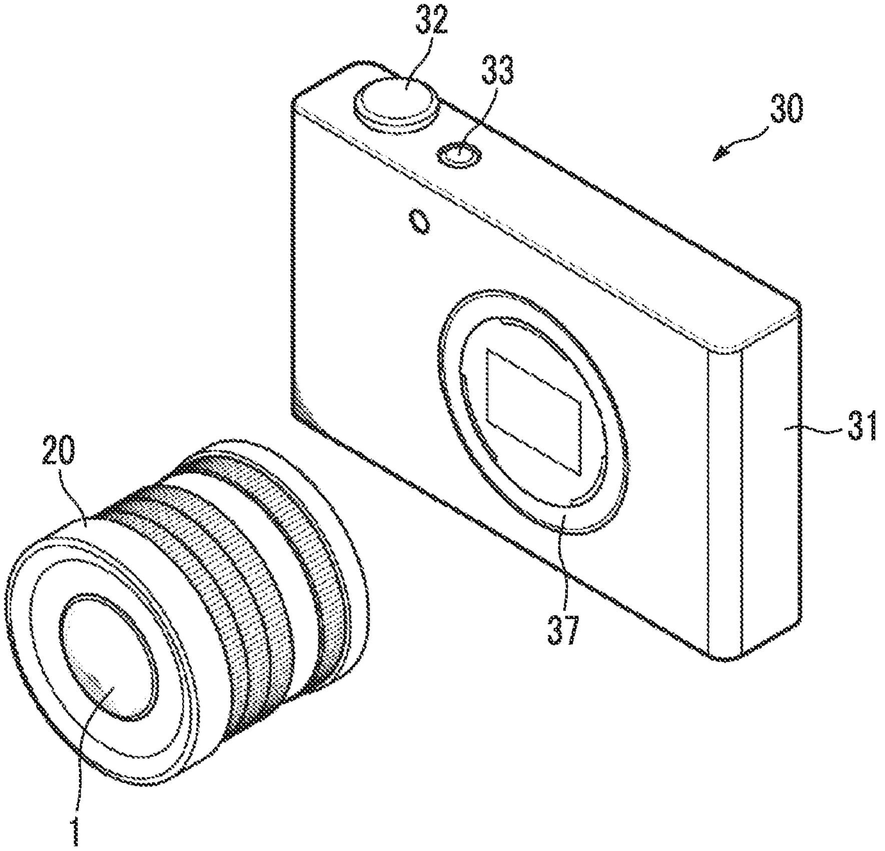
FIG. 27 is a perspective view of a front side of an imaging apparatus according to an embodiment.
Figure 28:
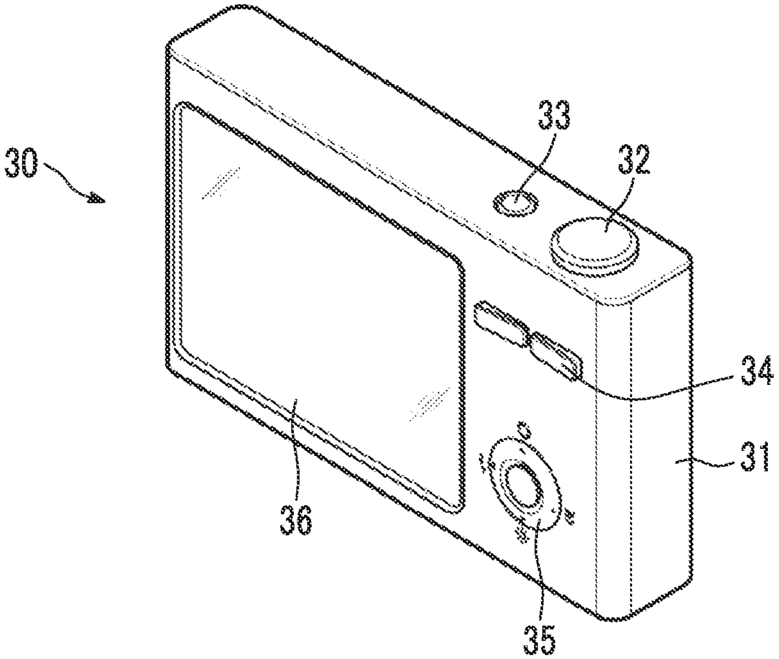
FIG. 28 is a perspective view of a rear side of the imaging apparatus according to the embodiment.

Next, an imaging apparatus according to an embodiment of the present disclosure will be described. FIGS. 27 and 28 are external views of a camera 30 which is the imaging apparatus according to the embodiment of the present disclosure. FIG. 27 is a perspective view of the camera 30 viewed from a front side, and FIG. 28 is a perspective view of the camera 30 viewed from a rear side. The camera 30 is a so-called mirrorless type digital camera, and an interchangeable lens 20 can be removably attached thereto. The interchangeable lens 20 is configured to include a zoom lens 1, which is housed in a lens barrel, according to an embodiment of the present disclosure.

The camera 30 comprises a camera body 31, and a shutter button 32 and a power button 33 are provided on an upper surface of the camera body 31. Further, an operating part 34, an operating part 35, and a display unit 36 are provided on a rear surface of the camera body 31. The display unit 36 is able to display a captured image and an image within an angle of view before imaging.

An imaging aperture, through which light from an imaging target is incident, is provided at a center on a front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video when the shutter button 32 is pressed, and is able to store image data, which is obtained through imaging, in the storage medium.

The technology of the present disclosure has been hitherto described through embodiments and examples, but the technology of the present disclosure is not limited to the above-mentioned embodiments and examples, and may be modified into various forms. For example, values such as the curvature radius, the surface spacing, the refractive index, the Abbe number, and the aspherical surface coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. A zoom lens consisting of, in order from an object side to an image side, a first lens group that has a negative refractive power, a middle group, and a final group, wherein during zooming, a spacing between the first lens group and the middle group changes, and a spacing between the middle group and the final group changes, during focusing, at least a part of the middle group moves along an optical axis as a focus group, and the first lens group and the final group remain stationary with respect to an image plane, the first lens group includes two or more negative meniscus lenses of which object side surfaces are convex surfaces, the middle group includes at least one positive lens, a back focal length of the zoom lens at an air conversion distance at a wide angle end in a state where an infinite distance object is in focus is Bfw, a focal length of the zoom lens at the wide angle end in the state where the infinite distance object is in focus is fw, a maximum half angle of view at the wide angle end in the state where the infinite distance object is in focus is ωw, and a partial dispersion ratio of the at least one positive lens of the middle group between a g line and a F line is θMp and an Abbe number based on a d line is νMp, and Conditional Expressions (1) and (18) are satisfied, which are represented by $$0.35 < Bfw/(fw \times \tan|\omega w|) < 1.5, \text{ and} \quad (1)$$

$$0.01 < \theta Mp + 0.0018 \times \nu Mp - 0.64833 < 0.06. \quad (18)$$

2. The zoom lens according to claim 1, wherein a sum of Bfw and a distance on the optical axis from a lens surface closest to the object side in the first lens group at the wide angle end to a lens surface closest to the image side in the final group at the wide angle end is TLw, and Conditional Expression (4) is satisfied, which is represented by $$2.5 < TLw/(fw \times \tan|\omega w|) < 7. \quad (4)$$

3. The zoom lens according to claim 1, wherein the middle group includes, in order from the object side to the image side, a front subgroup having a positive refractive power and a rear subgroup having a negative refractive power.

4. The zoom lens according to claim 3, wherein during focusing, at least a part of the rear subgroup moves along the optical axis, and the other group remains stationary with respect to the image plane.

5. The zoom lens according to claim 3, wherein during focusing, at least a part of the front subgroup moves along the optical axis, and the other group remains stationary with respect to the image plane.

6. The zoom lens according to claim 3, wherein the rear subgroup includes an image side negative lens of which an image side surface is a convex surface.

7. The zoom lens according to claim 6, wherein the rear subgroup includes an object side negative lens of which an object side surface is a convex surface, at a position closer to the object side than the image side negative lens.

8. The zoom lens according to claim 3, wherein a paraxial curvature radius of a lens surface closest to the object side in the front subgroup is RMff, a paraxial curvature radius of a lens surface closest to the image side in the front subgroup is RMfr, and Conditional Expression (8) is satisfied, which is represented by $$-1 < (RMff + RMfr)/(RMff - RMfr) < 1. \quad (8)$$

9. The zoom lens according to claim 1, wherein one of the two or more negative meniscus lenses is disposed closest to the object side in the first lens group, a paraxial curvature radius of the object side surface of the negative meniscus lens closest to the object side in the first lens group is R1f, a paraxial curvature radius of an image side surface of the negative meniscus lens closest to the object side in the first lens group is R1r, and Conditional Expression (10) is satisfied, which is represented by $$1 < (R1f + R1r)/(R1f - R1r) < 6. \quad (10)$$

10. The zoom lens according to claim 1, wherein a refractive index of a positive lens included in the first lens group at the d line is N1p, and the first lens group includes one or more positive lenses satisfying Conditional Expression (11), which is represented by $$1.6 < N1p < 2.15. \quad (11)$$

11. The zoom lens according to claim 1, wherein a focal length of the first lens group is f1, and Conditional Expression (12) is satisfied, which is represented by $$0.3 < fw/|f1| < 1.5. \quad (12)$$

12. The zoom lens according to claim 1, wherein a focal length of the middle group at the wide angle end in the state where the infinite distance object is in focus is fMw, and Conditional Expression (13) is satisfied, which is represented by $$0.4 < fw/fMw < 1.5. \quad (13)$$

13. The zoom lens according to claim 1, wherein a focal length of the focus group is ffoc, and Conditional Expression (14) is satisfied, which is represented by $$0.05 < fw/|ffoc| < 2.5. \quad (14)$$

14. The zoom lens according to claim 1, wherein Conditional Expression (18-1) is satisfied, which is represented by $$0.017 < \theta Mp + 0.0018 \times vMp - 0.64833 < 0.05. \quad (18\text{-}1)$$

15. The zoom lens according to claim 1, wherein Conditional Expression (18-2) is satisfied, which is represented by $$0.022 < \theta Mp + p0.0018 \times vMp - 0.64833 < 0.04. \quad (18\text{-}2)$$

16. The zoom lens according to claim 1, wherein a focal length of the final group at the wide angle end is fE, and Conditional Expression (27) is satisfied, which is represented by $$0.01 < fw/fE < 0.75. \quad (27)$$

17. The zoom lens according to claim 1, wherein a focal length of the final group at the wide angle end is fE, and Conditional Expression (27-1) is satisfied, which is represented by $$0.03 < fw/fE < 0.6. \quad (27\text{-}1)$$

18. The zoom lens according to claim 1, wherein a focal length of the final group at the wide angle end is fE, and Conditional Expression (27-2) is satisfied, which is represented by $$0.15 < fw/fE < 0.52. \quad (27\text{-}2)$$

19. The zoom lens according to claim 1, wherein the final group remains stationary with respect to the image plane during zooming.

20. An imaging apparatus comprising the zoom lens according to claim 1.

* * * * *